United States Patent
Kramer et al.

(10) Patent No.: US 12,313,455 B2
(45) Date of Patent: May 27, 2025

(54) DEVICE AND METHOD FOR DETERMINING A FOCAL POINT

(71) Applicant: Primes GmbH Messtechnik für die Produktion mit Laserstrahlung, Pfungstadt (DE)

(72) Inventors: Reinhard Kramer, Pfungstadt (DE); Otto Märten, Dreieich (DE); Stefan Wolf, Groß-Gerau (DE); Johannes Roßnagel, Mainz-Kastel (DE); Marc Hänsel, Darmstadt (DE); Roman Niedrig, Berlin (DE)

(73) Assignee: Primes GmbH Messtechnik für die Produktion mit Laserstrahlung, Pfungstadt (DE)

( * ) Notice: Subject to any disclaimer, the term of this patent is extended or adjusted under 35 U.S.C. 154(b) by 177 days.

(21) Appl. No.: 18/257,422

(22) PCT Filed: Dec. 14, 2021

(86) PCT No.: PCT/EP2021/085615
§ 371 (c)(1),
(2) Date: Jun. 14, 2023

(87) PCT Pub. No.: WO2022/128995
PCT Pub. Date: Jun. 23, 2022

(65) Prior Publication Data
US 2024/0102855 A1    Mar. 28, 2024

(30) Foreign Application Priority Data
Dec. 18, 2020   (DE) .......................... 102020134109.1

(51) Int. Cl.
*G01J 1/42*       (2006.01)
*B23K 26/06*      (2014.01)
(Continued)

(52) U.S. Cl.
CPC ........ *G01J 1/4257* (2013.01); *B23K 26/0643* (2013.01); *B23K 26/0648* (2013.01);
(Continued)

(58) Field of Classification Search
CPC ...... G01J 1/4257; G01J 1/0411; G01J 1/0414; G01J 1/0477; G01J 1/0437;
(Continued)

(56) References Cited

U.S. PATENT DOCUMENTS

| | | | |
|---|---|---|---|
| 6,548,797 | B1 | 4/2003 | Ai |
| 2008/0100829 | A1 | 5/2008 | Watson |

(Continued)

FOREIGN PATENT DOCUMENTS

| | | | |
|---|---|---|---|
| CA | 2809887 | A1 | 4/2012 |
| DE | 10142206 | A1 | 3/2003 |

(Continued)

OTHER PUBLICATIONS

German Office Action for corresponding application No. DE 102019004337 A1, dated Sep. 1, 2021.

*Primary Examiner* — Seung C Sohn
(74) *Attorney, Agent, or Firm* — McDonnell Boehnen Hulbert & Berghoff LLP

(57) ABSTRACT

The invention relates to a beam analysis device (10) for determining the axial position of the focal point (71) of an energy beam or a sample beam (70) decoupled from an energy beam, comprising a beam-shaping device (12), a detector (40), and an analysis device (45). The beam-shaping device (12) is designed to release two sub-beams (72, 73) from the sample beam (70) on a plane of the sub-beam release process (19). The cross-sections of the two sub-beams (72, 73) are defined by sub-apertures (32, 33) which are delimited from each other and which are arranged at a distance k to each other in a first lateral direction (31).

(Continued)

The beam-shaping device (12) is designed to image the two sub-beams (72, 73) in order to form two beam spots (92, 93) on the detector and deflect at least one of the two sub-beams (72, 73) in a second lateral direction (37) which is oriented transversely to the first lateral direction (31) in order to form a distance w in the second lateral direction (37) between the two beam spots (92, 93). The analysis device (45) is designed to determine the distance a along the first lateral direction (31) between positions of the two beam spots (92, 93) on the detector (40) and to determine the axial position of the beam focus (71) on the basis of the distance a and/or to determine a change in the axial position of the beam focus (71) on the basis of a change in the distance a. The invention also relates to a corresponding method for determining the axial position of a beam focus (71).

43 Claims, 37 Drawing Sheets

(51) Int. Cl.
 *B23K 26/067* (2006.01)
 *B23K 26/70* (2014.01)
 *G01J 1/04* (2006.01)
(52) U.S. Cl.
 CPC ........ *B23K 26/0676* (2013.01); *B23K 26/705* (2015.10); *G01J 1/0411* (2013.01); *G01J 1/0414* (2013.01); *G01J 1/0477* (2013.01)

(58) Field of Classification Search
 CPC ............ B23K 26/0643; B23K 26/0648; B23K 26/0676; B23K 26/705; B23K 26/046; B23K 26/064; B23K 26/066
 USPC ......................................................... 356/121
 See application file for complete search history.

(56) References Cited

U.S. PATENT DOCUMENTS

| | | | |
|---|---|---|---|
| 2013/0214121 A1* | 8/2013 | Lee | ........................ G02B 3/10 250/201.4 |
| 2014/0042133 A1 | 2/2014 | Weick | |
| 2016/0114434 A1 | 4/2016 | Regaard | |
| 2017/0085054 A1 | 3/2017 | Schulz | |
| 2020/0122276 A1 | 4/2020 | Blazquez-Sanchez | |
| 2020/0254561 A1 | 8/2020 | Blazquez-Sanchez | |
| 2022/0234134 A1* | 7/2022 | Flamm | ............... G02B 27/0075 |
| 2022/0341778 A1 | 10/2022 | Kramer | |

FOREIGN PATENT DOCUMENTS

| | | |
|---|---|---|
| DE | 102011007176 A1 | 10/2012 |
| DE | 102013210078 A1 | 12/2014 |
| DE | 102013227031 A1 | 6/2015 |
| DE | 102017131147 A1 | 6/2019 |
| DE | 102018105364 A1 | 9/2019 |
| DE | 102019004337 A1 | 12/2020 |
| EP | 0248479 A1 | 9/1987 |
| EP | 2886239 A1 | 6/2015 |
| WO | 2012041351 A1 | 4/2012 |
| WO | 2015185152 A1 | 12/2015 |

* cited by examiner

DEVICE AND METHOD FOR DETERMINING A FOCAL POINT

CROSS-REFERENCE TO RELATED APPLICATIONS

The present application is a U.S. National Phase application pursuant to 35 U.S.C. § 371 of PCT International Application No. PCT/EP2021/085615 filed Dec. 14, 2021, which claims priority to German Patent Application No. 10 2020 134 109.1, filed Dec. 18, 2020, the contents of each of which are incorporated herein by reference.

FIELD OF THE INVENTION

The invention relates to a device and a method for determining the axial position of a beam focus of an energy beam of electromagnetic radiation, in particular for determining the axial position of a beam focus of processing optics. In particular the energy beam can be a laser beam. The invention also provides devices and methods for determining the position of the beam focus of processing optics during a laser processing operation.

BACKGROUND OF THE INVENTION

A central object in laser material processing is the adjustment and control of the axial focal position of the laser beam relative to the material or workpiece to be processed. With optimal process control, the focus of the laser beam is not necessarily directly on the surface of the workpiece. Rather, the optimal positioning of the laser beam focus relative to the workpiece depends on a plurality of factors. For example, the focus can lie within the workpiece, that is to say, below the workpiece surface, especially when processing workpieces with a high material thickness. Often the processing result is sensitively dependent on the exact focal position of the laser beam, which is why it is desirable or necessary that the positioning of the laser beam focus relative to the workpiece does not alter during processing.

In laser cutting processes, it is also important that the distance between the workpiece and the cutting nozzle remains as constant as possible during the processing, since the flow dynamics of the cutting gas have a major influence on the cutting result. This problem can be solved in a manner of known art, for example, by means of capacitive distance measurement and closed loop control.

Often the problem of altering the beam focal position relative to the workpiece is not the detection or tracking of the workpiece position, or the workpiece distance relative to the processing optics, but the detection of the actual beam focal position relative to the processing optics.

Modern laser processing systems use lasers with a high brilliance and a high power, often in the region of several kilowatts. Due to the material properties in the optical elements of laser processing optics, the high laser power causes the optical elements to heat up. This creates a radial temperature gradient in the optical elements, which results in an alteration in the refractive power of the optical elements, due to the temperature dependence of material parameters such as the refractive index. This effect is called thermal focal shift. Although this thermal focal shift can be minimised by selecting suitable materials for the optical elements, for example by using high-purity, low-absorption quartz glass types, it is nevertheless virtually always present. The effect is intensified by the reaction products and particles of various sizes produced during laser material processing, which can deposit on the processing optics, or on the protective glass, of the processing optics, and lead to increased absorption. Thus, the protective glass in particular often contributes to an alteration in the beam focal position of the processing optics.

Devices for determining a workpiece distance or a workpiece surface position are known from the prior art; these function, for example, in accordance with the basic principle of optical triangulation.

For example, the patent application EP 0 248 479 A1 discloses an arrangement for the optical measurement of a distance between a surface and a reference surface. For this purpose, the surface is illuminated with a radiation source and the reflected radiation is directed via an optical system onto a detector after the reflected radiation has passed through a screen with two off-axis openings. The extent of the pattern of beam spots produced by the screen is a measure of the distance between the surface and the reference surface.

The patent application DE 101 42 206 A1 describes a measuring arrangement for determining the depth of holes or groove-shaped incisions formed in substrate surfaces. As in the previously cited publication, the light emitted from a luminous spot on the substrate surface is also used here to obtain the depth information. The light passes through two openings of an optical screen onto a focusing element, and is directed onto a detector. Prior to this, the light from at least one opening of the screen is guided onto a refracting or reflecting optical element so as to alter the beam direction. This makes it possible, for example, to achieve an amplification of the deflection effect depending on the depth of the substrate surface.

The patent application DE 10 2013 210 078 A1 discloses a device and a method for determining the focal position of a high-energy beam. The device comprises, among other things, an image acquisition device which is designed to form at least two observation beams, and imaging optics for generating at least two images of the region to be monitored, or of a reference contour. On the one hand, an alteration in the lateral distance of the two images of the region to be monitored of the workpiece surface can be used to infer a deviation of the focal position relative to the workpiece. On the other hand, an alteration in the focal length of the focusing element can be determined from an alteration in the lateral distance of two images of the reference structure, which can be formed by the inner contour of a laser processing nozzle, for example, and thus an alteration in the focal position can be inferred. Since the light emitted or reflected by the workpiece or the reference structure is also used in this device to generate the images, it is not possible to measure the focal position of the high-energy beam in the strict sense. An alteration of the beam focal position, which is not caused by the focusing element, but for example by the collimation optics, would not be able to be determined with the disclosed device.

The patent application EP 2 886 239 A1 discloses a method and a device for monitoring and controlling the processing path in a laser joining process. The processing head described in the publication has, among other things, a distance sensor in the form of a double slit sensor with imaging optics and a double slit screen. The distance sensor can be used to determine the distance between the processing head and the workpiece surface.

In all the publications cited above, a position or distance of a workpiece surface is ultimately always determined optically. The determination of the focal position of a beam directed onto a workpiece surface, on the other hand, is not possible with the devices and methods cited above, or only with low accuracy. In order to be able to determine the actual focal position of the processing beam, it is necessary to measure the processing beam directly, or to decouple a sample beam from the processing beam and measure the sample beam.

A device and a method for processing material with electromagnetic radiation are of known art from the publication WO 2012/041 351 A1. Here it is envisaged that a device for pattern generation, for example a shadow mask, is swivelled into the electromagnetic beam, which is focussed on the material. A partially reflecting surface is arranged in front of the focus so that the image of the pattern generated with the pattern generator is reflected back on the partially reflecting surface and reaches a detector via a beam splitter. The image on the detector is processed by a computer and an electrical signal dependent on the focal position is generated. The disclosed method is intended for use in ophthalmic surgery. However, the method is not, or not very, suitable for general applications in laser material processing, since it is generally not possible to permanently arrange a partially reflecting surface just in front of the beam focus, and furthermore it is unfavourable to arrange a shadow mask in a high-power laser beam.

In the device for monitoring a laser beam disclosed in WO 2015/185 152 A1, radiation is reflected back by means of a plane plate, which is arranged at a tilt angle in the laser beam, and detected with a spatially resolving detector. Alterations in divergence of the laser beam can be determined by detecting a shift in the focal position of the sub-beam imaged on the detector. The device is particularly intended for analysing and monitoring a driver laser arrangement for generating EUV radiation.

The patent application DE 10 2011 007 176 A1 describes a device for focusing a laser beam and a method for monitoring laser processing. For this purpose, laser radiation is reflected back from a transmissive optical element, in particular from a protective glass, and the back-reflected radiation is detected by a detector for purposes of determining the focal position. The protective glass is arranged at a tilt angle so that the back-reflected radiation is deflected directly to the side and no further beam splitting is required. A screen is provided to mask out the back-reflected radiation from one of the sides of the protective glass. The focal position of the laser beam is determined by evaluating the size or diameter of the region of incidence of the back-reflected laser radiation on the detector.

The patent DE 10 2013 227 031 A1 discloses a device and a method for analysing a light beam incident on a substrate, and for correcting a focal length shift. In the disclosed device, a component of the light beam reflected by the protective glass is deflected into a measuring beam path onto a sensor for beam analysis. The component reflected from the protective glass is guided through a screen in the measuring beam path, whereby interference beams reflected from other parts of the device are masked out. In order to achieve the desired interference beam masking, an inclination of the protective glass and/or the use of wedge plates to deflect the reflected beam is provided. As a sensor, the publication instructs the use of a CCD camera or a CMOS camera, with which a measurement in accordance with DIN ISO 11146 is to be made possible. Furthermore, the determination of the actual focal length present by means of an ABCD matrix calculation is envisaged.

The device and method presented in the patent application DE 10 2018 105 364 A1 for determining a focal position of a laser beam in a laser processing system operate in a very similar manner to the device from DE 10 2011 007 176 A1. In the method of DE 10 2018 105 364 A1, the use of calibration data, which comprise beam diameters measured as a function of the laser power, is envisaged for determining the focal position. Thus, the determination of the focal position is also based in the method presented here on the determination of the diameter of the intensity distribution on the detector.

In the most recently cited publications, the focal position is typically determined by determining the dimensions or the diameter of the beam spot on the detector. Although a focal position can in principle be determined in this way if the beam parameters are known, such methods are unfavourable for several reasons: on the one hand, the detected beam diameter also alters with alterations in the divergence and/or diameter of the processing laser beam; on the other hand, especially in the region of the beam waist, an alteration in the diameter with an alteration in the focal position is minimal. Both lead to a considerable uncertainty in the determination of the axial focal position. Finally, based on a measurement in the optimal focal position, it cannot be detected in which direction the beam focus is shifted, since the diameter increases in both directions.

The post-published DE 10 2019 004 337 A1 discloses a beam analysis device for determining a focal position of a light beam. It comprises an imaging device, a detector unit with a spatially resolved light-sensitive detector, and an evaluation unit. Four selection devices generate four sub-beams from a measuring beam. The first and second of the selection devices are arranged at a first distance along a y-direction that extends transversely to a beam direction of the measuring beam. The first and second sub-beams thereby generated are imaged onto the detector by sub-aperture lenses and thereby deflected in the y-direction. When the focal position is altered, a distance between the beam spots of the first and second sub-beams alters along the y-direction on the detector. From this alteration in distance, the evaluation unit can determine the alteration in focal position. However, the first distance can become small or even zero under certain circumstances. The beam spots of the first and second sub-beams are then no longer distinguishable and no clear evaluation is possible. The third and fourth of the selection devices are arranged at a second distance along an x-direction, which extends transversely to a beam direction of the measuring beam and at right angles to the y-direction. The third and fourth sub-beams thereby generated are imaged onto the detector by sub-aperture lenses and thereby deflected in the x-direction. When the focal position is altered, a distance between the beam spots of the third and fourth sub-beams alters along the x-direction on the detector. From this alteration in distance, the evaluation unit can determine the alteration in focal position. The second distance can also become small or even zero under certain circumstances. The beam spots of the third and fourth sub-beams can then no longer be distinguished.

BRIEF DESCRIPTION OF THE INVENTION

It is therefore the object of the present invention advantageously to develop the principle of optical triangulation and, in particular, to enable it to be used for measuring the focal position of laser beams that are guided in laser processing optics, without having to resort to the radiation emitted or reflected by a workpiece, and thus to enable a particularly precise determination of the focal position. It is also the object of the present invention to provide particularly robust, accurate, versatile, and compact, devices and methods for determining the focal position and, if applicable, also for determining further beam parameters.

The object is achieved with the features listed in the independent claims.

In accordance with the invention, a beam analysis device for determining an axial position of a beam focus is provided, which comprises a beam shaping device, a detector and an evaluation device. Here the beam focus is a focus of an energy beam of electromagnetic radiation, or a focus of a sample beam decoupled from the energy beam.

The beam shaping device is set up to release (at least) two sub-beams from the energy beam, or from the sample beam decoupled from the energy beam, in a plane of the sub-beam release, wherein the two sub-beams are a first sub-beam and a second sub-beam. The cross-sections of the two sub-beams are defined in the plane of the sub-beam release by a respective sub-aperture. The sub-apertures are delimited from each other. Centre points of the sub-apertures have a distance k from each other, wherein a first lateral direction is defined by the distance k between the sub-apertures. The term "lateral" refers to directions in planes at right angles to the respective local optical axis. The beam shaping device is furthermore set up for shaping an intensity distribution on the detector with (at least two) beam spots, and for forming at least one beam spot from each of the two sub-beams (that is to say, from at least one beam spot from the first sub-beam and at least one beam spot from the second sub-beam), to image the two sub-beams onto the detector, and to deflect and/or offset at least one of the two sub-beams in a second lateral direction, whereby a distance w is formed along the second lateral direction between the beam spots on the detector. Here the second lateral direction is oriented transversely to the first lateral direction, and the two beam spots are the at least one beam spot of the first sub-beam and the at least one beam spot of the second sub-beam.

The detector comprises a light radiation-sensitive sensor, resolving spatially in two dimensions, which is set up to convert the intensity distribution impinging on the detector into electrical signals. The detector is arranged along a propagation path for the two sub-beams at a distance s behind the plane of sub-beam release.

The evaluation device is set up to process the electrical signals of the detector, which represent the intensity distribution on the detector. The evaluation device is furthermore set up to determine a distance a along the first lateral direction between positions of the two beam spots on the detector. The evaluation device is furthermore set up to determine an axial position of the beam focus based on the distance a, and/or to determine an alteration of the axial position of the beam focus based on an alteration of the distance a.

The beam analysis device is a particularly robust, accurate, versatile and compact device for determining the focal position.

In other words, the beam shaping device is set up to form the (at least two) sub-apertures in the plane of the sub-beam release for purposes of releasing a respective one of the two sub-beams. In other words, the beam shaping device is set up so that the beam spot of one of the two sub-beams and the beam spot of the other of the two sub-beams form the distance a from each other on the detector by virtue of the distance k (in the first lateral direction in the plane of the sub-beam release) on the detector along the first lateral direction on the detector, wherein the distance a depends, among other things, on the axial position of the beam focus.

Furthermore, in other words, the beam shaping device is set up such that the beam spot of one of the two sub-beams and the beam spot of the other of the two sub-beams on the detector are additionally displaced along the second lateral direction at the detector by the distance w from each other due to the deflection and/or displacement of at least one of the two sub-beams, wherein the second lateral direction at the detector is transverse to the first lateral direction at the detector. The first distance a can become small or even zero under certain circumstances. Due to the additional distance w between the two beam spots on the detector, the two beam spots are still distinguishable even in such a case. For example, the beam shaping device can be set up in such a way that the distance w is so large that the two beam spots overlap only partially (or preferably not at all) even in the case in which the distance a becomes zero.

The beam analysis device in accordance with the invention can optionally be furthermore refined by one or more of the features listed below.

The sample beam can be identical to the energy beam, especially if the sample beam is not formed by decoupling from the energy beam.

The evaluation device can be connected to the detector for purposes of receiving the electrical signals from the detector. For example, the evaluation device can be connected to the detector via at least one data line. Alternatively or additionally, the evaluation device can be wirelessly connected to the detector for purposes of receiving the electrical signals from the detector. In accordance with a further aspect, the evaluation device and the detector can be designed in a common unit.

For example, the first lateral direction and the local optical axis between the plane of sub-beam release and the detector can be altered in the beam analysis device by means of beam folding and/or beam redirection. Furthermore, the second lateral direction can be correspondingly altered by means of beam folding and/or beam redirection. With the aid of beam folding and/or beam redirection, the beam analysis device can be made more compact, for example, without impairing the measurement accuracy.

The beam shaping device of the beam analysis device can be set up to deflect and/or offset the two sub-beams relative to each other, wherein a difference between the deflections and/or offsets of the two sub-beams along the second lateral direction is aligned to form the distance w along the second lateral direction between the two beam spots on the detector. In particular, the beam shaping device can be set up to deflect and/or offset both of the two sub-beams along the second lateral direction, wherein only the difference between the deflections and/or offsets of the two sub-beams along the second lateral direction results in the formation of the distance w. This enables a larger distance w with less influence on the optical axis.

The beam analysis device can comprise a decoupling device, wherein the decoupling device includes a beam decoupler for decoupling the sample beam from the energy beam. In this way, beam analysis can be easily used in existing processing optics. In addition, the decoupling device can allow measurement by the beam analysis device during normal operation of the processing optics.

The beam decoupler of the beam analysis device can be a beam splitter device which is set up to decouple a radiation component in the range from 0.01% to 5% of the energy beam as a sample beam by reflection and/or transmission. In typical applications, this beam component is on the one hand sufficient for an accurate measurement and on the other hand the energy beam is only insignificantly weakened by the decoupling.

The beam shaping device of the beam analysis device can comprise an imaging device with at least one optical lens for purposes of imaging the sub-beams onto the detector. This enables, for example, the use of a more compact detector. Alternatively or additionally, the measurement accuracy can be improved by this means.

The plane of the sub-beam release can be set up at the image-side focal point (also referred to as second focal point) of the imaging device. This makes evaluation particularly easy.

The evaluation device can be set up to determine the axial position of the beam focus based on the distance a of the two beam spots, and/or the alteration in the axial position of the beam focus, based on the alteration in the distance a of the two beam spots, by means of a linear calculation rule. This enables a particularly simple, accurate and fast evaluation with particularly little calculation effort.

The evaluation device can be set up to determine the axial position of the beam focus based on the distance a between the two beam spots, and/or the alteration in the axial position of the beam focus based on the alteration in the distance a between the two beam spots, by means of an at least partially linear calculation rule. This enables a simple, accurate and fast evaluation with little calculation effort.

The beam analysis device can comprise a beam folding device including a beam splitter and at least one mirror arranged in the beam path in front of the detector. The at least one mirror is arranged to reflect a component of the beam leaving the beam splitter back into the beam splitter, wherein the beam folding device in this manner forms a first folded beam path. The plane of the sub-beam release of the beam shaping device is thereby arranged in the beam path in front of the beam folding device or in the first folded beam path. The beam folding enables a more compact design of the beam analysis device without impairing the measurement accuracy.

In a further development of the beam analysis device, the beam folding device can additionally include at least one second mirror, wherein the second mirror is arranged to reflect a further component of radiation leaving the beam splitter back into the beam splitter, wherein the beam folding device in this manner forms a second folded beam path. The second folded beam path can, for example, enable the measurement of additional parameters.

In a possible variant of embodiment of the beam analysis device, it is envisaged that the plane of the sub-beam release of the beam shaping device is arranged in the first folded beam path, and that no sub-beam release is arranged in the second folded beam path, and in this way a radiation component of the sample beam (or energy beam) is guided onto the detector as an unmodulated beam via the second folded beam path. Here the evaluation device can be set up to determine a beam diameter and/or a beam profile from an intensity distribution of a beam spot of the unmodulated beam on the detector. This makes it possible to characterise the energy beam or the sample beam more precisely.

In the second folded beam path, the mirror can be arranged such that it can be axially displaced, and the position of the mirror can be adjusted by means of a positioning device. The axial displacement of the second mirror can be used, for example, to determine the beam caustic (that is to say, the beam envelope) of the energy beam or the sample beam. The evaluation device can correspondingly be set up to determine the beam caustic. In particular, the evaluation device can be set up to control the axial displacement of the said mirror.

The beam shaping device of the beam analysis device can comprise a beam separator device with at least one sub-beam deflection element for purposes of deflecting and/or displacing the at least one of the two sub-beams in the second lateral direction to form the distance w along the second lateral direction between the two beam spots on the detector.

The beam separator device can also comprise at least two sub-beam deflection elements for purposes of deflecting and/or displacing the two sub-beams relative to each other. Here a difference between the deflections and/or displacements of the two sub-beams is aligned along the second lateral direction to form the distance w along the second lateral direction between the two beam spots on the detector.

The beam separator device can include at least one wedge plate as a sub-beam deflection element, which is arranged in alignment in front of or behind one of the sub-apertures in the beam direction, and which is set up to deflect that one of the two sub-beams which is released from this sub-aperture by an angular amount in the range from 0.02° to 6°.

The beam separator device can include at least one tilted plane plate or a prism as a sub-beam deflection element, which is arranged in alignment in front of or behind one of the sub-apertures in the beam direction, and which is set up to displace that one of the two sub-beams which is released from the sub-aperture by an amount in the range from 0.05 mm to 3 mm.

The beam separator device can be arranged within the first folded beam path and can include at least two mirrors as sub-beam deflection elements. Each of the at least two mirrors can be arranged in alignment in front of or behind one of the sub-apertures in the beam direction; alternatively, the peripheries or edges of the mirrors can themselves form the sub-apertures. Each of the two mirrors is set up to reflect back one of the two sub-beams. An angular difference between the normal directions on the mirror surfaces of the mirrors lies in a range from 0.01° to 3°, and the difference between the normal directions on the mirror surfaces of the mirrors is aligned along the second lateral direction.

Furthermore, the evaluation device can be set up to determine a lateral position of the entire intensity distribution with the (at least) two beam spots on the detector and can be set up:
  for calculation of a lateral position of the beam focus of the sample beam from the lateral position of the entire intensity distribution and/or
  for calculation of an alteration in the lateral position of the beam focus of the sample beam from an alteration in the lateral position of the entire intensity distribution.

In a possible variant of embodiment, the beam analysis device can comprise a beam splitter for splitting the sample beam, a further imaging device with at least one optical lens, and a second detector. Here the beam splitter is arranged in the beam path in front of the plane of the sub-beam release of the beam shaping device, and the beam splitter is arranged between the optical lens of the imaging device and the plane of the sub-beam release.

In this possible variant of embodiment, the further imaging device is arranged between the beam splitter and the second detector for purposes of imaging an enlarged beam spot or an enlarged image of the beam focus onto the second detector. This enables a more accurate characterisation of the energy beam or the sample beam.

The evaluation device can be set up to process the electrical signals generated by the second detector, and the evaluation device can be set up to determine a beam diameter and/or a focal diameter from an intensity distribution on the second detector.

In a further possible variant of embodiment, the beam analysis device can comprise a beam splitter for splitting the sample beam, a further imaging device with at least one optical lens, and a second detector. In this case, the beam splitter is arranged in the beam path in front of the plane of the sub-beam release of the beam shaping device, and the beam splitter is arranged between the optical lens of the imaging device and the plane of the sub-beam release. The further imaging device is arranged between the beam splitter and the second detector. The imaging device and the further imaging device together form a combined lens system which has a focal plane on the image side. The second detector can be arranged in the image-side focal plane (also referred to as second focal plane) of the combined lens system.

The evaluation device can be set up to process the electrical signals generated by the second detector, and the evaluation device can be set up to determine a divergence angle from an intensity distribution on the second detector.

In a possible variant of embodiment, the beam shaping device is set up so that the positions of the two beam spots on the detector run on two paths separated from each other by the distance w when the axial position of the beam focus is varied.

A system can furthermore be provided comprising a beam analysis device and processing optics for purposes of guiding and focusing the energy beam. The processing optics can comprise a decoupling device for purposes of decoupling the sample beam from the energy beam. Furthermore, the beam analysis device can be connected to the processing optics for purposes of receiving the decoupled sample beam. The beam analysis device can thus be used in a simple manner for testing the energy beam.

To achieve the object of the invention, a beam analysis method for determining an axial position of a beam focus is also provided in accordance with the invention. Here the beam focus is a focus of an energy beam of electromagnetic radiation or a focus of a sample beam decoupled from the energy beam. The method comprises at least the following steps:

release of (at least) two sub-beams from the energy beam or from the sample beam decoupled from the energy beam in a plane of the sub-beam release, for example by means of a beam shaping device, wherein the two sub-beams are a first sub-beam and a second sub-beam, wherein cross-sections of the two sub-beams in the plane of the sub-beam release are defined by a respective sub-aperture. The sub-apertures are delimited from one another and the centre points of the sub-apertures have a distance k from one another. The distance k between the sub-apertures defines a first lateral direction. The term "lateral" refers to directions in planes at right angles to the respective local optical axis.

guidance of the two sub-beams onto a detector, which is arranged along a propagation path for the two sub-beams at a distance s behind the plane of sub-beam release, wherein the guidance of the two sub-beams onto the detector comprising the following sub-steps:

imaging of the two sub-beams, for example by means of the beam shaping device, onto the detector so as to form at least one beam spot from each of the two sub-beams (that is to say, at least one beam spot from the first sub-beam and at least one beam spot from the second sub-beam), so as to form an intensity distribution on the detector comprising two beam spots, wherein the two beam spots are the at least one beam spot of the first sub-beam and the at least one beam spot of the second sub-beam, deflection and/or displacement of at least one of the two sub-beams in a second lateral direction, for example by means of the beam shaping device, thereby forming a distance w along the second lateral direction between the two beam spots on the detector, wherein the second lateral direction is aligned transversely to the first lateral direction.

conversion of the intensity distribution impinging on the detector into electrical signals by means of a light radiation-sensitive sensor, resolving spatially in two dimensions, of the detector.

processing of the electrical signals of the detector that represent the intensity distribution on the detector, for example by means of an evaluation device.

determination of a distance a along the first lateral direction between positions of the two beam spots, for example by means of the evaluation device.

determination of the axial position of the beam focus based on the distance a, or determination of an alteration in the axial position of the beam focus based on an alteration in the distance a.

The beam shaping device can in particular be designed in accordance with any of the described forms of embodiment. The advantages described here apply correspondingly to the beam analysis method.

The evaluation device can in particular be designed in accordance with any of the described forms of embodiment. The advantages described here apply correspondingly to the beam analysis method.

The beam analysis method in accordance with the invention can be furthermore represented by one or a number of the optional steps listed below.

The two sub-beams can be deflected and/or offset relative to each other, for example by means of the beam shaping device, wherein a difference between the deflections and/or offsets of the two sub-beams is aligned along the second lateral direction, whereby the distance w along the second lateral direction between the two beam spots is formed on the detector.

In particular, both of the two sub-beams can be deflected and/or offset in the second lateral direction, whereby only the difference between the deflections and/or offsets of the two sub-beams along the second lateral direction leads to the formation of the distance w. This enables a larger distance w with less influence on the optical axis.

In a further step, the sample beam can be decoupled from the energy beam, for example by means of a beam decoupler in a decoupling device.

As a sample beam, a radiation component in the range from 0.01% to 5% of the energy beam can be decoupled by reflection and/or transmission, for example by means of the beam decoupler.

The imaging of the two sub-beams onto the detector can be done by means of an imaging device with at least one optical lens arranged in the beam shaping device.

The release of the sub-beams can take place in a plane that lies at the image-side focal point of the imaging device.

Determining the axial position of the beam focus based on the distance a of the two beam spots, or determining the alteration of the axial position of the beam focus based on the alteration of the distance a of the two beam spots, can be performed by means of a linear calculation rule.

The determination of the axial position of the beam focus based on the distance a of the two beam spots, or the determination of the alteration of the axial position of the beam focus based on the alteration of the distance a of the two beam spots, can be performed by means of an at least partially linear calculation rule.

In a further step, a first folded beam path can be formed by means of a beam folding device, which includes a beam splitter and at least one mirror and which is arranged in the beam path in front of the detector by reflection of a beam component leaving the beam splitter back into the beam splitter at the at least one mirror. Here the release of the two sub-beams can take place in the beam path in front of the beam folding device or in the first folded beam path.

In yet a further step, by means of the beam-folding device, which additionally includes at least one second mirror, a second folded beam path can be formed by reflecting a further component of radiation leaving the beam splitter back into the beam splitter at the second mirror.

An optional method is also envisaged in which the release of the two sub-beams takes place in the first folded beam path and in which no release of sub-beams takes place in the second folded beam path, and a radiation component of the sample beam (or energy beam) is thereby guided onto the detector as an unmodulated beam. Here a beam diameter and/or a beam profile can be determined from an intensity distribution of a beam spot of the unmodulated beam on the detector, for example by means of the evaluation device.

In a further optional method, the axial position of the mirror in the second beam path can be varied by means of a positioning device, and an intensity distribution of the beam spot of the unmodulated beam can be registered on the detector for each of at least three different positions of the mirror. At least one beam parameter of the unmodulated beam can be determined from the registered intensity distributions, for example by means of the evaluation device.

In a further step, a lateral position of the entire intensity distribution with the two beam spots on the detector can be determined, and a lateral position of the beam focus of the sample beam can be calculated from the lateral position of the entire intensity distribution, or an alteration in the lateral position of the beam focus of the sample beam can be calculated from an alteration in the lateral position of the entire intensity distribution.

A further possible method can comprise the following three steps:
  splitting of the sample beam by means of a beam splitter arranged in the beam path behind the optical lens of the imaging device and in front of the plane of sub-beam release.
  imaging of a split sample beam onto a second detector by means of a further imaging device comprising at least one optical lens arranged between the beam splitter and the second detector for purposes of forming an enlarged beam spot, or an enlarged image of the beam focus, on the second detector.
  determination of a beam diameter or a focal diameter from an intensity distribution on the second detector.

Yet a further possible method can comprise the following three steps:
  splitting of the sample beam by means of a beam splitter arranged in the beam path behind the optical lens of the imaging device and in front of the plane of sub-beam release.
  guidance of a split sample beam onto a second detector by means of a further imaging device with at least one optical lens, which is arranged between the beam splitter and the second detector, for forming a far-field beam distribution on the second detector. Here the imaging device and the further imaging device together form a combined lens system which has an image-side focal plane. The second detector is arranged in the image-side focal plane of the combined lens system.
  determination of a far-field beam diameter or a divergence angle from an intensity distribution on the second detector.

A method is optionally envisaged in which the energy beam is focused by processing optics.

A further method is optionally envisaged in which the determined axial position of the beam focus or the determined alteration in the axial position of the beam focus is used to control a laser processing operation.

A method is optionally provided in which the positions of the two beam spots on the detector run on two paths separated by the distance w when the axial position of the beam focus is varied.

BRIEF DESCRIPTION OF THE FIGURES

The invention is represented in more detail with reference to the following figures, without being limited to the forms of embodiment and examples shown. Rather, forms of embodiment are also envisaged in which elements and aspects can be combined, as shown in various figures. Here:

FIG. 26b: shows a schematic, exemplary representation of beam spots on the detector of the beam analysis device in accordance with FIG. 25 and the modulation device in accordance with FIG. 26a.

FIG. 27b: shows an exemplary representation of beam spots on the detector when using a modulation device in accordance with FIG. 27a.

FIG. 28b: shows an exemplary representation of beam spots on the detector when using a modulation device in accordance with FIG. 28a.

FIG. 29b: shows an exemplary representation of beam spots on the detector when using a modulation device in accordance with FIG. 29a.

FIG. 30b: shows an exemplary representation of beam spots on the detector when using a modulation device in accordance with FIG. 30a.

DETAILED DESCRIPTION OF THE FIGURES

Figure 1A:
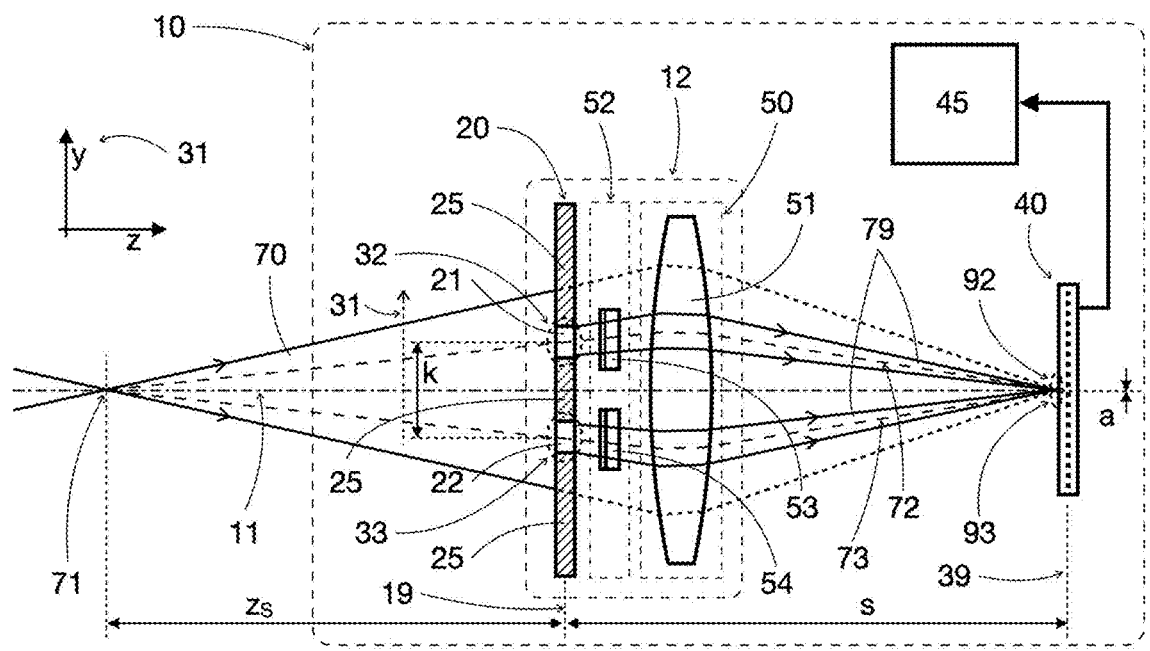
FIG. 1a: shows a schematic representation of a form of embodiment of the beam analysis device in accordance with the invention.
Figure 1A:
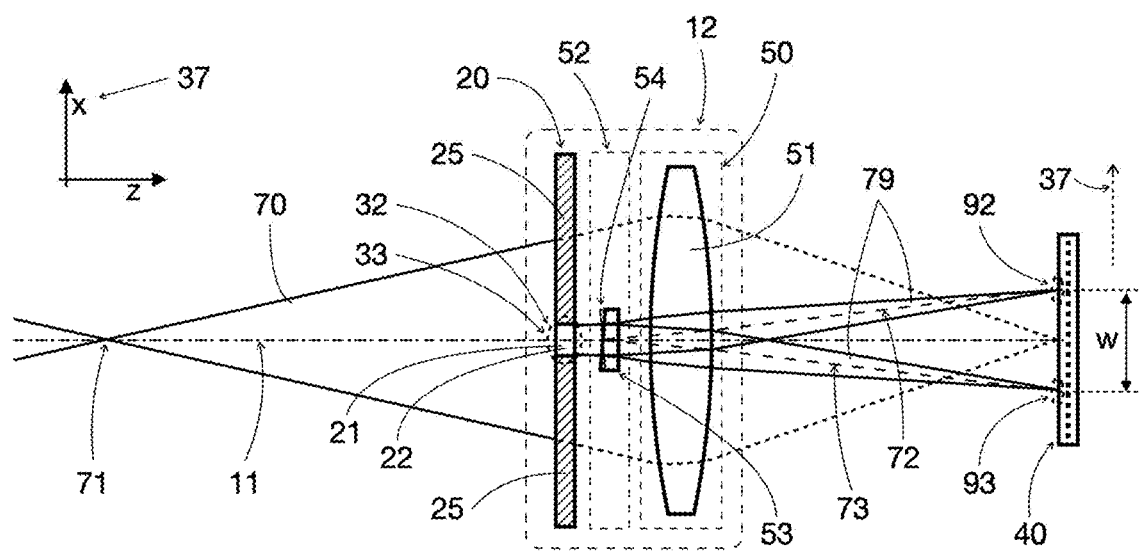

FIG. 1a shows a beam analysis device 10 in accordance with the invention, which comprises a beam shaping device 12, a detector 40 and an evaluation device 45. The beam shaping device 12, the detector 40 and the evaluation device 45 are preferably arranged together in a housing. The beam analysis device 10 receives a sample beam 70 propagating along an optical axis 11 with a beam focus 71. The beam shaping device 12 comprises a modulation device 20, a beam separator device 52, and an imaging device 50, which in this example of embodiment are designed as independent devices. The modulation device 20 serves to separate two sub-beams 72, 73 from the sample beam 70 in a plane of the sub-beam release 19. For this purpose, the modulation device 20 has at least two transmission zones 21, 22, which are delimited from one another, and at least one blocking zone 25, which completely surrounds the transmission zones 21, 22 in each case and separates them from one another. In the region of the transmission zones 21, 22, the radiation propagates onward to the detector 40; in the region of the blocking zone 25, the propagation of the radiation to the detector is prevented. In this way, the edges of the transmission zones 21, 22 delimit two sub-apertures 32, 33, which define, in the plane of the sub-beam release 19, the cross-sections of the sub-beams 72, 73 thus formed. The centre points of the sub-apertures 32, 33 have a distance k from each other. The distance k, that is to say, the imaginary shortest connection of the centre points of the sub-apertures 32, 33, defines a first lateral direction 31. The first lateral direction 31 is aligned at right angles to the local optical axis 11. In the selected representation of FIG. 1a, the first lateral direction 31 is aligned parallel to the y-coordinate axis as an example. Consequently, the upper part of FIG. 1a shows a representation of the beam analysis device 10 in the y-z plane, as indicated by the coordinate arrows y, z. The modulation device 20 modulates the intensity distribution of the sample beam 70 in the plane of the sub-beam release 19, thereby forming a shaped sample beam 79 with the two sub-beams 72, 73. The modulation device 20 can be, for example, a double aperture screen with two openings, wherein the two openings represent the transmission zones 21, 22.

By means of the imaging device 50, the shaped sample beam 79 is imaged onto the detector 40. In a sensor plane 39, the detector 40 has a light radiation-sensitive sensor, resolving spatially in two dimensions, which converts the intensity distribution on the detector 40 into electrical signals, which are received and processed by the evaluation device 45. In this form of embodiment, the evaluation device 45 is electrically connected to the detector 40 for this purpose. The imaging device 50 includes at least one optical lens 51. By imaging the shaped sample beam 79 onto the detector 40, at least one beam spot 92, 93 is formed on the detector for each of the sub-beams 72, 73. The two beam spots 92, 93 have a distance a from each other on the detector 40 in the first lateral direction 31. The distance a depends, among other things, on the distance k between the sub-apertures 32, 33, on the distance s between the plane of the sub-beam release 19 and the sensor plane 39, and on the distance $z_s$ between the axial position of the beam focus 71 and the plane of the sub-beam release 19. Thus, the axial position of the beam focus 71 can be determined from the distance a. The distance a is zero if the image position of the beam focus 71 falls on the detector 40, or on the sensor plane 39. In order that the evaluation device 45 can unambiguously assign the beam spots 92, 93 and thus distinguish between a positive and a negative displacement of the beam focus 71, that is to say, to the front or to the rear, provision is made in accordance with the invention to deflect or offset at least one of the sub-beams 72, 73 in a second lateral direction 37, which is oriented transversely to the first lateral direction 31. The second lateral direction 37 can, for example, be aligned at right angles to the first lateral direction 31. Like the first lateral direction 31, the second lateral direction 37 is oriented at right angles to the local optical axis 11. In the form of embodiment of FIG. 1a, both sub-beams 72, 73 are deflected along the second lateral direction 37. For this purpose, the beam shaping device 12 has the beam separator device 52, which in this example comprises two wedge plates as sub-beam deflection elements 53, 54. In each case, one of the wedge plates 53, 54 is arranged in alignment in the beam direction behind one of the transmission zones 21, 22. In the example shown, both sub-beams are thereby deflected by approximately the same amount, but in opposite directions, along the second lateral direction 37. The deflection direction is defined by the orientation of the wedge angle of the wedge plates. For example, the sub-beam 72 can be deflected by the wedge plate 53 by an angular amount in the range from 0.02° to 6°, and the sub-beam 73 can be deflected by the wedge plate 54 by the same angular amount in the opposite direction. Due to the deflection and the propagation towards the detector 40, the beam spots 92, 93 have a distance w from each other in the direction of the second lateral direction 37. To illustrate this deflection, which in the upper part of FIG. 1a takes place out of the plane of the figure, a partial representation of the beam analysis device 10 in the x-z plane is shown in the lower part of FIG. 1a, as indicated by the coordinate arrows x, z in the lower part of the figure.

Figure 1B:
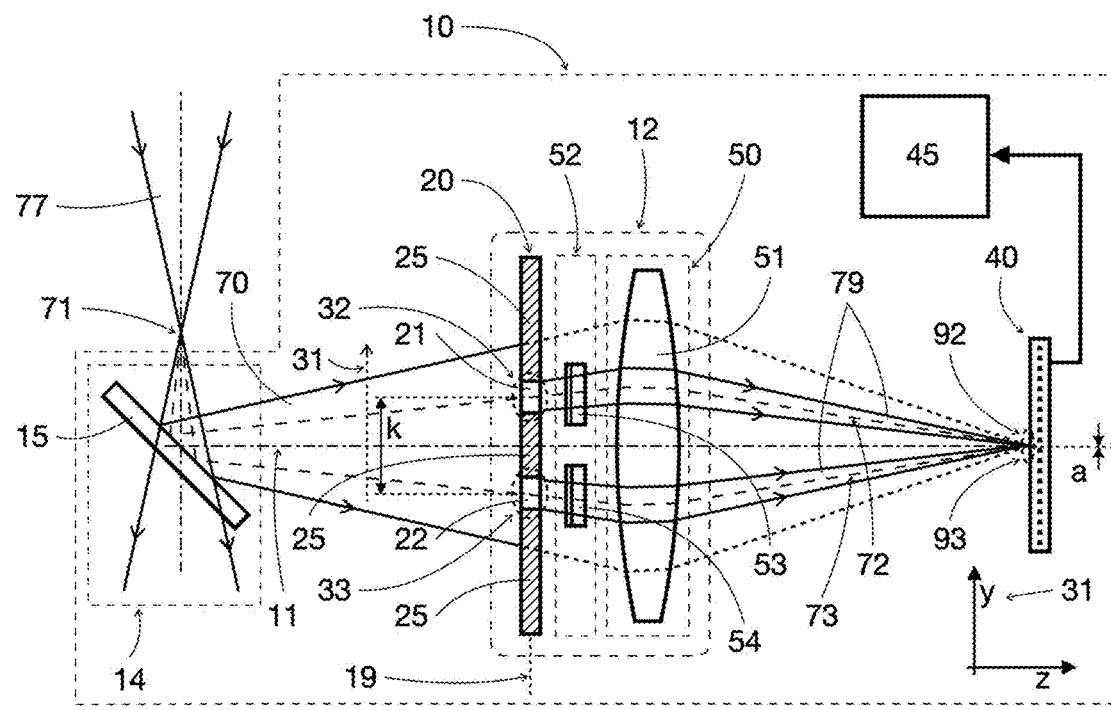
FIG. 1b: shows a schematic representation of a form of embodiment of the beam analysis device similar to FIG. 1a with an additional decoupling device.
Figure 1B:
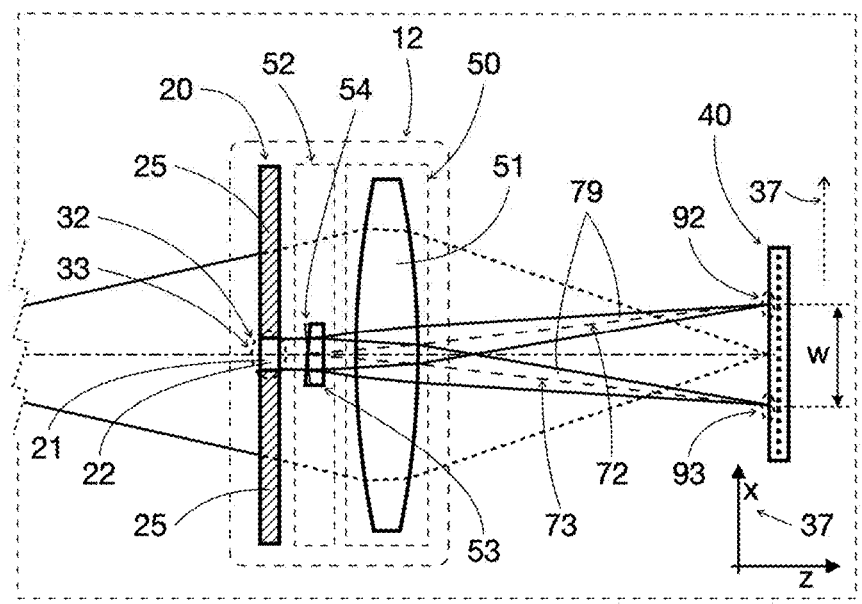

FIG. 1b shows a beam analysis device 10 similar to the form of embodiment shown in FIG. 1a. The variant of embodiment of the beam analysis device 10 shown in FIG. 1b differs from the form of embodiment shown in FIG. 1a by an additional decoupling device 14. The decoupling device 14 comprises a beam decoupler 15. By means of the beam decoupler 15, the sample beam 70 is decoupled from an energy beam 77 of electromagnetic radiation, for example a laser beam. In this example, the beam decoupler 15 is a plane plate, which is arranged as a beam splitter, and at one interface of which a fraction of the intensity of the energy beam 77 is reflected as the sample beam 70. The plane plate can be coated, for example with a reflection-reducing layer, for the purpose of adjusting the degree of reflection. A low residual reflection of the usual anti-reflective coatings in the range from about 0.05% to about 1% can be sufficient for providing the sample beam 70. The decoupling device 14 thus simultaneously reduces and/or limits a radiation intensity of the sample beam 70.

All other features of the embodiment in FIG. 1b correspond to the features shown in FIG. 1a, the same reference symbols correspond to the same features as in FIG. 1a; in this respect, reference is made to the description of FIG. 1a for the other features.

Figure 2:
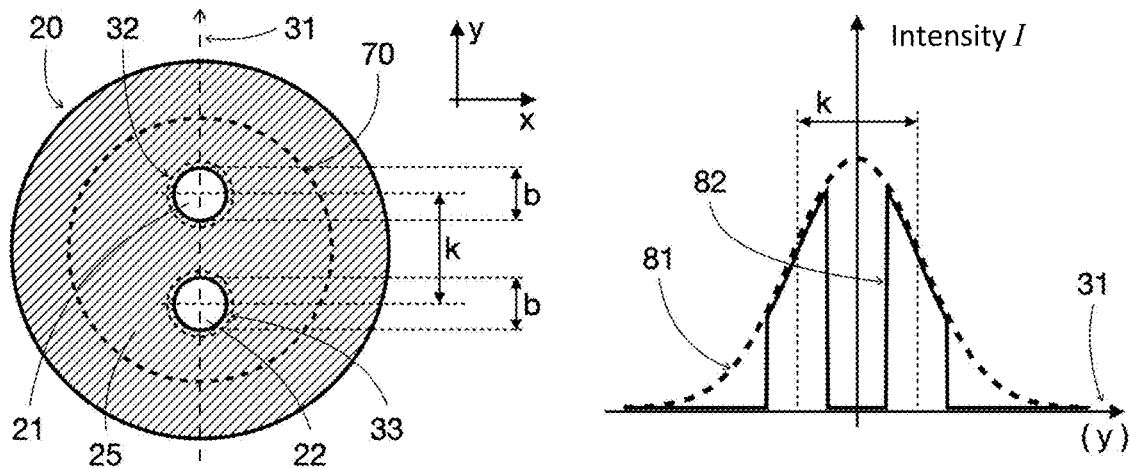
FIG. 2: shows a schematic representation of a modulation device for the beam analysis device, as well as a schematic representation of exemplary intensity profiles in front of and behind the modulation device.

FIG. 2 shows an example of a modulation device 20 which can be used in a beam analysis device 10 in accordance with FIG. 1a or 1b. The modulation device 20 shown in FIG. 2 is a double aperture screen. The modulation device 20 has two separate transmission zones 21, 22 and a blocking zone 25 surrounding the transmission zones 21, 22. The transmission zones 21, 22 are circular openings in this example. No radiation is transmitted in the region of the blocking zone 25; the blocking zone 25 can consist of absorbent and/or reflective material. The edges of the transmission zones 21, 22 define the two sub-apertures 32, 33. The centre points of the sub-apertures 32, 33 define the first lateral direction 31 and have a distance k from each other. In this form of embodiment, the sub-apertures 32, 33 each have a width b along the first lateral direction 31. The sample beam 70 impinges on the modulation device 20 and in front of the modulation device 20 has an intensity distribution 81, which can be Gaussian, for example. The radiation propagating through the transmission zones 21, 22 forms the shaped sample beam 79 with the two sub-beams 72, 73. Immediately behind the modulation device 20, the shaped sample beam 79 has an intensity distribution 82. The intensity distribution 81 of the sample beam 70 in front of the modulation device 20 and the intensity distribution 82 of the shaped sample beam 79 immediately behind the modulation device 20 are shown schematically in the right-hand part of FIG. 2 as beam profiles along the first lateral direction 31 for a Gaussian-shaped sample beam 70.

Figure 3:
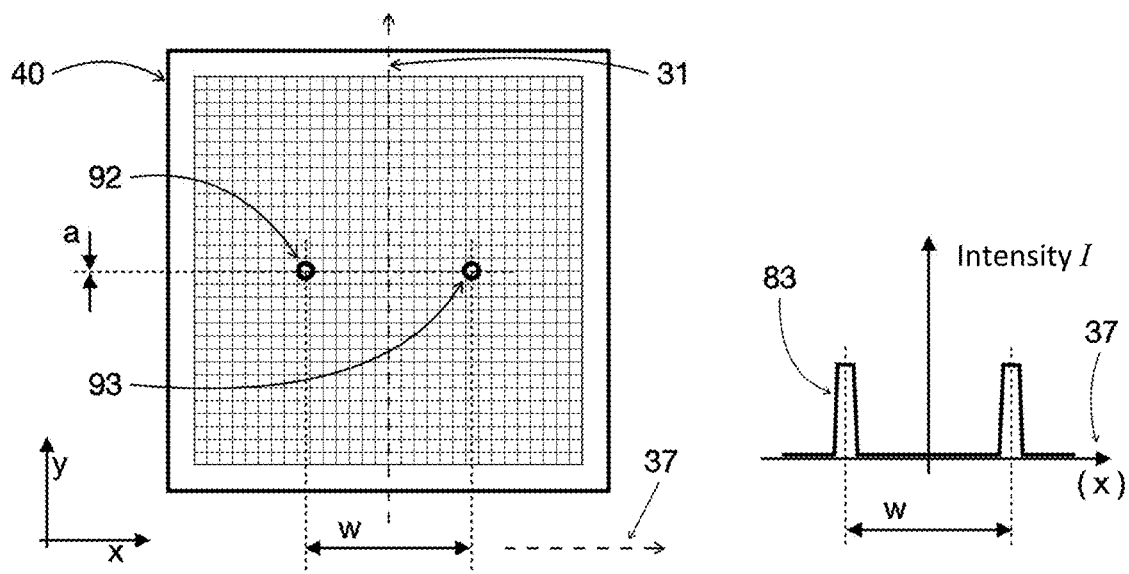
FIG. 3: shows a schematic, exemplary representation of beam spots on the detector of the beam analysis device, as well as a schematic representation of an intensity profile on the detector.

FIG. 3 is a schematic, exemplary representation of an intensity distribution on the detector 40 in a beam analysis device 10 in accordance with FIG. 1a or 1b. The intensity distribution on the detector 40 is composed of the beam spots 92, 93, which by virtue of the imaging are focussed, or approximately focussed, by means of the imaging device 50. The beam spots 92, 93 have a distance a from each other in the first lateral direction 31. In the exemplary distribution of the beam spots shown, the distance a is zero, but can have any value. The distance a alters when the axial position of the beam focus 71 alters. By virtue of the deflection of the sub-beams 72, 73 by means of the beam separator device 52, the beam spots 92, 93 have the distance w from each other in the second lateral direction 37. The distance w does not alter with an alteration in the axial position of the beam focus 71. In the right-hand part of FIG. 3, the intensity distribution 83 of the shaped sample beam 79 on the detector 40 is represented schematically as a beam profile along the second lateral direction 37. The two peaks in the beam profile of the represented intensity distribution 83 represent the beam spots 92, 93.

Figure 4:
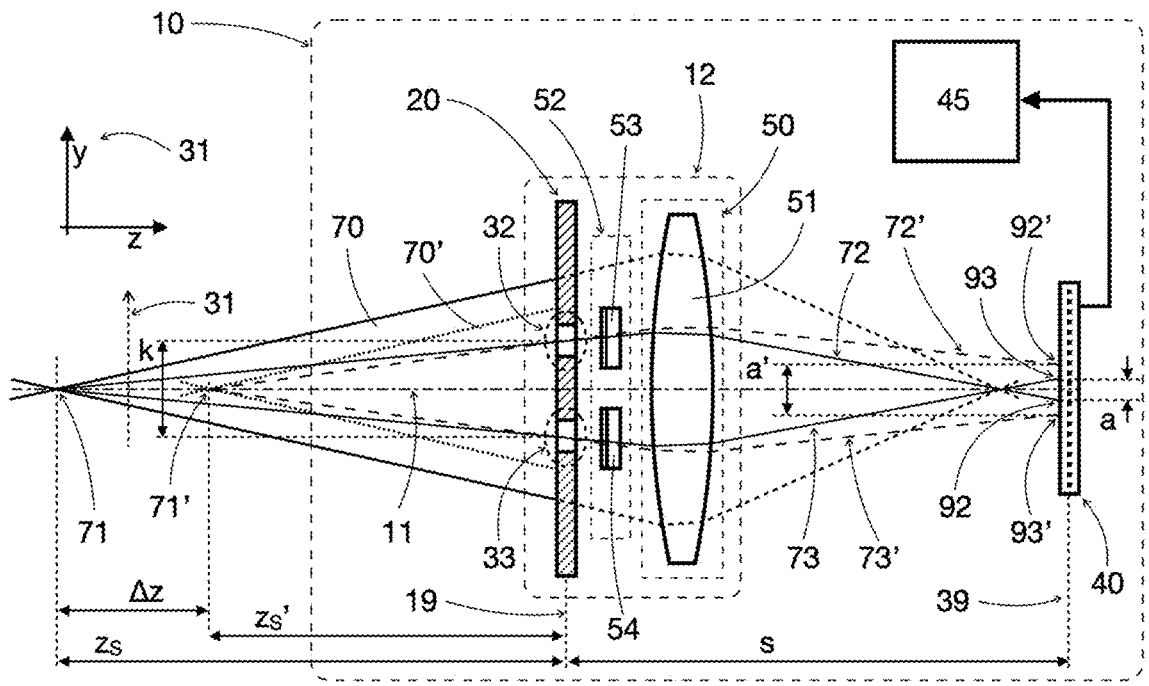
FIG. 4: shows a schematic representation of the beam analysis device as in FIG. 1a, with an additional representation of the beam path with an altered focal position.

FIG. 4 shows the same beam analysis device 10 as in FIG. 1a. In this respect, reference is made to the description of FIG. 1a for an explanation of FIG. 4. FIG. 4 additionally illustrates the alteration in the distance a between the beam spots 92, 93 on the detector 40 when the axial position of the beam focus 71 is altered. In order not to impair the clarity of the representation, the sub-beams 72, 73 are not represented in FIG. 4 with their edge beams formed at the edges of the sub-apertures 32, 33, but only with their beams through the respective centre points of the sub-apertures 32, 33. The points of impingement on the detector 40 of the beams through the centre points of the sub-apertures 32, 33 represent the positions of the beam spots 92, 93. The apostrophised reference symbols in FIG. 4 indicate the details altered by the displacement of the beam focus 71. An alteration in the beam focal position by $\Delta z = z_s - z_s'$ causes an alteration in the spacing of the beam spots 92, 93 by $\Delta a = a' - a$.

Figure 5:
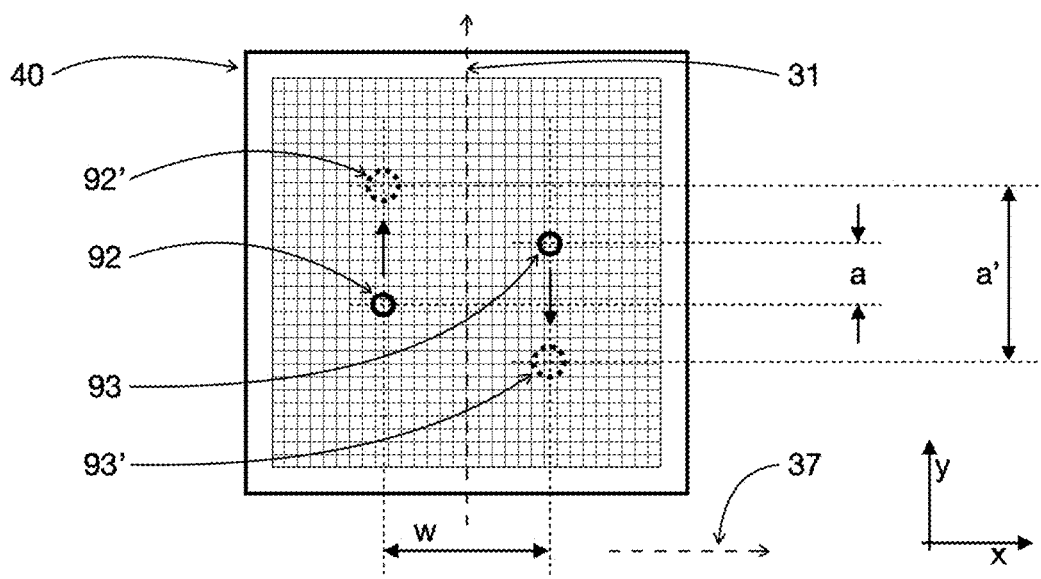
FIG. 5: shows a schematic, exemplary representation of beam spots on the detector with additional representation of the alteration in the position of the beam spots when the focal position is altered.

In a similar manner to FIG. 3, FIG. 5 shows schematically the intensity distribution with the beam spots 92, 93 on the detector 40 for a beam analysis device 10 in accordance with FIG. 1a, 1b or 4, which is fitted with a modulation device 20 as shown in FIG. 2. FIG. 5 additionally illustrates the alteration of the distance a between the beam spots 92, 93 on the detector 40 when the axial position of the beam focus 71 is altered. The apostrophised reference signs in the figure indicate the details altered by the axial displacement of the beam focus. The beam spots 92, 93 have a distance a from each other in the first lateral direction 31. The distance a alters to the distance a', for example, when the axial position of the beam focus 71 is altered. In the second lateral direction 37, the beam spots 92, 93 have the distance w from each other by virtue of the deflection of the sub-beams 72, 73 by means of the beam separator device 52, which distance does not alter when the axial position of the beam focus 71 alters. The distance w is independent of the axial position of the beam focus 71. The positions of the beam spots 92, 93 on the detector 40 thus run on two paths separated from each other by the distance w when the axial beam focal position is varied. Thus, the assignment of the beam spots is always unambiguous and both the magnitude of an alteration and also the direction of the alteration can be unambiguously determined.

Figure 6:
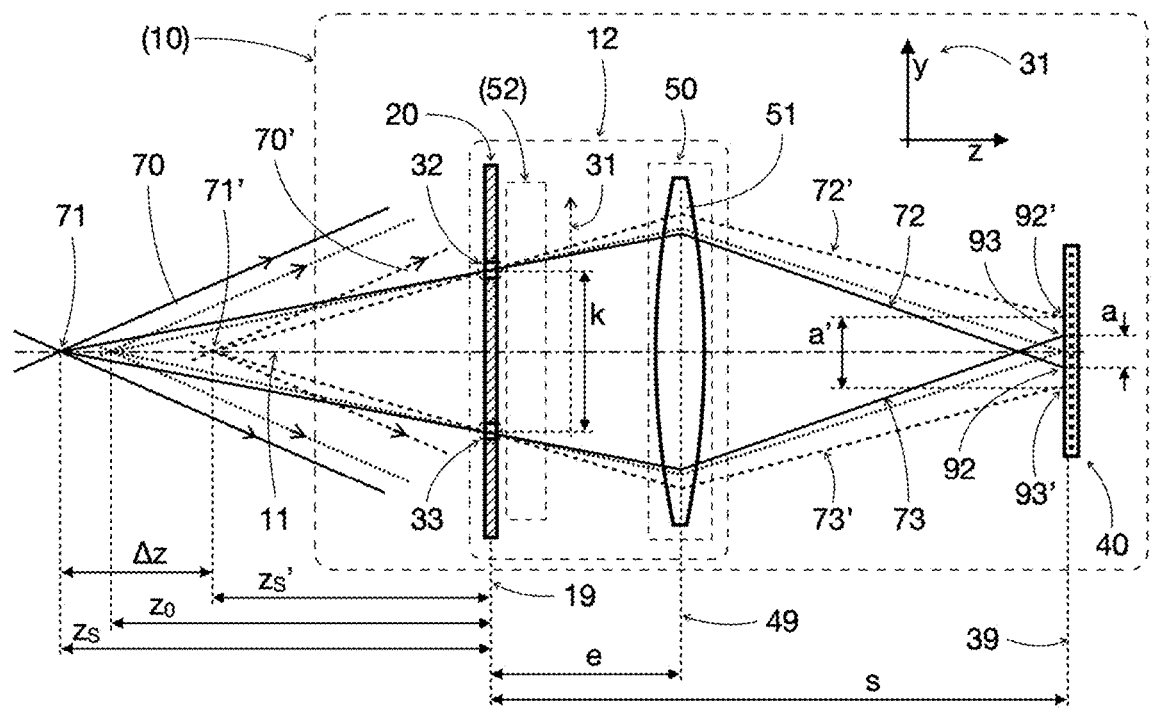
FIG. 6: shows a schematic, incomplete representation of a beam analysis device with the modulation device arranged in front of the imaging device. Only those elements that are essential for determining the focal position are shown.

FIG. 6 shows the geometrical quantities and relationships that influence the functional relationship of the distance a between the beam spots 92, and 93 to the axial position of the beam focus 71, that is to say, the elements that are essential for determining the focal position are represented. The reference symbols 10 and 52 are set in brackets because not all elements of the beam analysis device 10 are represented. Otherwise, the beam analysis device 10 shown here corresponds to the device shown in FIG. 1a, wherein the modulation device 20 is arranged in front of the lens 51 of the imaging device 50 in the beam direction. In the figure, the following quantities are shown with the formula symbols defined below:

a is the distance along the first lateral direction 31 between the beam spots 92 and 93 on the detector 40;

a' is the distance along the first lateral direction between the beam spots 92' and 93' on the detector 40 when the beam focal position is altered;

k is the distance between the centre points of the sub-apertures 32, 33 in the plane of the sub-beam release 19, wherein the imaginary line connecting the centre points of the sub-apertures 32, 33 defines the first lateral direction 31;

$z_s$ is the distance between the axial position of the beam focus 71 and the plane of the sub-beam release 19;

$z_s'$ is the distance between the axial position of a displaced beam focus 71' and the plane of the sub-beam release 19;

$\Delta z$ is the alteration in the axial beam focal position, $\Delta z = z_s - z_s'$;

$z_0$ is the distance from the beam focus to the plane of sub-beam release 19 in the event that the image plane of the beam focus just coincides with the sensor plane 39 of the detector 40 when imaged with the imaging device 50;

s is the distance between the plane of the sub-beam release 19 and the sensor plane 39 of detector 40;

e is the distance from the plane of the sub-beam release 19 to the position of the imaging device 50, or more precisely, to the principal plane of the imaging device 50.

Figure 7:
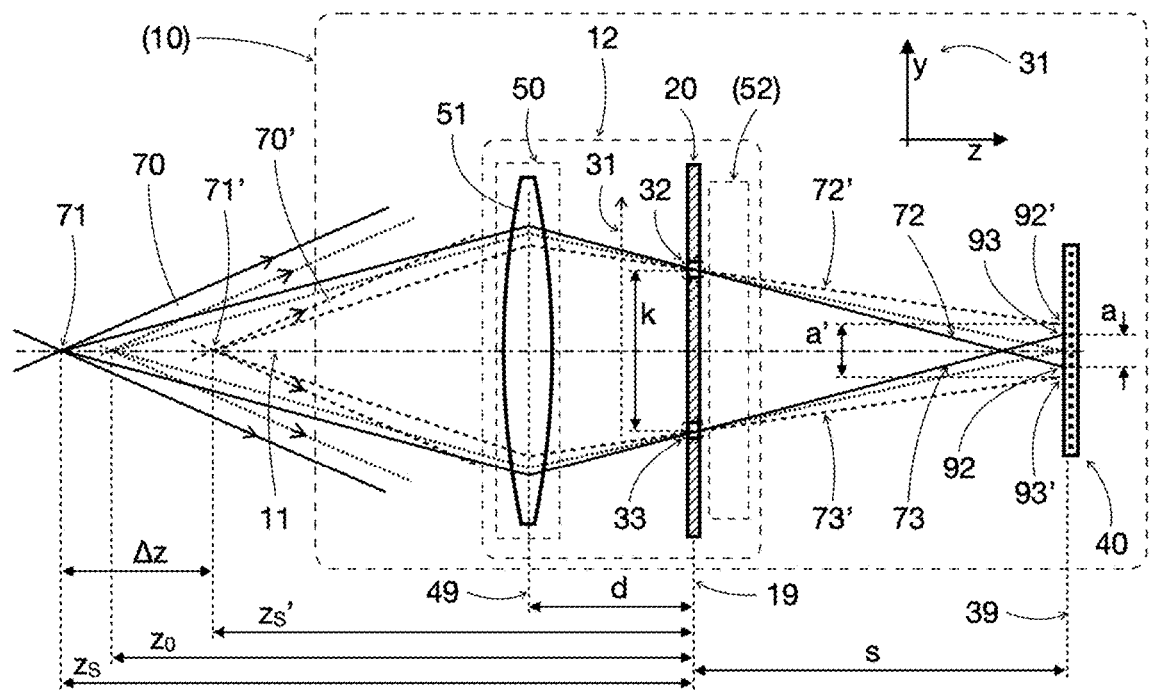
FIG. 7: shows a schematic, incomplete representation of a beam analysis device with the modulation device located behind the imaging device. Only those elements that are essential for determining the focal position are shown.

FIG. 7 shows, as in FIG. 6, the geometric quantities and relationships that determine the functional relationship of the distance a between the beam spots 92, and 93 to the axial position of the beam focus 71. In contrast to FIG. 6, here the modulation device 20 is arranged behind the lens 51 of the imaging device 50 in the beam direction. A different formula symbol is defined for this case:

d is the distance from the position of the imaging device 50, more precisely from the principal plane of the imaging device 50, to the plane of the sub-beam release 19.

Figure 8:
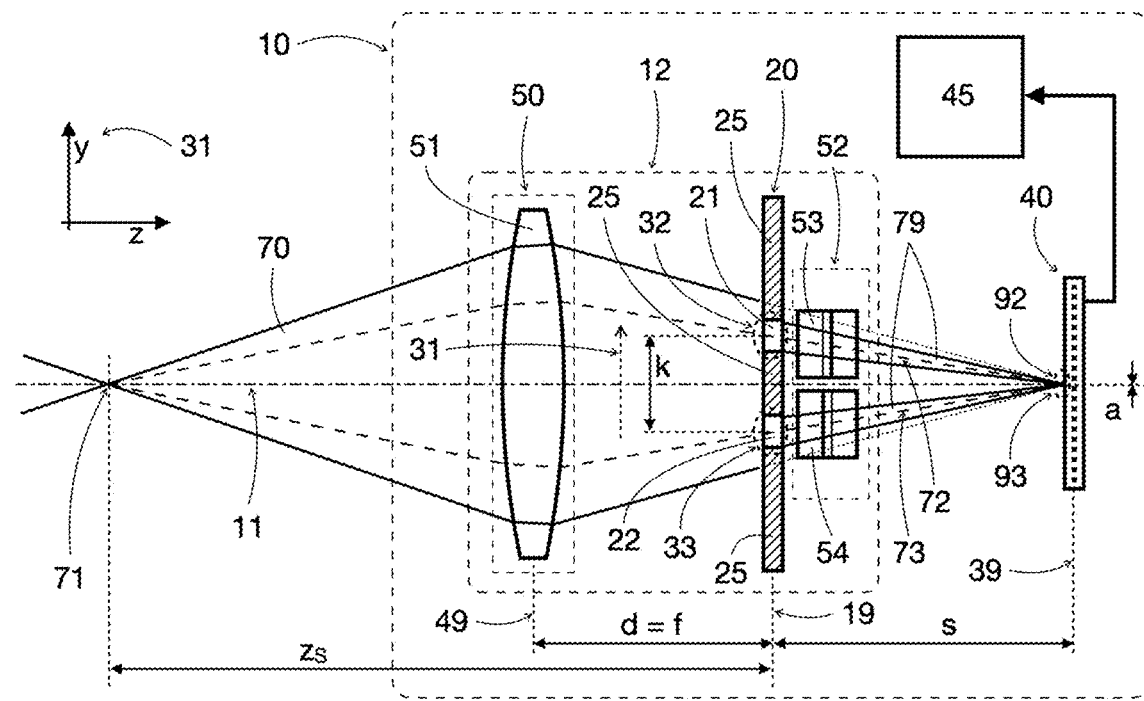
FIG. 8: shows a schematic representation of a variant of embodiment of the beam analysis device in which the modulation device is arranged in the focal plane of the imaging device.
Figure 8:
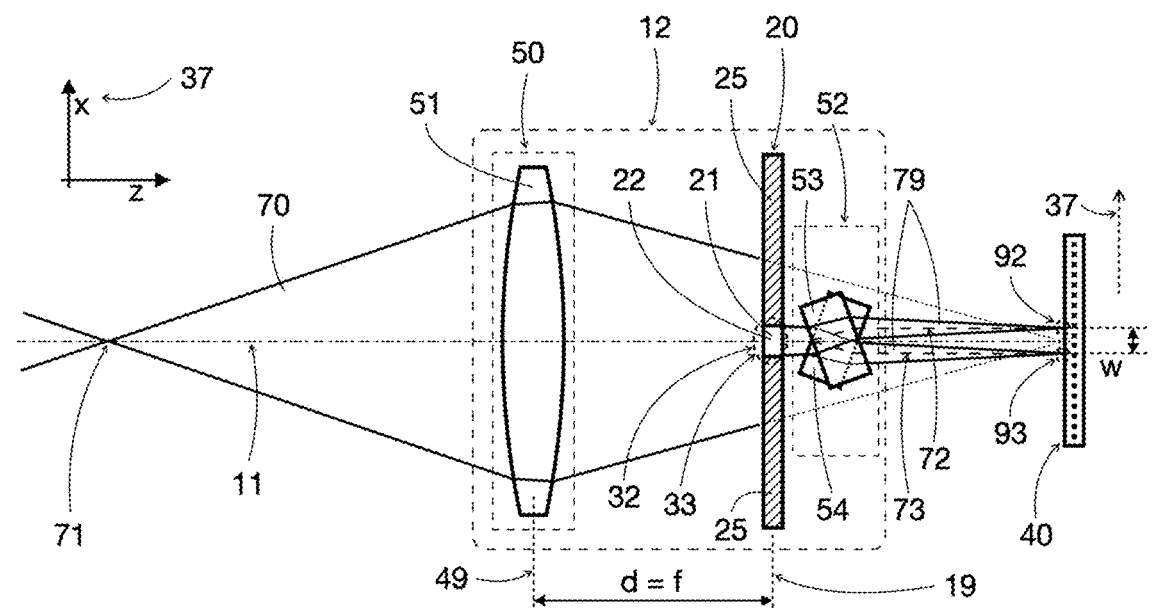

FIG. 8 shows a variant of embodiment of the beam analysis device 10 similar to the beam analysis device 10 of FIG. 1a, with the following differences: the modulation device 20 is arranged behind the lens 51 of the imaging device 50 in the beam direction; in particular, the distance d from the principal plane of the imaging device 50 to the plane of the sub-beam release 19 is equal to the focal length f, where f is the focal length of the imaging device 50. In other words, the plane of the sub-beam release 19 is located at the image-side focal point (second focal point) of the imaging device 50. In this arrangement, the alteration of the distance $\Delta a = a' - a$, that is to say, the alteration of the position difference between the beam spots 92, 93 in the first lateral direction 31, is exactly proportional to the alteration of the axial beam focal position $\Delta z$. The calculation formula for this case is:

$$\Delta z = \Delta a f^2 / (sk)$$

This simple linear relationship simplifies the calibration of the device and a particularly high accuracy of the focal position determination can be achieved.

Furthermore, FIG. 8 shows a further variant of embodiment of the beam separator device 52 in contrast to the beam analysis device 10 of FIG. 1a. The exemplary variant of the beam separator device 52 shown here comprises two plane plates as sub-beam deflection elements 53, 54. The plane plates 53, 54 are arranged in alignment in front of or, in this case, behind the respective sub-apertures 32, 33 in the beam direction, and are inclined at an angle opposed to each other so that the two sub-beams 72, 73 are offset from each other in the second lateral direction 37. Plane plates are usually less expensive than wedge plates; moreover, the distance w between the beam spots 92, 93 in the second lateral direction 37 can be adjusted by the angle of inclination of the plane plates. All other elements shown correspond to the description of FIG. 1a.

Figure 9:
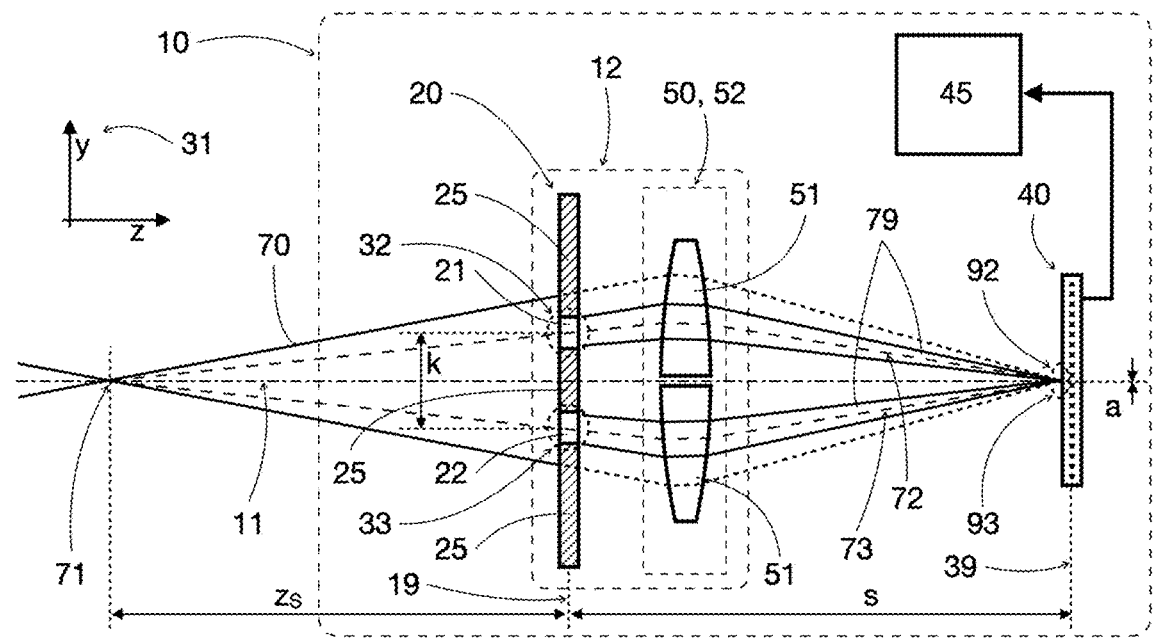
FIG. 9: shows a schematic representation of a variant of embodiment of the beam analysis device, in which the imaging device and the beam separator device are implemented in a common arrangement.
Figure 9:
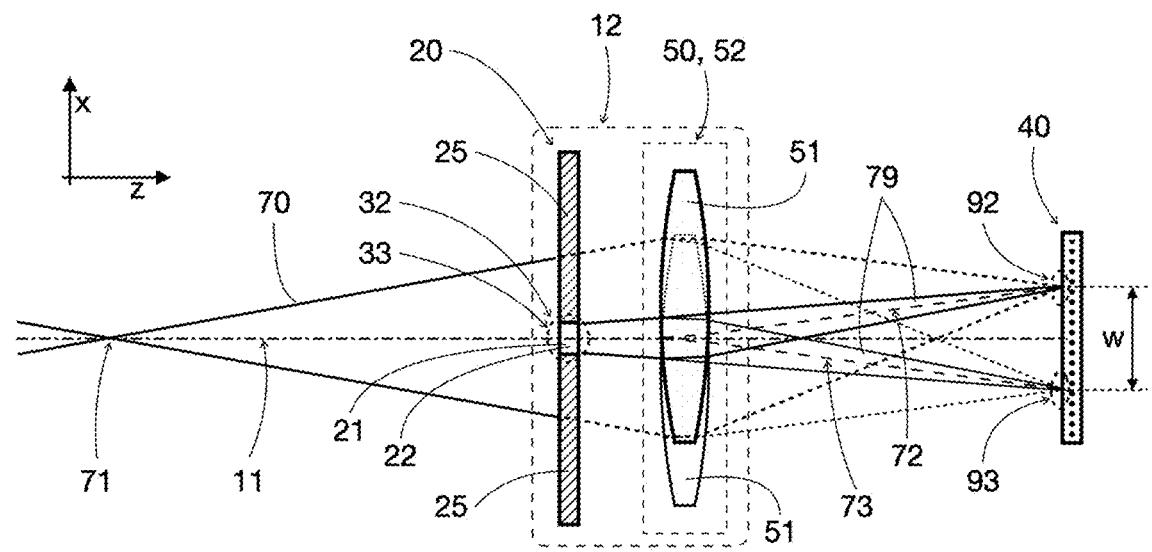

FIG. 9 shows a beam analysis device 10 similar to FIG. 1a, in which the imaging device 50 and the beam separator device 52 are implemented in a common arrangement. For this purpose, the lens 51 contained in the imaging device 50 is divided into two halves and the two lens halves are displaced relative to each other in a direction at right angles to the first lateral direction 31 defined by the distance k. All other elements shown correspond to the description of FIG. 1a.

Figure 10:
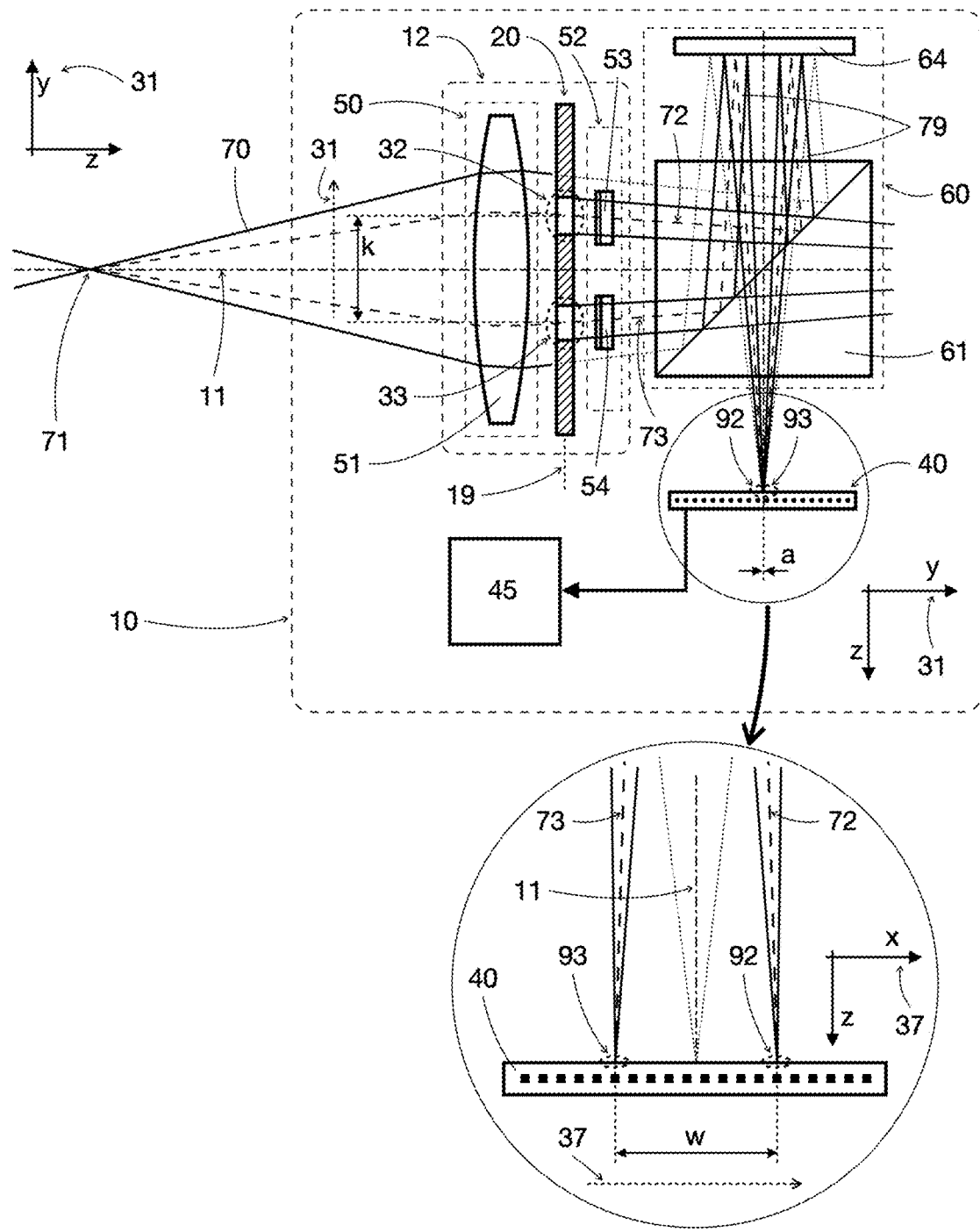
FIG. 10: shows a schematic representation of a further form of embodiment of the beam analysis device with a beam folding device.

FIG. 10 shows a further embodiment of the beam analysis device 10 in accordance with the invention. The beam analysis device 10 is here additionally fitted with a beam folding device 60 and otherwise corresponds to FIG. 1a. The beam folding device 60 comprises a beam splitter 61 and a mirror 64. In this example, the beam folding device 60 is arranged behind the beam shaping device 12. By means of the beam splitter 61, which can, for example, be a beam splitter cube, a radiation component of the shaped sample beam 79 is deflected. The deflected beam component impinges on the mirror 64 and is reflected by the mirror 64 back into the beam splitter 61. The beam is folded by the back reflection with the mirror 64, thus forming a first folded beam path. After passing through the beam splitter 61 again, the shaped sample beam 79 impinges on the detector 40. The region circled around the detector 40 in the figure is shown as an enlarged detail in the lower part of the figure, wherein the detail below is a representation in the x-z plane, that is to say, it shows the plane at right angles to the plane of the upper part of the figure.

By virtue of the deflection of the shaped sample beam 79 by the beam folding device 60, the direction of the local optical axis 11 alters. Thus in this case, the first lateral direction 31 in the region of the detector 40 does not point in the same direction as the first lateral direction 31 defined by the distance k in the plane of the sub-beam release 19 when viewed globally. The first lateral direction 31 is always to be understood in relation to the local coordinates of the sample beam 70, 79. The local coordinates of the sample beam 70, 79 are always oriented relative to the local optical axis 11. The local optical axis 11 always forms the z-axis of the local coordinates. Thus, the first lateral direction 31 is always oriented at right angles, that is to say, laterally, to the local optical axis 11, that is to say, to the local z-axis. The same applies in an analogous manner to the second lateral direction 37; the second lateral direction 37 is also always to be understood in relation to the local coordinates of the sample beam 70, 79. Accordingly, both the first lateral direction 31 and the second lateral direction 37 are always oriented at right angles to the local optical axis, and the second lateral direction 37 is always oriented transversely to the first lateral direction 31. The local optical axis and local z-axis can even be exactly reversed by reflection, for example at the mirror 64. Here the first lateral direction 31 and the second lateral direction 37 alter accordingly.

The first lateral direction 31 is causally defined by the imaginary connection of the centre points of the sub-apertures 32, 33, that is to say, by the distance k, and ensues from a beam redirection corresponding to the alteration of the local optical axis 11.

The beam folding device 60 enables a compact, space-saving design of the beam analysis device 10. All other elements shown in FIG. 10 correspond to the description of FIG. 1a.

Figure 11A:
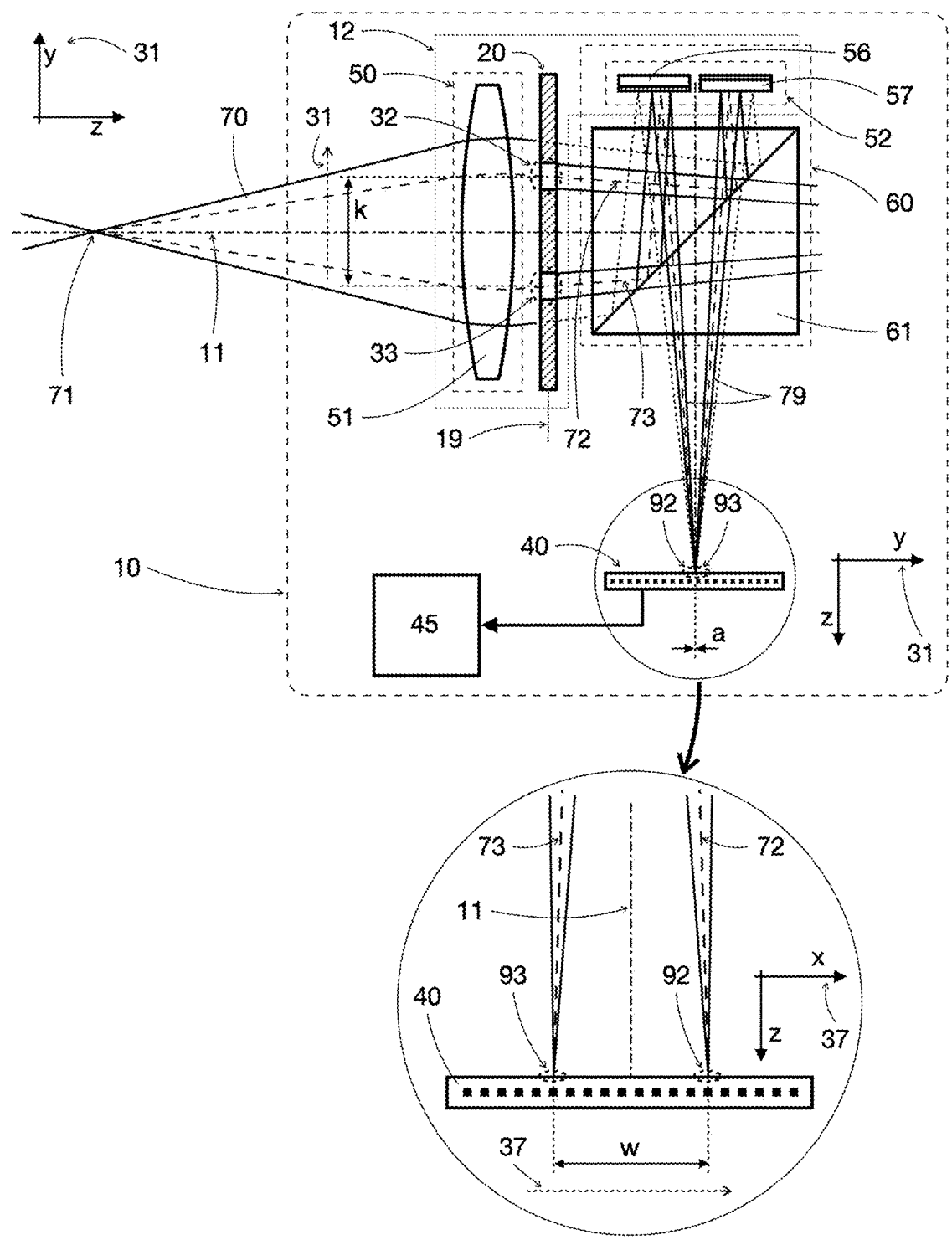
FIG. 11a: shows a schematic representation of a further form of embodiment of the beam analysis device with an arrangement of the beam separator device in the folded beam path.

FIG. 11a shows a beam analysis device 10 similar to FIG. 1a and to FIG. 10 with an additional beam folding device 60. The beam folding device 60 here comprises a beam splitter 61 and two mirrors 56, 57. In this example of embodiment, the beam folding device 60 is arranged behind the modulation device 20. By means of the beam splitter 61, radiation components of the released sub-beams 72, 73 are deflected. Of the deflected radiation components, one sub-beam 72, 73 in each case impinges on one of the mirrors 56, 57. The two mirrors 56, 57 reflect the sub-beams 72, 73 back into the beam splitter 61. A first folded beam path is formed by the back reflection with the mirrors 56, 57. The two mirrors 56, 57 are inclined at a small angle to each other and in this way at the same time form the beam separator device 52. For this purpose, the difference between the normal directions on the mirror surfaces of the mirrors 56, 57 is aligned along the second lateral direction 37. The angular difference between the normal directions on the mirror surfaces of the mirrors 56, 57 can, for example, be in a range from 0.01° to 3°. After passing through the beam splitter 61 once again, the two deflected sub-beams 72, 73 are directed onto the detector 40 as a shaped sample beam 79. Mirrors are usually less expensive than wedge plates; moreover, the distance w between the beam spots 92, 93 in the second lateral direction 37 can be adjusted by the angle of inclination of the mirrors 56, 57. All other elements shown are as described in FIG. 1a and FIG. 10.

Figure 11B:
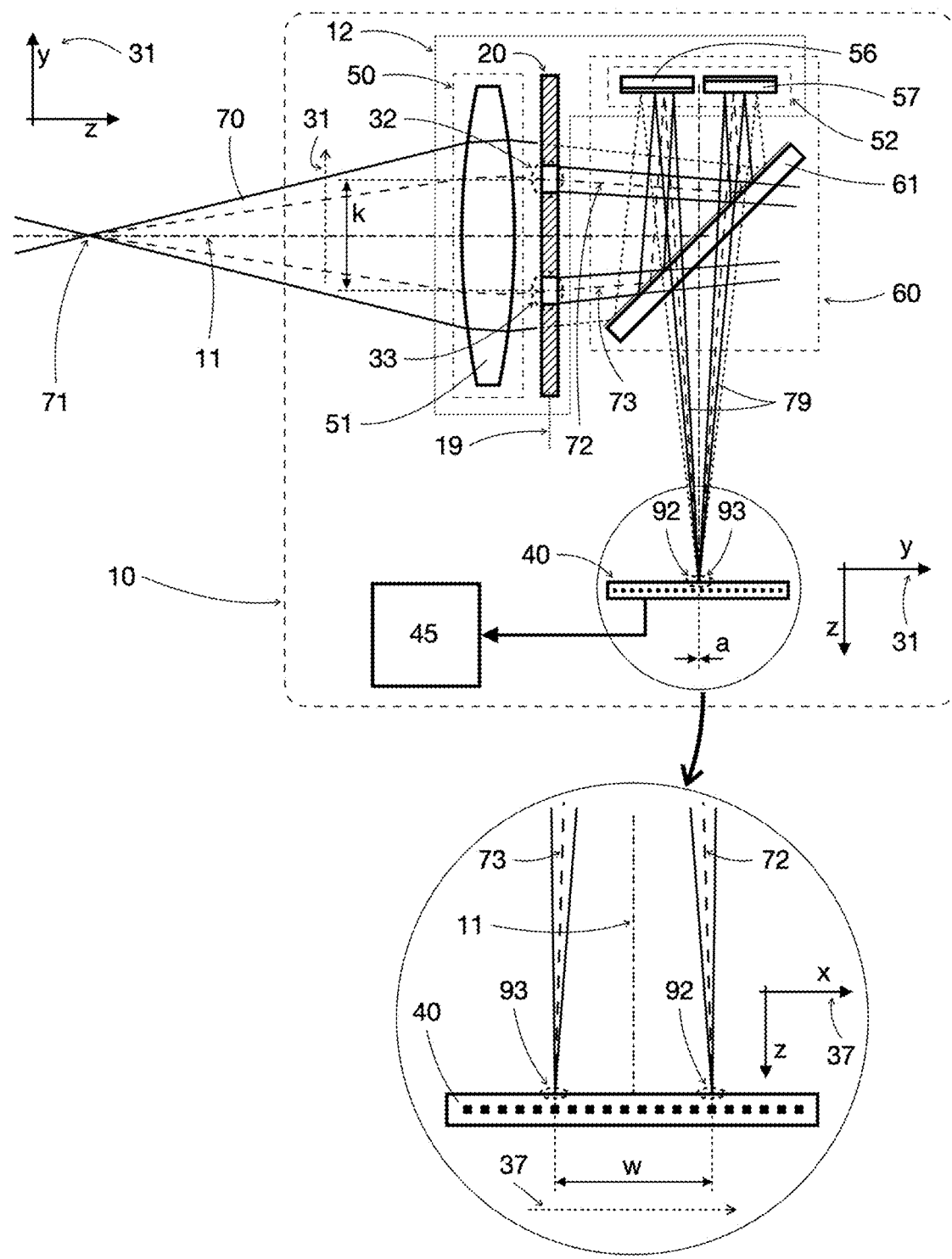
FIG. 11b: shows a schematic representation of a further form of embodiment of the beam analysis device with an arrangement of the beam separator device in the folded beam path and use of an alternative beam splitter.

FIG. 11b shows the same beam analysis device 10 as FIG. 11a. FIG. 11b shows by way of example that the beam splitter 61 of the beam folding device 60 can be designed not only as a beam splitter cube, but also as a beam splitter mirror, or a beam splitter plate. All other elements shown correspond to the descriptions of FIG. 1a, FIG. 10 and FIG. 11a.

Figure 12:
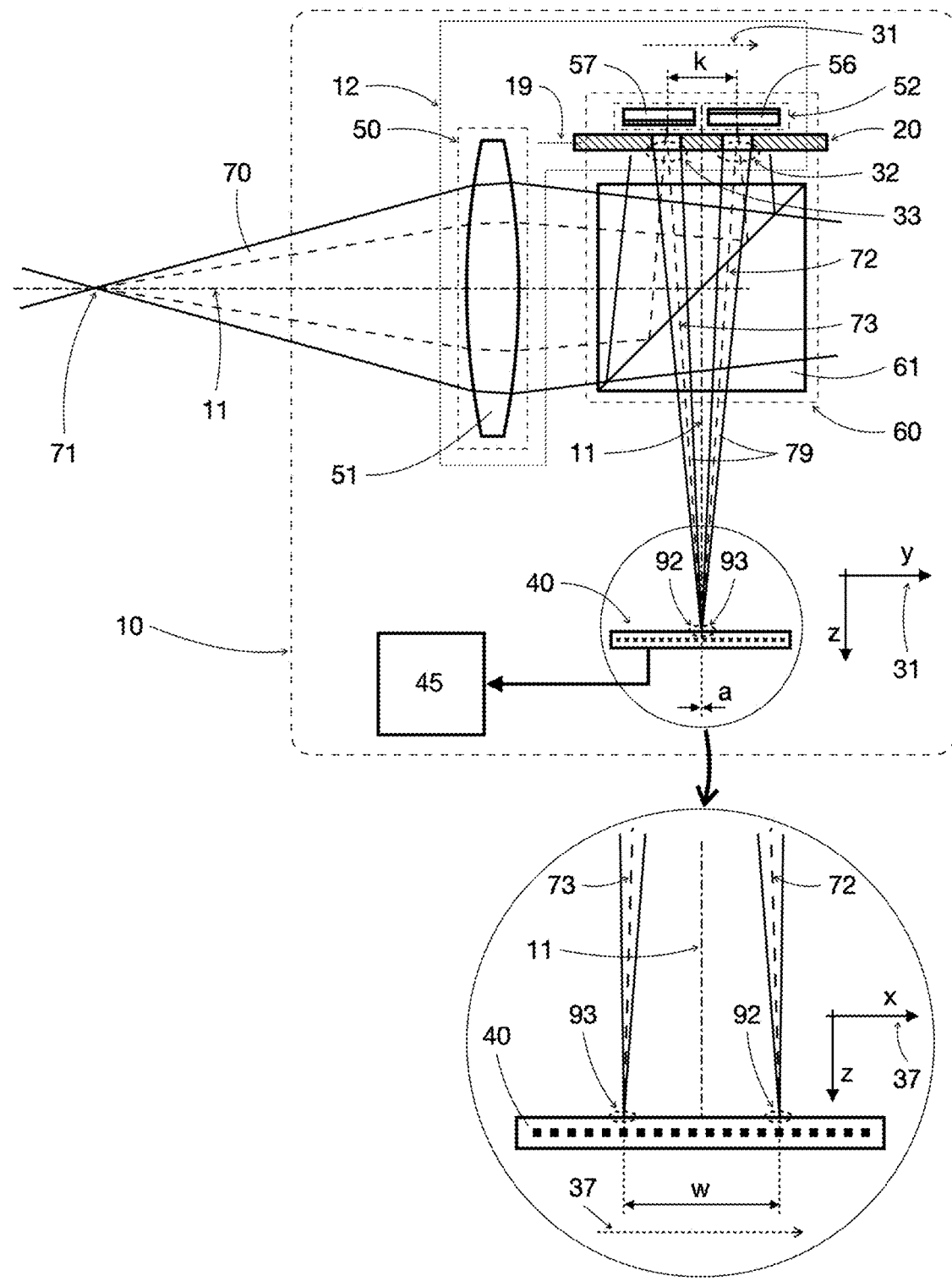
FIG. 12: shows a schematic representation of a further form of embodiment of the beam analyser with the modulation device and the beam separator device arranged in the folded beam path.

FIG. 12 shows a beam analysis device 10 similar to FIG. 11a. In contrast to the example of embodiment of FIG. 11a, the modulation device 20 is not arranged in front of the beam folding device 60, but within the beam folding device 60 in the folded beam path, in approximately the same plane as the mirrors 56, 57. All other elements shown correspond to the descriptions of FIG. 1a, FIG. 10 and FIG. 11a.

Figure 13:
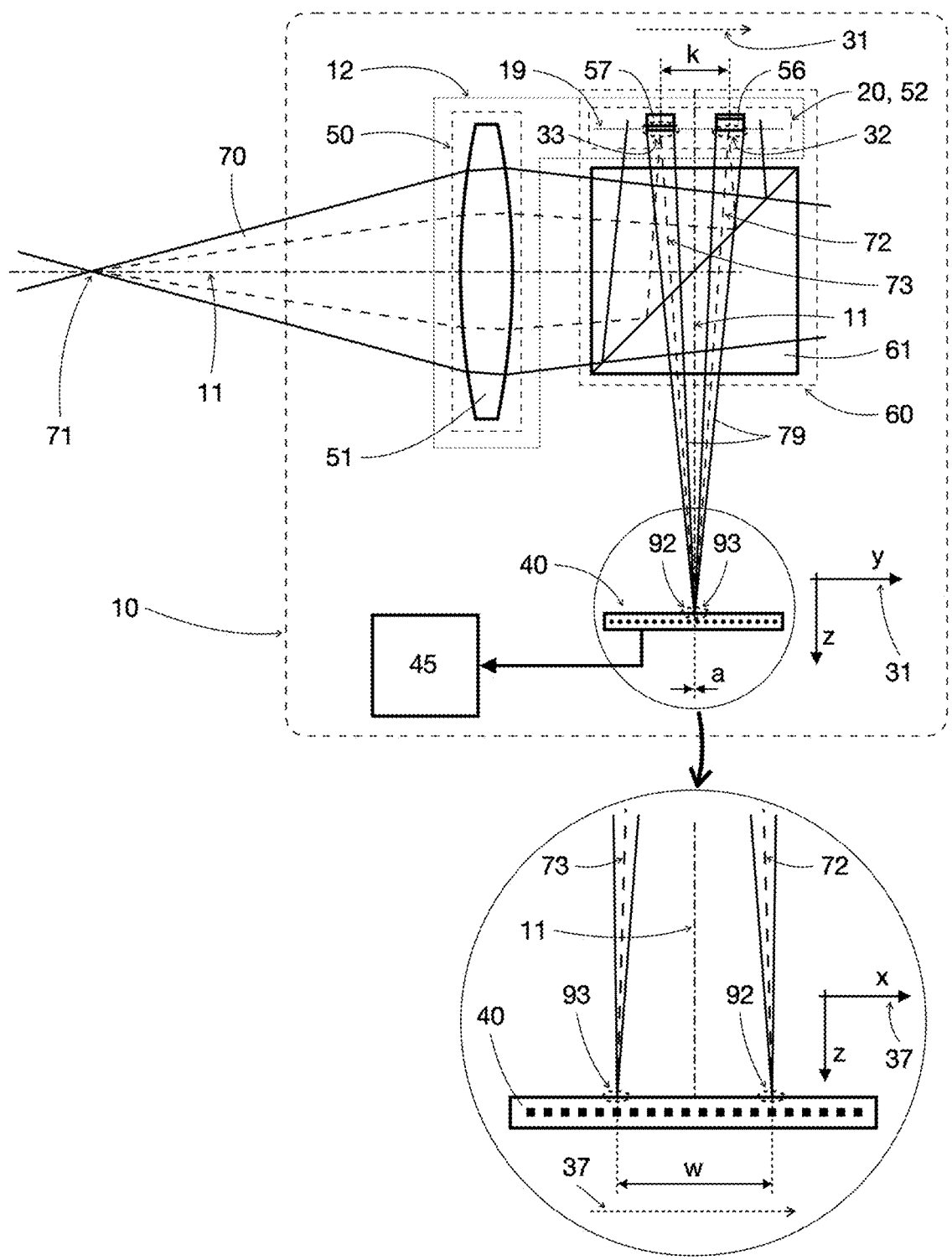
FIG. 13: shows a schematic representation of a further form of embodiment of the beam analysis device, in which the modulation device and the beam separator device are implemented in a common arrangement.

FIG. 13 shows a beam analysis device 10 that is similar to FIG. 12. In contrast to the example of embodiment of FIG. 12, the modulation device 20 arranged in the folded beam path is here also designed as a beam separator device 52. Here the modulation device 20 is formed by the mirrors 56, 57. The mirrors 56, 57 at the same time form the beam separator device 52, and are at the same time part of the beam folding device 60. The edges of the mirrors 56 and 57 here form the sub-apertures 32, 33. The release of the sub-beams 72, 73 in this variant of embodiment thus takes place through the reflection of the radiation within the sub-apertures 32, 33 or the mirrors 56, 57, while the radiation outside the sub-apertures 32, 33 is not reflected and thus does not contribute to the intensity distribution on the detector 40. As in the variant of embodiment of FIG. 11a, the difference between the normal directions on the mirror surfaces of the mirrors 56, 57 along the second lateral direction 37 is aligned to form the distance w of the beam spots 92, 93 on the detector 40 in the second lateral direction 37. All other elements shown correspond to the descriptions of FIG. 1a, FIG. 10 and FIG. 11a.

Figure 14:
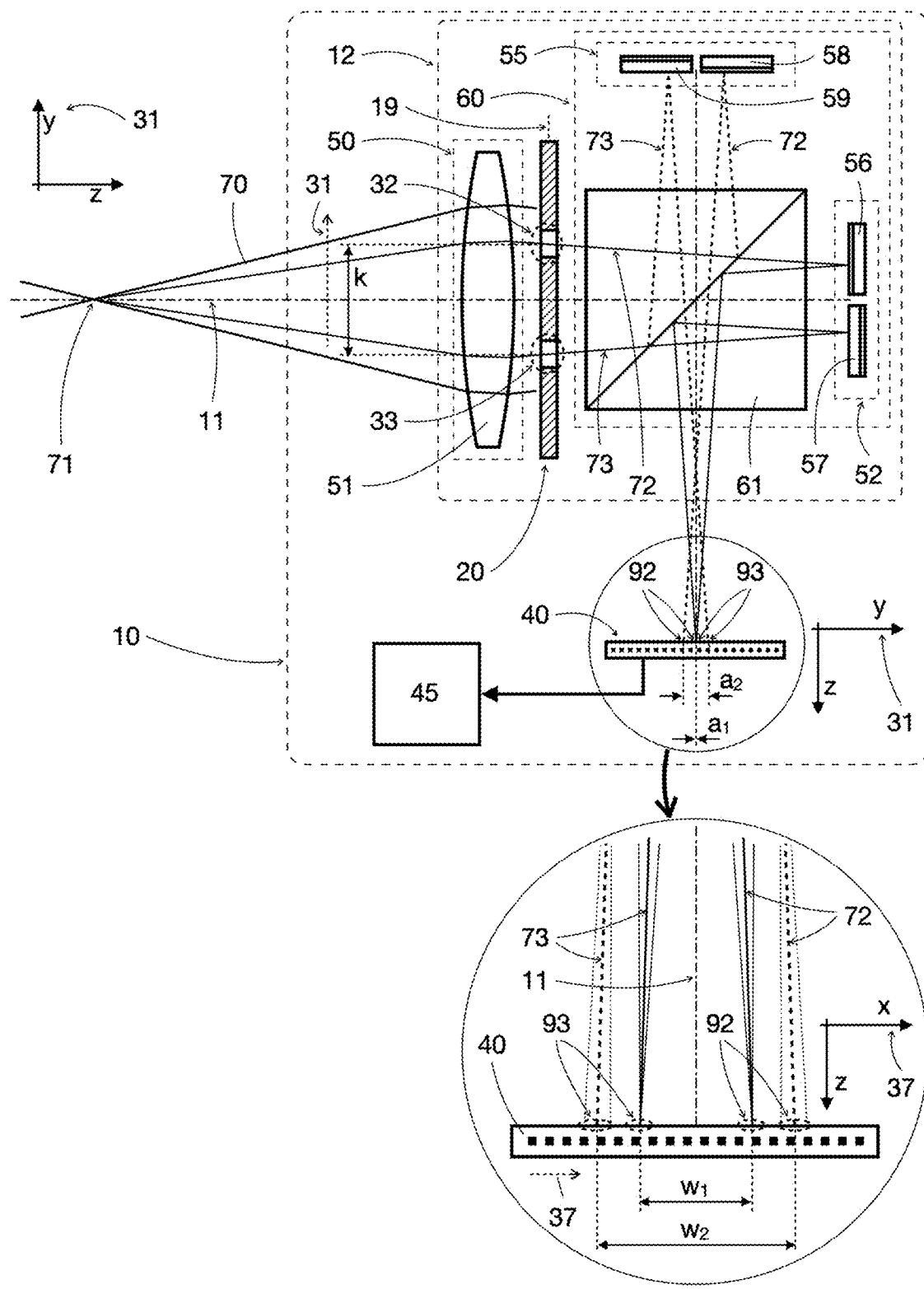
FIG. 14: shows a schematic representation of a further form of embodiment of the beam analysis device with a beam folding device for purposes of forming two different beam paths onto the detector.

FIG. 14 shows a beam analysis device 10 similar to FIG. 11a with a beam folding device 60 comprising a beam splitter 61 and two mirrors 56, 57, wherein the mirrors 56, 57 at the same time form the beam separator device 52. In the example shown here, the beam folding device 60 is further utilised to form in addition a second folded beam path to the detector 40. For this purpose, a second beam component of the sub-beams 72, 73 emanating from the beam splitter 61 is reflected back by means of a further pair of mirrors 58, 59 forming a second beam separator device 55, and the beam components of the sub-beams 72, 73 from both folded beam paths are again superimposed onto a common propagation path to the detector 40 by means of the same beam splitter 61. The sub-beams 72, 73 can thus each form two beam spots, that is to say, a first pair of beam spots 92, 93 via the first folded beam path, and a second pair of beam spots 92, 93 via the second folded beam path, so that a maximum of 4 beam spots can be formed on the detector 40. The beam spots 92, 93 imaged via the first folded beam path have a spacing $a_1$ in the first lateral direction, and the beam spots 92, 93 imaged via the second folded beam path have a spacing $a_2$ in the first lateral direction. By means of the beam separator device 52 in the first folded beam path, a distance $w_1$ is formed in the second lateral direction 37 between the beam spots 92, 93 imaged via the first folded beam path. Correspondingly, by means of the second beam separator device 55 in the second folded beam path, a distance $w_2$ is formed in the second lateral direction 37 between the beam spots 92, 93 imaged via the second folded beam path. The lengths of the two folded beam paths can be chosen so as to be different. The choice of different beam path lengths can be used advantageously to increase the detection range of the beam analysis device 10 with respect to the alteration of the position of the beam focus 71, and/or to be able to use the beam analysis device 10 for sample beams 70 with different beam divergences at different beam focal positions, or distances $z_s$, from the plane of the sub-beam origin 19. All other elements shown in FIG. 14 correspond to the descriptions of FIG. 1a, FIG. 10 and FIG. 11a.

Figure 15A:
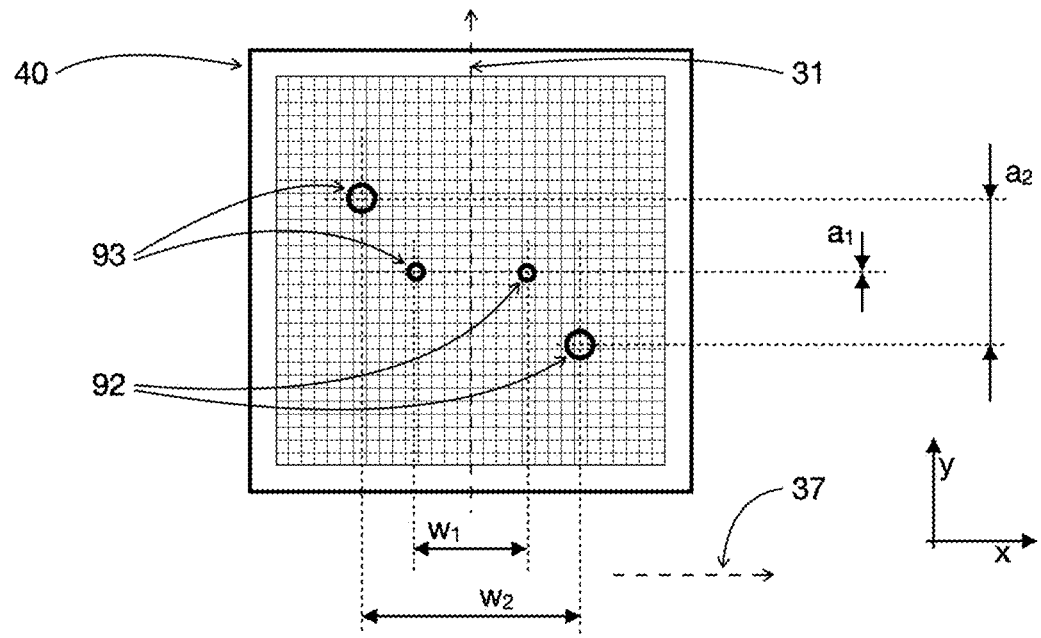
FIG. 15a: shows a schematic exemplary representation of beam spots on the detector for a variant of embodiment of the beam analysis device with two beam paths.

FIG. 15a is a schematic, exemplary representation of an intensity distribution on the detector 40 in a beam analysis device 10 with two folded beam paths in accordance with FIG. 14. The intensity distribution on the detector 40 is composed of two pairs of beam spots 92, 93. A first pair of beam spots 92, 93 has a distance $a_1$ from each other in the first lateral direction 31. The distance $a_1$ is zero in the spread of beam spots shown and alters when the axial position of the beam focus 71 alters. Due to the deflection of the sub-beams 72, 73 by means of the beam separator device 52, the first pair of beam spots 92, 93 have the distance $w_1$ from each other in the second lateral direction 37. The distance $w_1$ does not alter when the axial position of the beam focus 71 is altered. A second pair of beam spots 92, 93 have the distance $a_2$ from each other in the first lateral direction 31 and have the distance $w_2$ from each other in the second lateral direction 37 due to the deflection of the sub-beams 72, 73 by means of the second beam separator device 55. The distance $w_2$ does not alter when the axial position of the beam focus 71 alters.

Figure 15B:
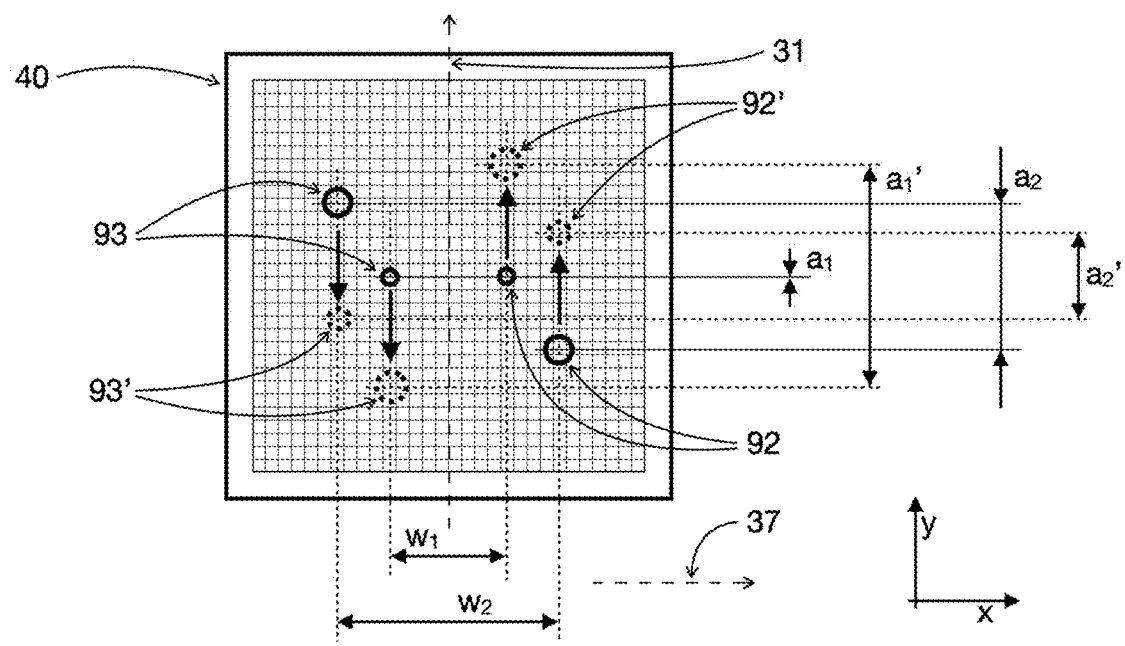
FIG. 15b: shows a schematic exemplary representation of beam spots on the detector for a variant of embodiment of the beam analysis device with two beam paths with additional representation of the alteration in the position of the beam spots when the focal position is altered.

FIG. 15b shows the same exemplary representation of an intensity distribution on the detector 40 in a beam analysis device 10 with two folded beam paths in accordance with FIG. 14 as FIG. 15a. FIG. 15b additionally illustrates the alteration in the distances $a_1$ and $a_2$ between the beam spots 92, 93 on the detector 40 when the axial position of the beam focus 71 is altered for both beam spot pairs. The apostrophised reference symbols in the figure indicate the details altered by the axial displacement of the beam focus. The first pair of beam spots 92, 93 have a distance $a_1$ from each other in the first lateral direction 31. The distance $a_1$ alters when the axial position of the beam focus 71 is altered, for example, to the distance In the second lateral direction 37, the first pair of beam spots 92, 93 have the distance $w_1$ from each other, which does not alter when the axial position of the beam focus 71 is altered. In the first lateral direction 31, the second pair of beam spots 92, 93 has the distance $a_2$ from each other and alters to the distance $a_2'$, for example, when the axial position of the beam focus 71 alters. In the second lateral direction 37, the second pair of beam spots 92, 93 have the distance $w_2$ from each other, which does not alter when the axial position of the beam focus 71 alters. The positions of both pairs of beam spots 92, 93 on the detector 40 thus run on four different paths when the axial beam focal position is varied. Thus, the assignment of the beam spots is always unambiguous and both the magnitude of an alteration and the direction of the alteration can be unambiguously determined.

Figure 16A:
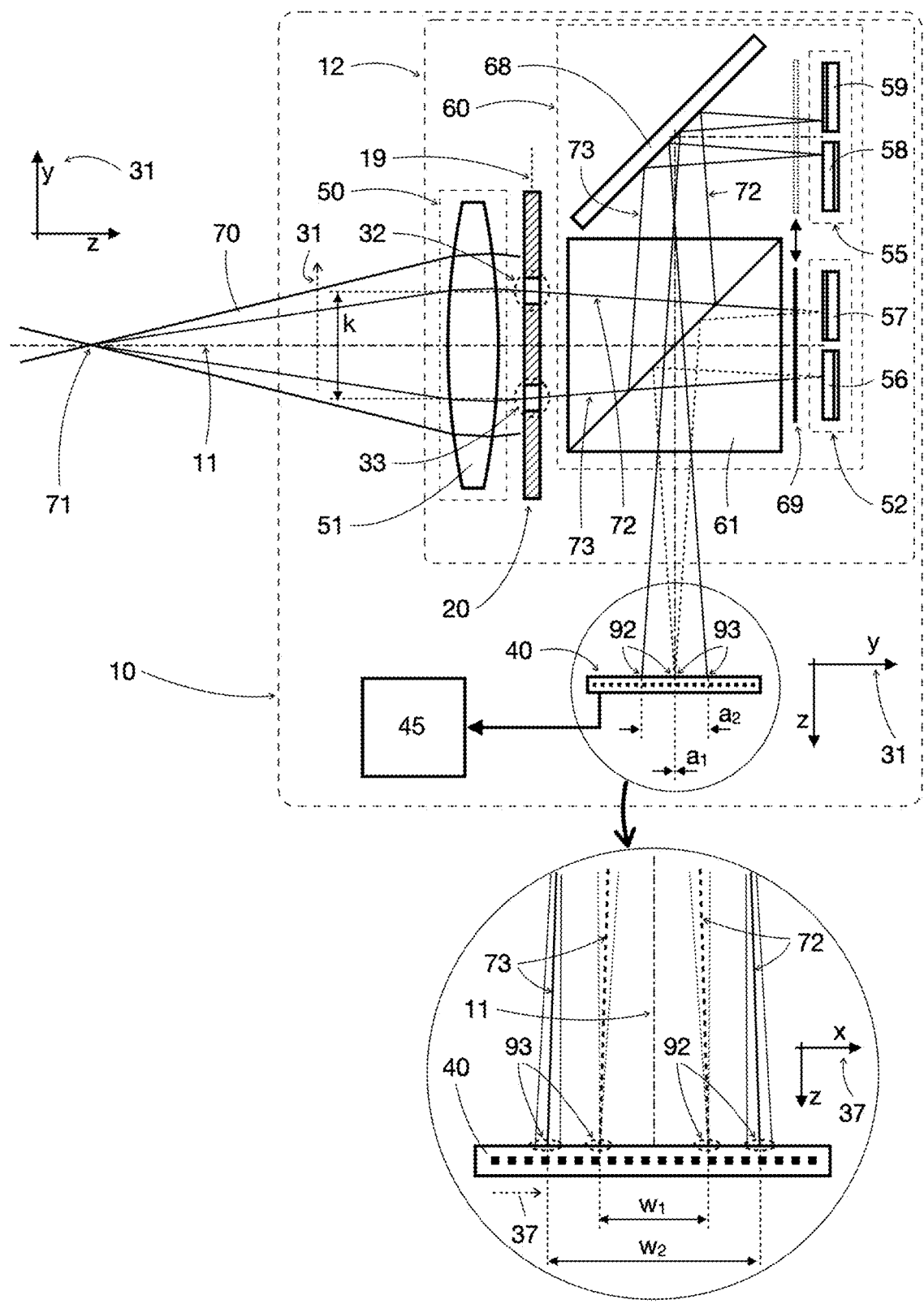
FIG. 16a: shows a schematic representation of a further form of embodiment of the beam analysis device with two beam paths onto the detector and an additional shutter device.

FIG. 16a shows a beam analysis device 10 which is essentially constructed in the same way as the beam analysis device in FIG. 14. The variant of embodiment shown in FIG. 16a additionally comprises a shutter device 69. By means of the shutter device 69, one of the two folded beam paths can optionally be optically blocked. In the embodiment example shown here, a deflecting mirror 68 is arranged in the second folded beam path, so that the two folded beam paths run partially in parallel. The shutter device 69 can then be implemented particularly simply as a linearly displaceable shutter, or as a shutter that can be pivoted about an axis. In this way, it can be controlled via which beam path the sub-beams 72, 73 are imaged onto the detector 40. This can be advantageous for reliable identification of the respective beam path pair 92, 93 on the detector 40. All other elements shown correspond to the descriptions of FIG. 1a, FIG. 10, FIG. 11a and FIG. 14.

Figure 16B:
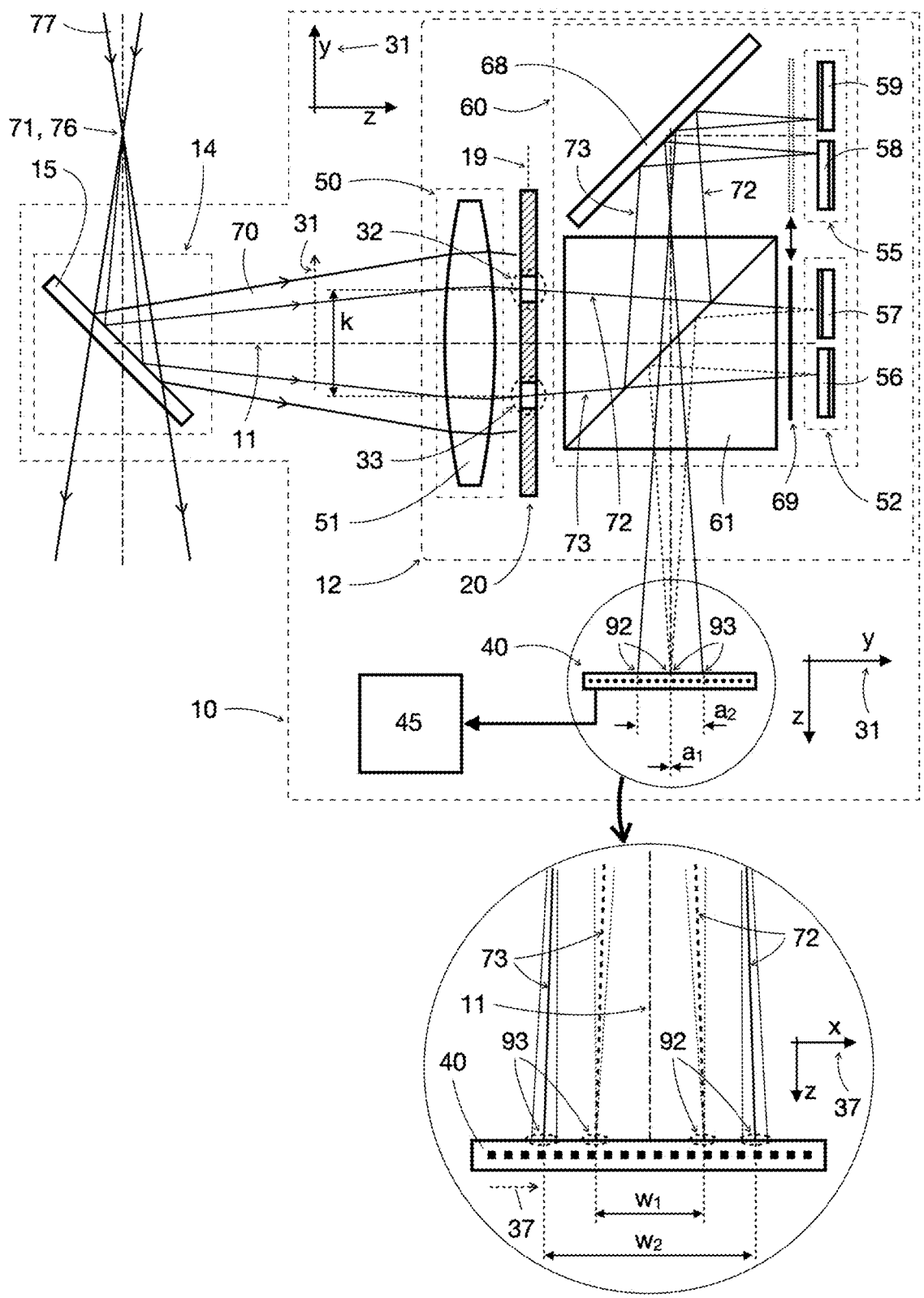
FIG. 16b: shows a schematic representation of a further variant of embodiment of the beam analysis device similar to FIG. 16a with an additional decoupling device.
Figure 16C:
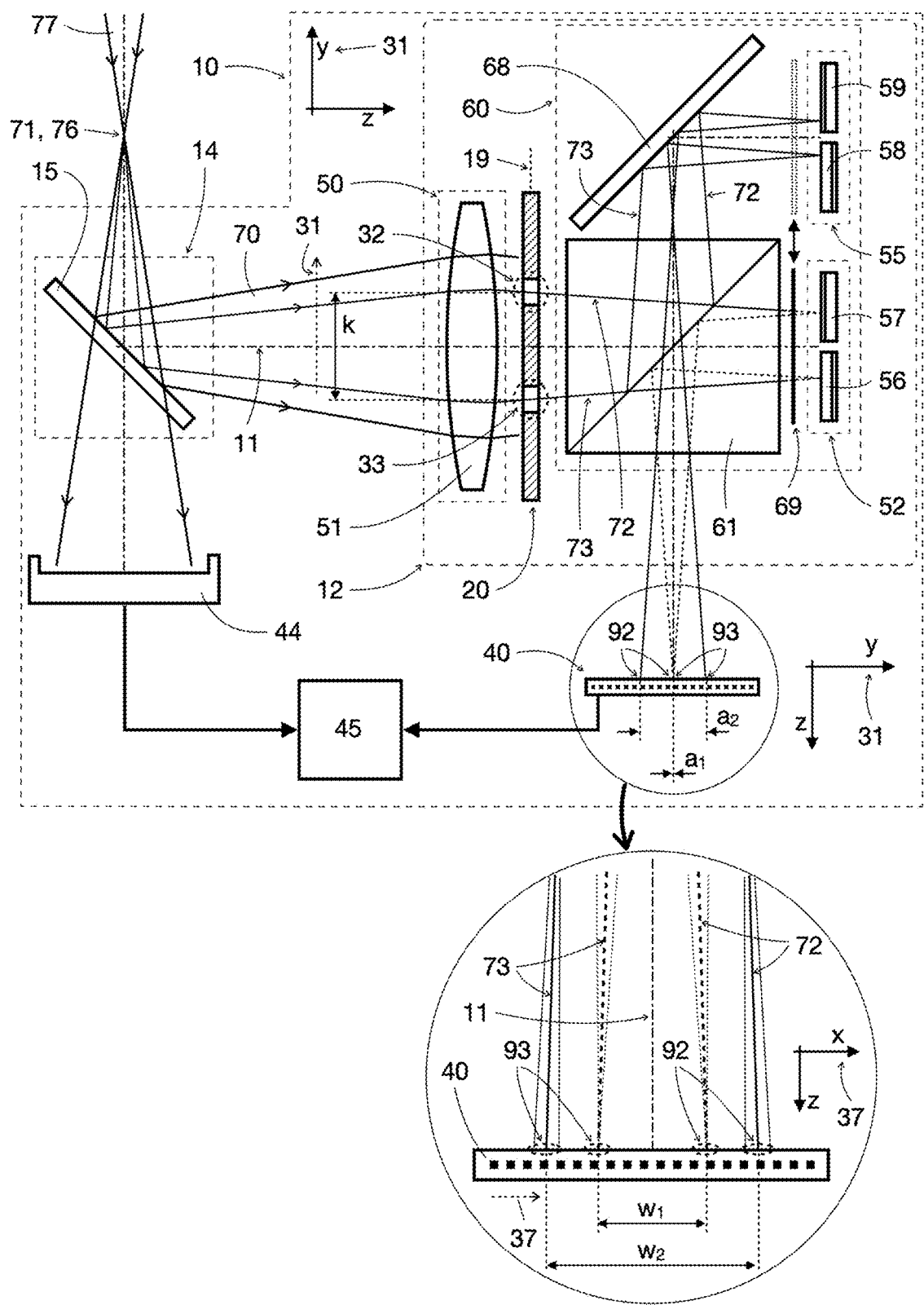
FIG. 16c: shows a schematic representation of a further variant of embodiment of the beam analysis device similar to FIG. 16a with an additional decoupling device and with an additional beam power measurement.
Figure 16D:
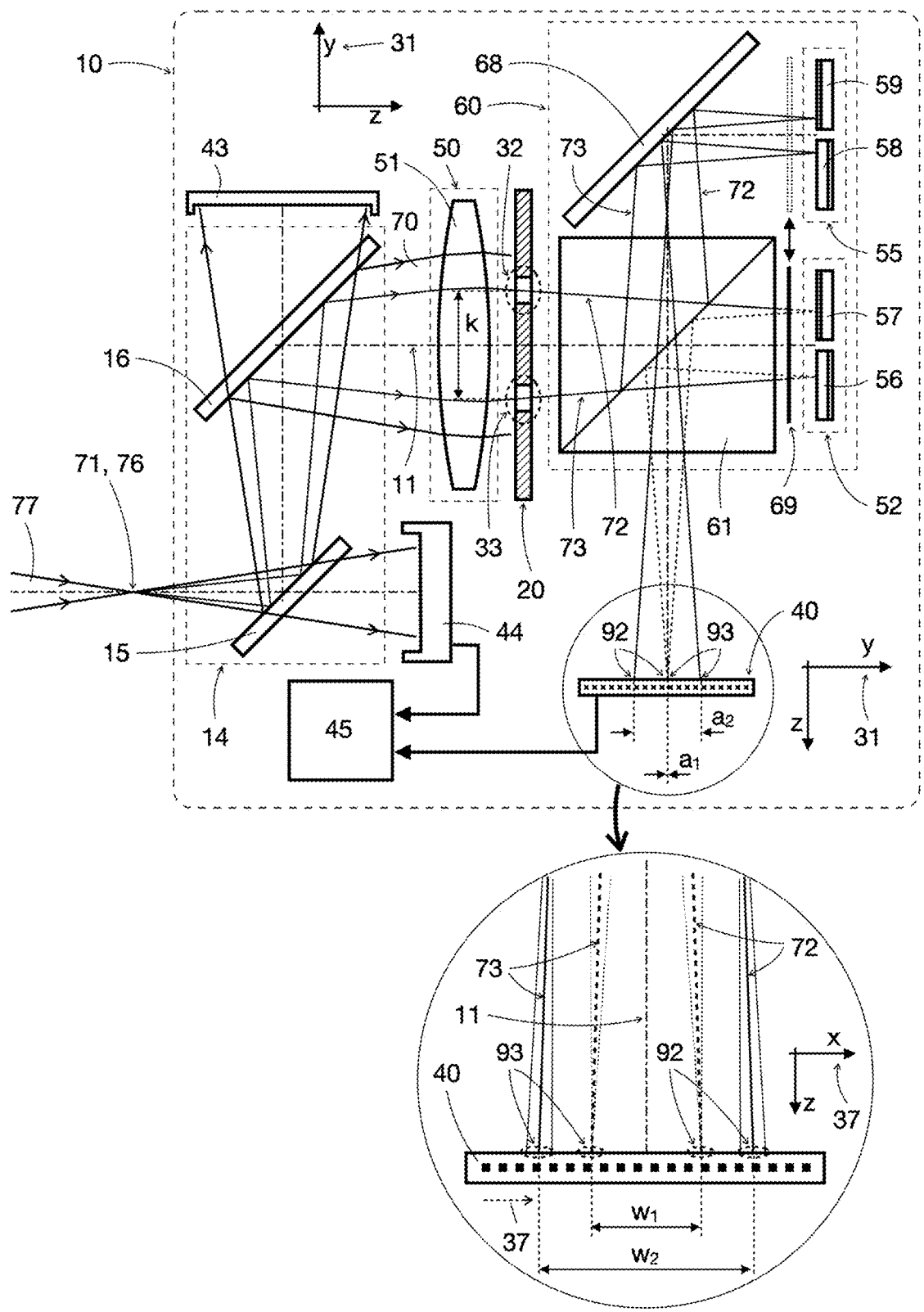
FIG. 16d: shows a schematic representation of a further variant of embodiment of the beam analysis device similar to FIG. 16c with a multi-stage decoupling device.

FIGS. 16b to 16d show further variants of embodiment of the beam analysis device 10 of FIG. 16a with different embodiment options for splitting or decoupling the sample beam 70 from an energy beam 77.

FIG. 16b shows a beam analysis device 10 in which the sample beam 70 is decoupled from an energy beam 77 by means of a decoupling device 14. For this purpose, the beam analysis device 10 comprises the decoupling device 14 with a beam decoupler 15, which in this example is implemented with a beam splitter plate, at the interface of which a fraction of the intensity of the energy beam 77 is reflected as a sample beam 70. The plane plate can be coated, for example with a reflection-reducing layer, for the purpose of adjusting the degree of reflection. A low residual reflectance of common anti-reflective coatings in the range from about 0.05% to about 1% can be sufficient to provide the sample beam 70. The decoupling device 14 thus also serves to attenuate the radiation intensity of the sample beam 70. The energy beam 77 has an energy beam focus 76. Since the sample beam 70 is decoupled from the energy beam 77 without altering its geometrical properties and beam parameters, the energy beam focus 76 is at the same time the beam focus 71 of the sample beam 70. All other elements shown correspond to the descriptions of FIG. 14 and FIG. 16a.

The beam analysis device 10 shown in FIG. 16c differs from the device shown in FIG. 16b in that it has an additional beam absorber device 44, which is also set up to measure the beam power. For this purpose, the energy beam 77, after passing through the decoupling device 14 with the beam decoupler 15, is directed towards the absorber and power measuring device 44. In the form of embodiment shown, the evaluation device 45 is connected to the absorber and power measuring device 44. The measured values generated by the absorber and power measuring device 44 can be registered and/or processed by the evaluation device 45. All other elements shown correspond to the descriptions of the previous figures, in particular of FIG. 16a.

FIG. 16d shows a variant of embodiment of the beam analysis device 10 which to a large extent corresponds to the form of embodiment of FIG. 16c. In the example shown here, the decoupling device 14 comprises the beam decoupler 15 and a second beam decoupler 16, which is arranged downstream of the beam decoupler 15. In this way, the decoupling device 14 achieves a particularly high beam attenuation for the sample beam 70. For example, the intensity of the sample beam 70 can lie in a range from 0.002% to 0.2% of the intensity of the energy beam 77 as a result of the two-stage decoupling. By means of the two beam decouplers 15, 16 connected in series, the focal position of energy beams 77 with particularly high power can therefore also be determined. Such energy beams can, for example, be generated by high-power lasers and have powers of several kilowatts. In addition, the second output coupling can take place with a reflection in a plane rotated through 90° with respect to the first reflection, so that polarisation-dependent differences in the degree of reflection can be compensated. The residual radiation passing through the second beam decoupler 16 can be collected by a further absorber device 43. All other elements shown correspond to the descriptions of the previous figures, in particular of FIG. 16a.

Figure 17:
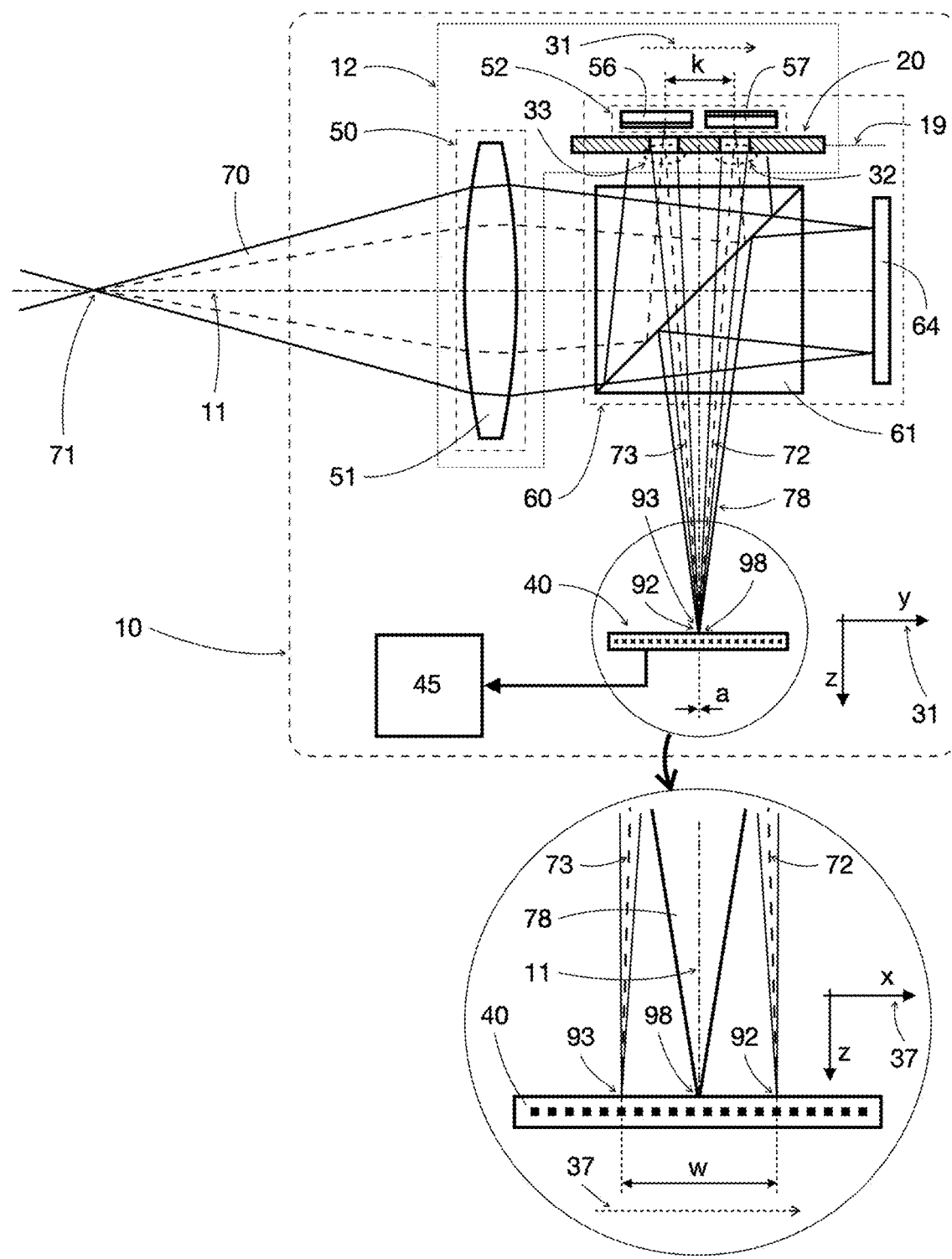
FIG. 17: shows a schematic representation of a further form of embodiment of the beam analysis device with two beam paths onto the detector, in which a modulation device is arranged in only one beam path.

FIG. 17 represents a form of embodiment of the beam analysis device 10, comprising a beam shaping device 12, a beam folding device 60, a detector 40, and an evaluation device 45. The beam shaping device 12, the beam folding device 60, the detector 40, and the evaluation device 45 are preferably arranged together in a housing. The beam shaping device 12 comprises the imaging device 50 with the at least one optical lens 51, the modulation device 20, and the beam separator device 52 with the mirrors 56, 57. The beam folding device 60 comprises the beam splitter 61, the mirror 64 and the mirrors 56, 57, wherein the latter are also part of the beam separator device 52. The beam folding device 60 is arranged behind the lens 51 of the imaging device 50 in the beam direction. The beam splitter 61 splits the sample beam 70 into two radiation components. The first of the two radiation components passes through the modulation device 20 and the beam separator device 52, which are arranged in closely spaced planes. By means of the modulation device 20, the at least two sub-beams 72, 73 are released in the plane of the sub-beam release 19 with the two sub-apertures 32, 33. The centre points of the sub-apertures 32, 33 have a distance k from each other in the first lateral direction 31. The two sub-beams 72, 73 are subsequently reflected back into the beam splitter 61 by means of the mirrors 56, 57 of the beam folding device 60 and the beam separator device 52, respectively, thereby forming the first folded beam path. The two mirrors 56, 57 are inclined at a small angle to each other and in this way at the same time form the beam separator device 52. For this purpose, the difference between the normal directions on the mirror surfaces of the mirrors 56, 57 is aligned along the second lateral direction 37, which is aligned transversely to the first lateral direction 31. The second of the two radiation components impinges on the mirror 64 after passing the beam splitter 61 and is reflected back into the beam splitter 61 by the latter, thereby forming the second folded beam path. In the second folded beam path, there is no modulation of the intensity distribution of the sample beam 70, so that an unmodulated beam 78 is formed in the second beam path. In the beam splitter 61, the two radiation components from the two folded beam paths are superimposed and imaged onto the detector 40 along a common propagation path with a local optical axis 11. The intensity distribution on the detector 40 thus includes three beam spots 92, 93 and 98. The two beam spots 92, 93 are formed in the previously explained manner by imaging the two sub-beams 72, 73 formed by the modulation device 20 and the beam separator device 52 in the first folded beam path. The beam spots 92, 93 are spaced apart by a distance a on the detector 40 in the first lateral direction 31. The distance a alters with an alteration in the axial position of the beam focus 71. Based on the distance a, or an alteration in the distance a, the evaluation device 45 determines the axial focal position, or the alteration in the axial focal position, of the beam focus 71. By virtue of the deflection of the sub-beams 72, 73 by means of the beam separator device 52, the beam spots 92, 93 have the distance w from each other in the second lateral direction 37. The distance w does not alter with an alteration in the axial position of the beam focus 71. A third beam spot 98 is formed on the detector 40 by imaging the unmodulated beam 78 propagating along the second folded beam path. The beam spot 98 of the unmodulated beam thus represents the original intensity distribution of the sample beam 70 or of the energy beam 77 from which the sample beam 70 can have been decoupled. In particular, the beam spot 98 can also be an image of the beam focus 71. Based on the image scale of the imaging by the imaging device 50, the intensity distribution and/or the diameter of the beam focus 71 can therefore also be determined by the evaluation device 45.

Figure 18:
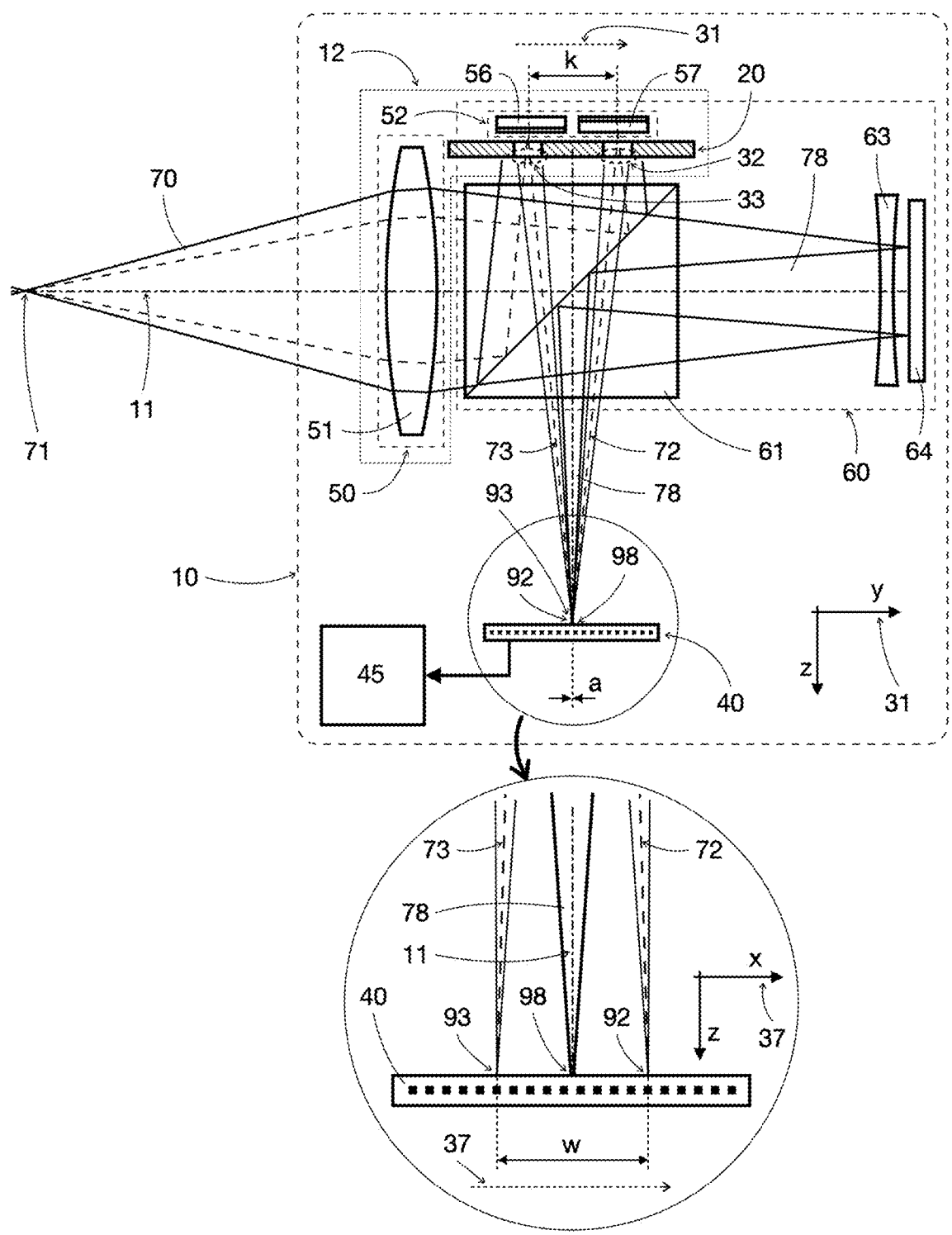
FIG. 18: shows a schematic representation of a further form of embodiment of the beam analysis device with two beam paths onto the detector, in which a modulation device is arranged in only one beam path and in which an unmodulated beam is imaged enlarged onto the detector.

FIG. 18 shows a variant of embodiment of the beam analysis device 10, which to a large extent corresponds to the form of embodiment of FIG. 17. In the example shown here, the unmodulated beam 78, which forms the beam spot 98 on the detector 40, is imaged in an enlarged manner onto the detector 40. For this purpose, a further imaging device 63 with at least one optical lens is arranged in the second folded beam path between the beam splitter 61 and the mirror 64. In particular, the imaging device 63 can contain a concave lens. To compensate for the alteration in image position by the imaging device 63, the second folded beam path can have a different beam path length than the first folded beam path. As a result of the enlarged image of the unmodulated beam 78, an intensity distribution and/or a beam diameter can be determined from the beam spot 98 with higher resolution and accuracy. All other elements represented correspond to the descriptions of the preceding figures, in particular of FIG. 17.

Figure 19A:
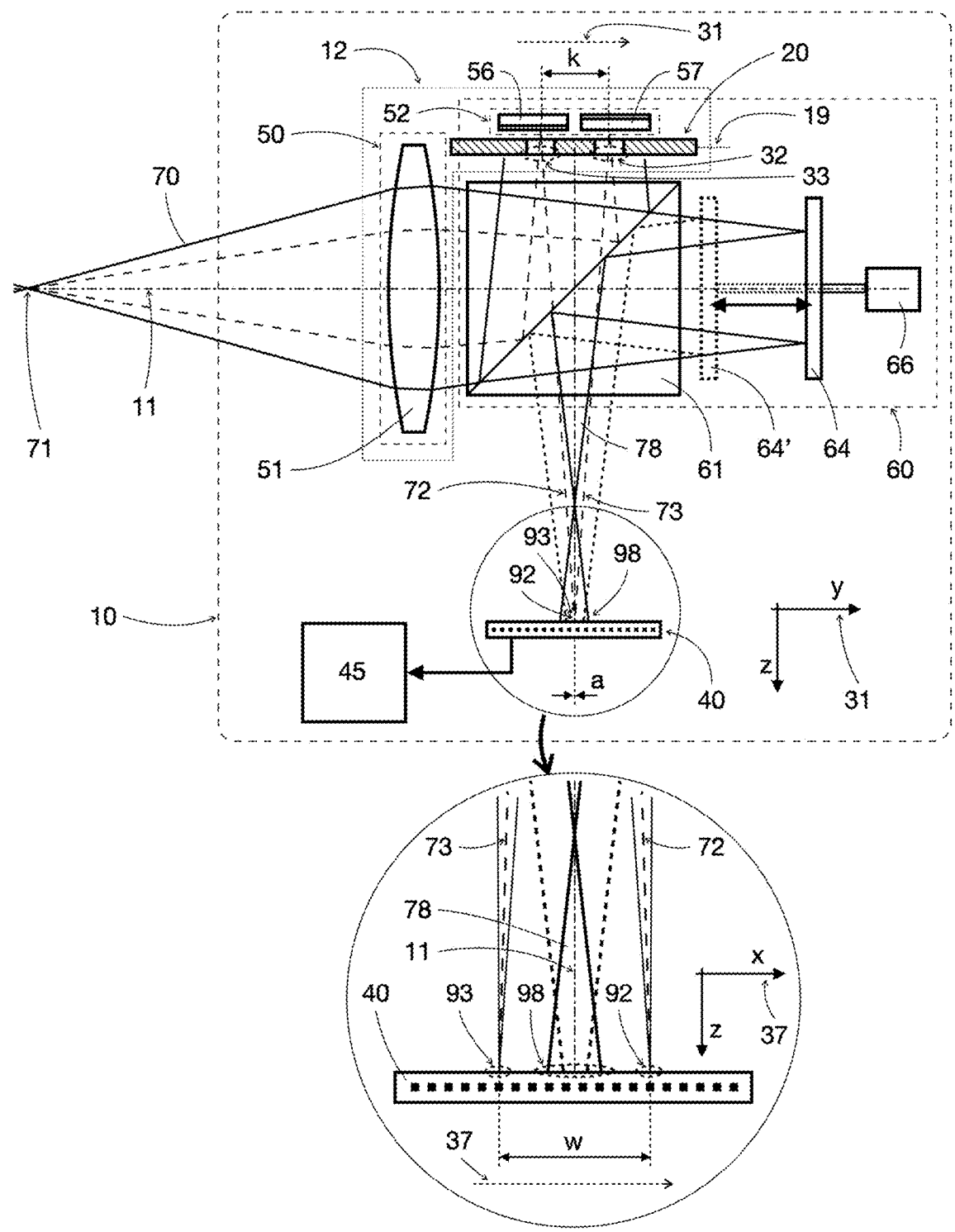
FIG. 19a: shows a schematic representation of a further variant of embodiment of the beam analysis device similar to FIG. 17, in which the beam path length for the unmodulated beam is adjustable.

The variant of embodiment represented in FIG. 19*a* also corresponds essentially to the form of embodiment in FIG. 17. In this respect, reference is also made to the description of FIG. 17. In the variant of embodiment represented here, the beam path length in the second folded beam path is variably adjustable. For this purpose, the mirror 64 is arranged such that it can be axially displaced, for example by means of a linear guide, and coupled with a positioning device 66. By means of the positioning device 66, the mirror 64 can be moved to different axial positions (64, 64'). The positioning device 66 can include, for example, a plunger coil drive, whereby very fast adjustments, for example in the region of milliseconds, can be implemented. The evaluation device 45 can be set up to control the positioning device 66. The evaluation device 45 can also be set up to exchange data with the positioning device 66, for example to exchange information on the mirror position or adjustment path alteration. In this way, several, preferably at least 3, particularly preferably at least 10, mirror positions can be set in succession and the respective intensity distribution of the beam spot 98 on the detector 40 can be registered. From this data, various beam parameters of the sample beam 70 can be determined, for example the focal diameter, the beam divergence, and/or the beam parameter product. The beam analysis device 10 shown here is thus able, on the one hand, to determine the axial beam focal position quasi in real time, and, on the other hand, to measure the beam caustic (the beam envelope) of the sample beam 70 or the energy beam 77 almost in real time, at least in a very short time. This also makes it possible to measure the beam in accordance with the ISO 11146 standard in a very short time, for example in less than one second.

Figure 19B:
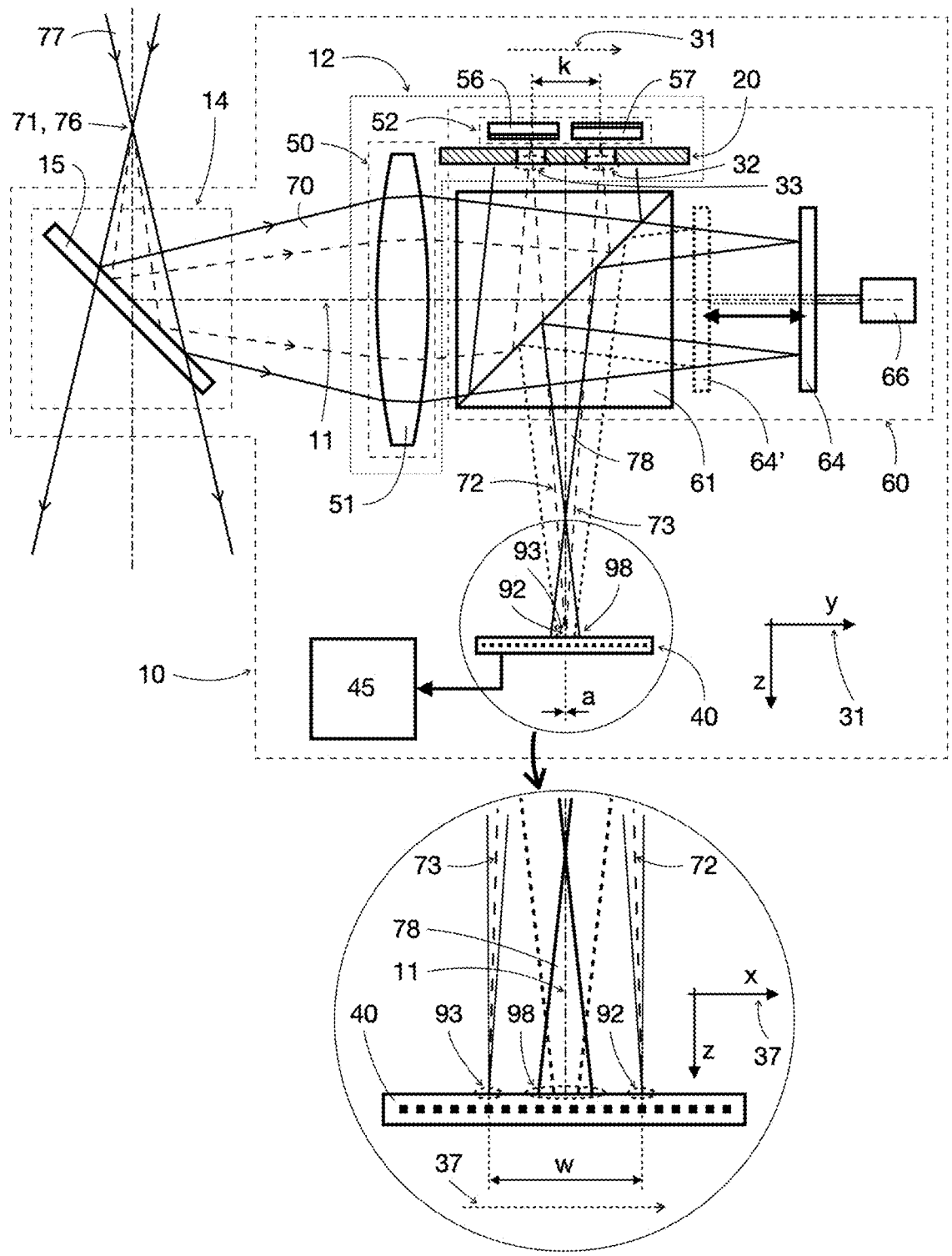
FIG. 19b: shows a schematic representation of a further form of embodiment of the beam analysis device similar to FIG. 19a with an additional decoupling device.
Figure 19C:
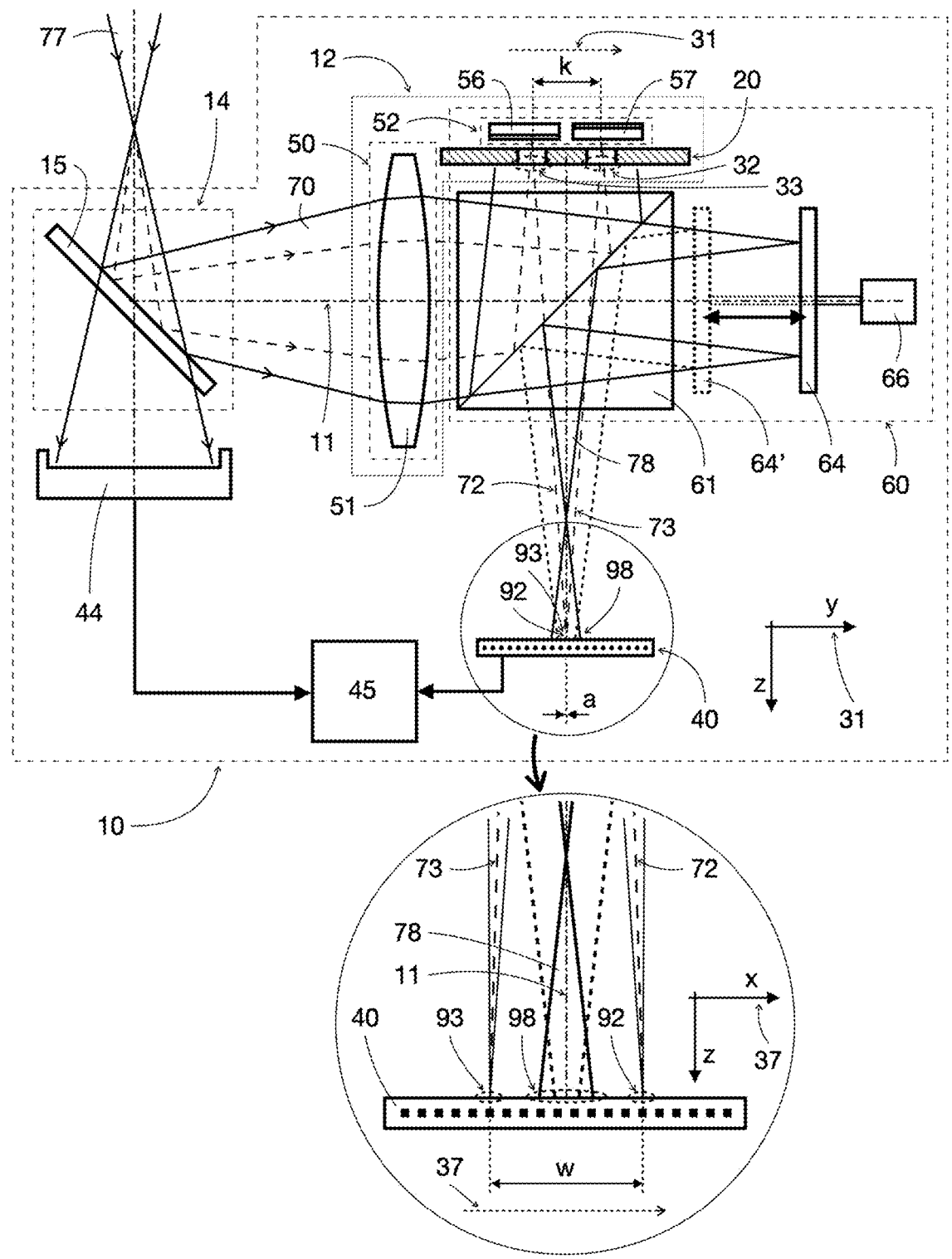
FIG. 19c: shows a schematic representation of a further form of embodiment of the beam analysis device similar to FIG. 19a with an additional decoupling device and with an additional beam power measurement.

FIGS. 19*b* and 19*c* show further variants of embodiment of the beam analysis device 10 of FIG. 19*a* with various embodiment possibilities for splitting or decoupling the sample beam 70 from an energy beam 77.

FIG. 19*b* thus shows a beam analysis device 10 in which the sample beam 70 is decoupled from an energy beam 77 by means of a decoupling device 14. The beam analysis device 10 corresponds to the device shown in FIG. 19*a*, and additionally comprises the decoupling device 14 with a beam splitter plate as a beam decoupler 15. A fraction of the intensity of the energy beam 77 is reflected as sample beam 70 at a boundary surface of the beam decoupler 15. The decoupling device 14 thus also serves to attenuate the radiation intensity of the sample beam 70. The energy beam 77 has an energy beam focus 76. Since the sample beam 70 is decoupled from the energy beam 77 without altering its geometric properties and beam parameters, the energy beam focus 76 is at the same time the beam focus 71 of the sample beam 70. All other elements shown correspond to the descriptions of FIGS. 17 and 19*a*.

The beam analysis device 10 shown in FIG. 19*c* differs from the device shown in FIG. 19*b* in that it has an additional beam absorber device 44 which is also set up to measure the beam power. For this purpose, the energy beam 77 is directed towards the absorber and power measuring device 44 after the energy beam 77 has passed the decoupling device 14 with the beam decoupler 15. The measured values generated by the absorber and power measuring device 44 can be registered and/or processed by the evaluation device 45. All other elements shown correspond to the descriptions of the previous figures.

Figure 19D:
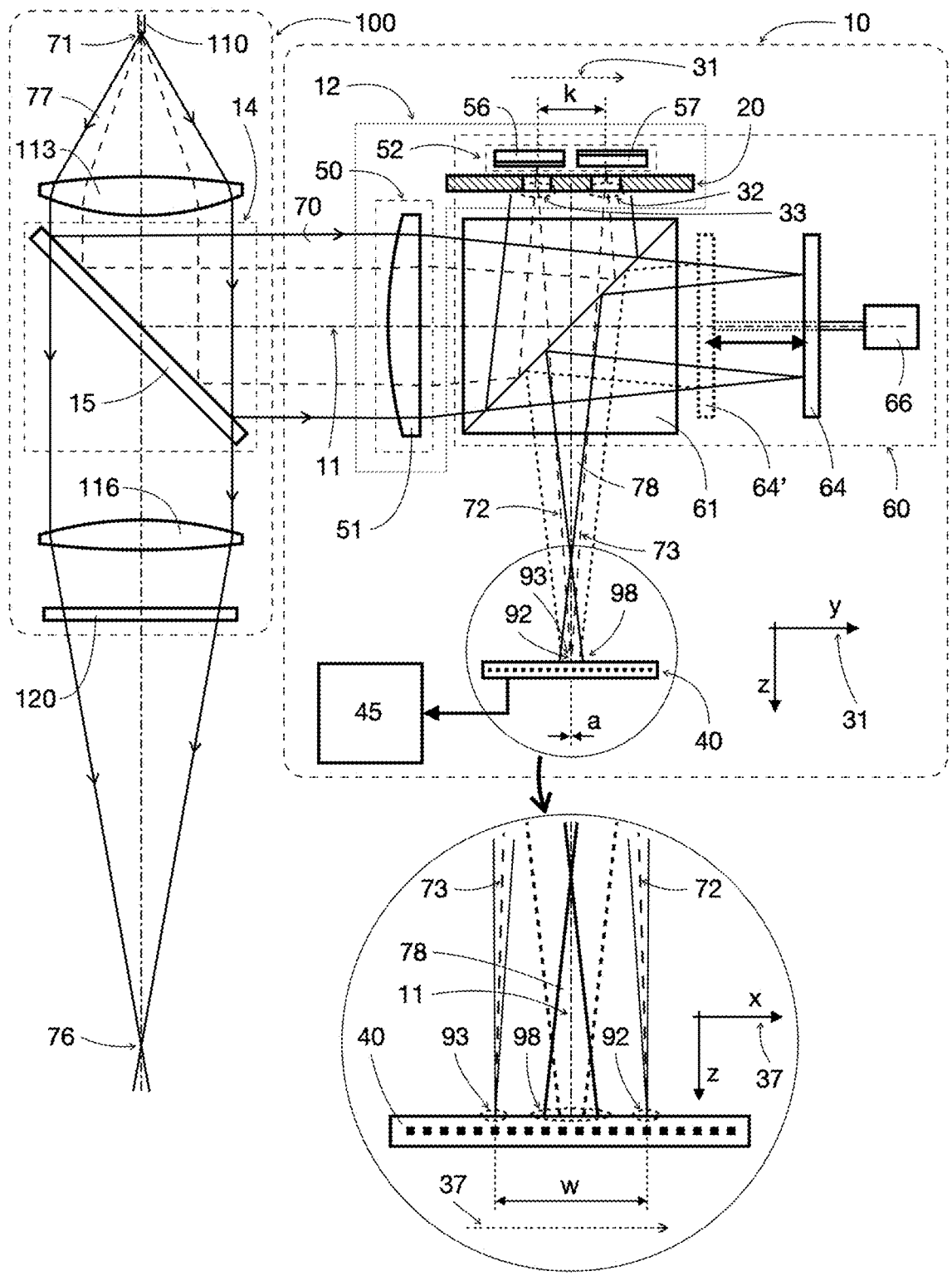
FIG. 19d: shows a schematic representation of a further form of embodiment of the beam analysis device similar to FIG. 19a in combination with processing optics, in which the sample beam is decoupled from the collimated energy beam of the processing optics.
Figure 19E:
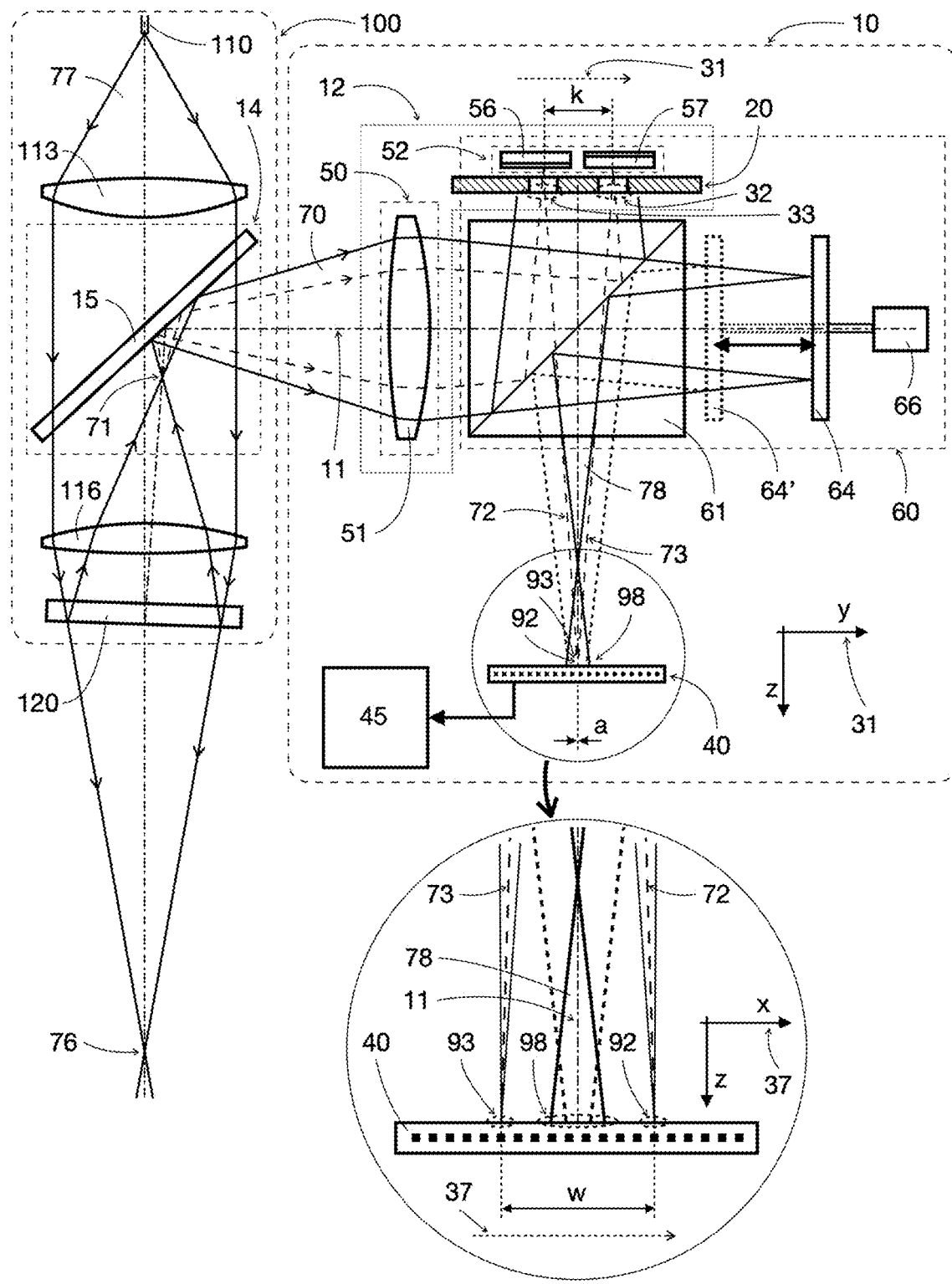
FIG. 19e: shows a schematic representation of a further form of embodiment of the beam analysis device similar to FIG. 19a in combination with a processing optics, in which the sample beam is formed by reflective decoupling of a radiation component reflected back from the protective glass.
Figure 19F:
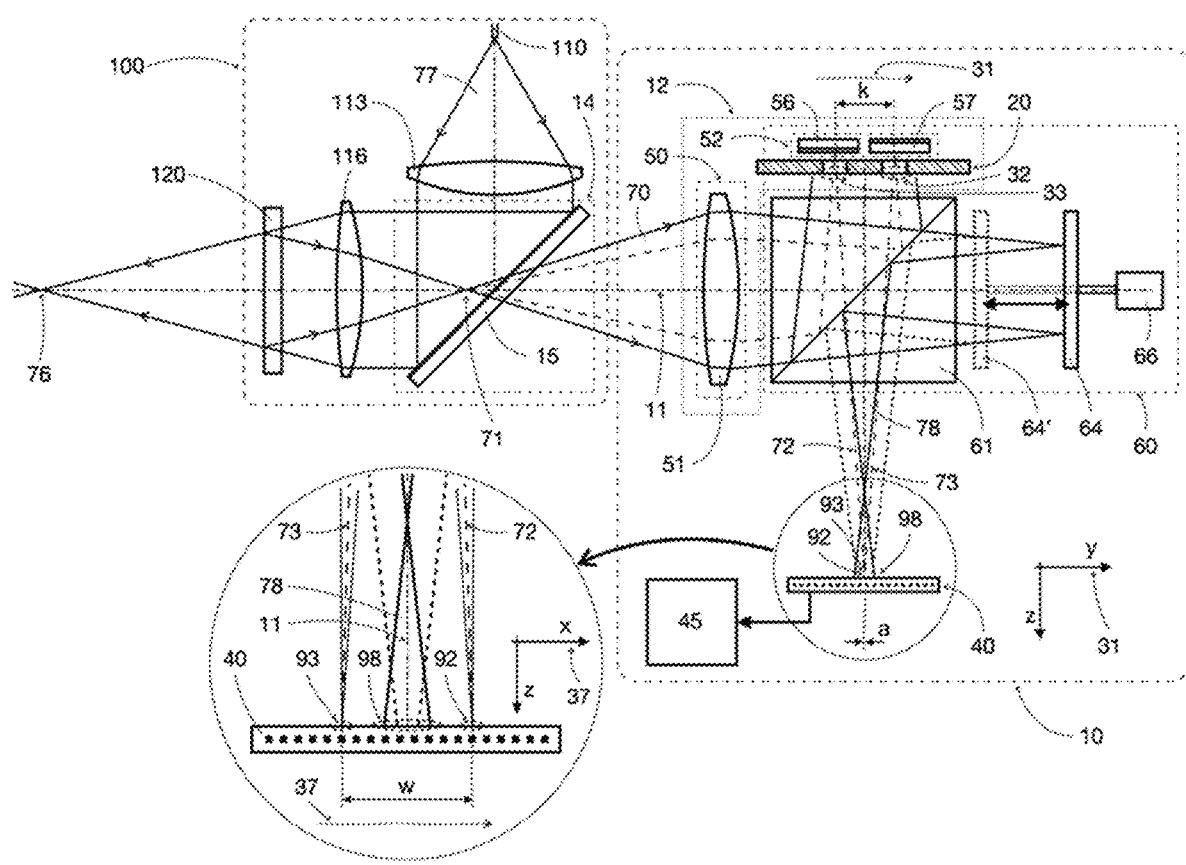
FIG. 19f: shows a schematic representation of a further form of embodiment of the beam analysis device similar to FIG. 19a in combination with processing optics, in which the sample beam is formed by transmissive coupling out of a radiation component reflected back from the protective glass.

FIGS. 19*d* to 19*f* show the same beam analysis device 10 as FIG. 19*a*. The figures show the use of the beam analysis device 10 of FIG. 19*a* on a laser processing optics 100. In FIGS. 19*d* to 19*f*, various possibilities are shown for decoupling the sample beam 70 from a laser beam 77 guided in the laser processing optics 100.

For example, FIG. 19*d* shows the extraction of a fraction of the laser beam 77 by means of a beam decoupler 15 of an decoupling device 14 integrated in the laser processing optics 100. The laser processing optics 100 also typically comprise a collimator 113, a focusing device 116 and a protective glass 120. The beam decoupler 15 can, for example, be a dielectric AR (anti-reflective) coated, inclined plane plate in which the residual reflection of the AR layer is utilised. Typically, a dielectric anti-reflective layer reflects a fraction of the radiation intensity, which can be in the range from about 0.05% to 1%. In the example of FIG. 19*d*, a fraction of the laser beam 77 collimated in front of collimator 113 is thus decoupled. The source point for the decoupled sample beam 70, which forms the beam focus 71, is here, for example, the end of an optical fibre 110. This arrangement is suitable, for example, for determining the actual position or an alteration in the actual or virtual position of the beam exit point, for example the end of an optical fibre 110, in the case of an adjustable collimator 113 by means of the beam analysis device 10. This position can then in turn be used to calculate the position of the energy beam focus 76 into which the laser processing optics 100 focuses the energy beam or laser beam 77. An alteration in the focal position in the event of the occurrence of a thermal lens in the collimator 113, for example as a result of contamination of the collimator 113, can also be determined in this way online, that is to say, during laser processing, preferably in real time. All other elements shown correspond to the description of FIG. 19*a*.

In the example of FIG. 19*e*, the beam decoupler 15 is arranged to decouple a fraction of a beam component that is reflected back from the protective glass 120 of the laser processing optics 100. The beam focus 71 in the reflected back component of radiation is a mirror image of the laser beam focus 76, so that any alterations in the position of the laser beam focus 76 will also affect the position of the beam focus 71 determined by the beam analysis device 10. In order to be able to distinguish the reflections reflected from the two boundary surfaces (front and back) of the protective glass 120, the protective glass 120 can, for example, be arranged at a slight angle. Alternatively, a wedge plate can be used as protective glass 120 for this purpose. All other elements shown correspond to the descriptions in FIGS. 19*a* and 19*d*.

FIG. 19f also shows the same beam analysis device 10 as in FIG. 19a. Here, the beam analysis device 10 is coupled to a laser processing optic 100 in a similar way as in FIG. 19e and receives a sample beam 70 coupled out from the decoupling device 14, which is reflected back at the protective glass 120 as a fraction of the intensity of the laser beam 77. In this embodiment, the beam decoupler 15 of the decoupling device 14 integrated in the laser processing optics 100 is a highly reflective mirror, for example a plane plate with a highly reflective dielectric coating, which is actually set up mainly for deflecting the laser beam 77 in the laser processing optics 77. This takes advantage of the fact that a highly reflective (HR) coated mirror has a residual transmission which can be in the range from 0.05% to 1%. This transmitted radiation component forms the decoupled sample beam 70. All other elements shown correspond to the descriptions in FIGS. 19a and 19d.

Figure 20:
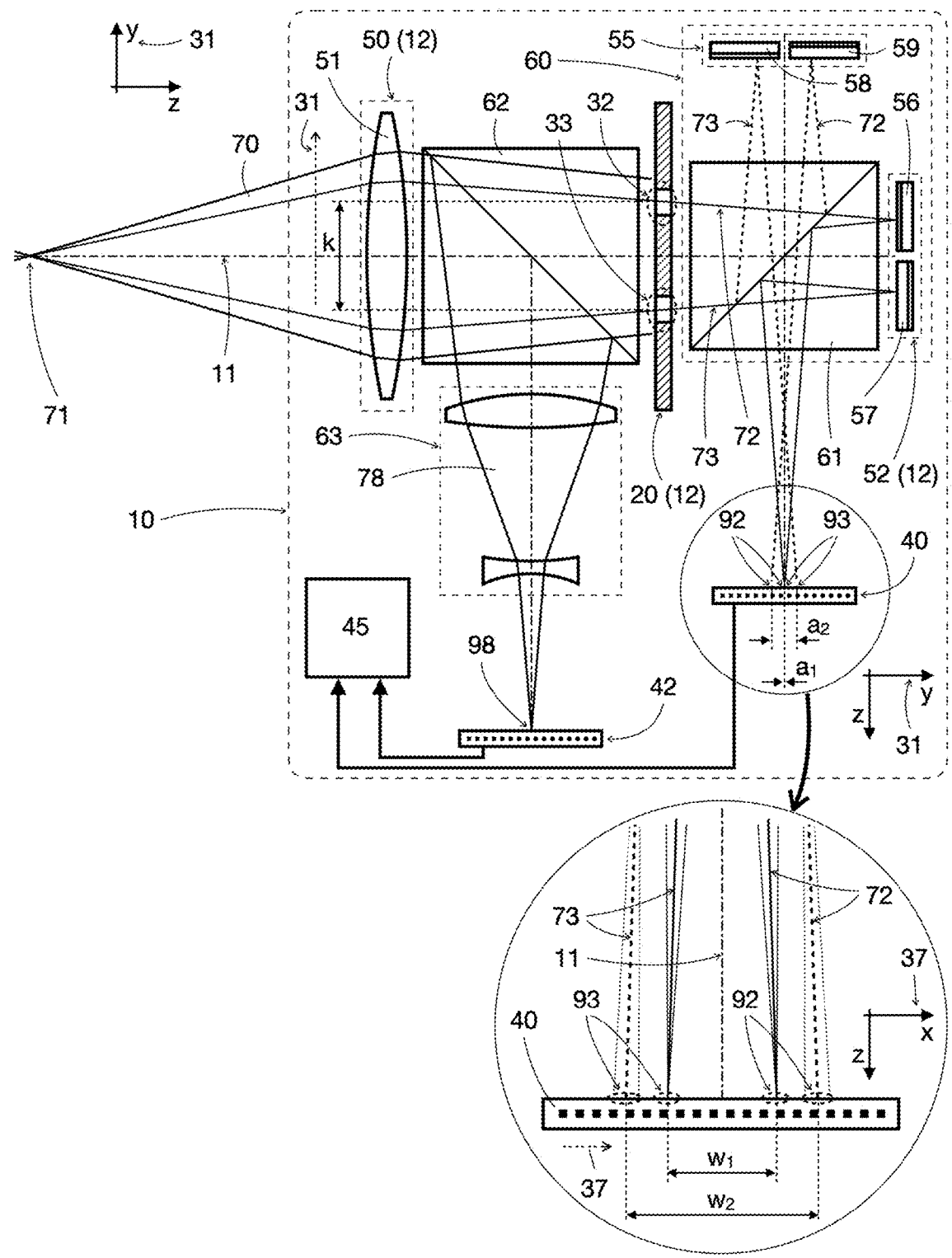
FIG. 20: shows a schematic representation of a further form of embodiment of the beam analysis device with an additional beam splitting and imaging of a sample beam component onto a second detector.

FIG. 20 shows a variant of embodiment of the beam analysis device 10 which is based on the embodiment of FIG. 14. The beam analysis device 10 comprises a beam folding device 60 for forming two folded beam paths and a modulation device 20 which is arranged in front of the beam folding device 60. In addition, the beam analysis device 10 comprises here a second beam splitter 62, a further imaging device 63, and a second detector 42. The second beam splitter is arranged between the lens 51 of the imaging device 50 and the modulation device 20. By means of the second beam splitter 62, a radiation component is decoupled from the sample beam 70 to form an unmodulated beam 78 which is directed and imaged onto the second detector 42. The further imaging device 63 is arranged in front of the second detector 42 in the beam direction and serves in conjunction with the imaging device 50 for magnified imaging of the unmodulated beam 78 onto the second detector 42. The beam spot 98 formed by imaging the unmodulated beam 78 onto the second detector 42 can thus be an enlarged image of the beam focus 71 or an enlarged beam cross-sectional plane of the sample beam 70 from a region of the beam caustic near the beam focus 71. The intensity distribution registered by the second detector 42 can be evaluated by the evaluation device 45. In this way, the signals from the detector 40 are used to determine the focal position and the signals from the second detector 42 are used to determine an intensity distribution, a beam profile, and/or a beam diameter from the beam focus 71 or from a cross-sectional plane near the beam focus 71. The advantage of this variant of embodiment compared to the variants of embodiment of FIG. 17 or FIG. 18 is that the entire sensor surface of the detector 42 is available for the intensity distribution of the unmodulated beam 78, whereas in the forms of embodiment of FIG. 17 or FIG. 18 a part of the sensor surface is required for the beam spots 92, 93.

Figure 21:
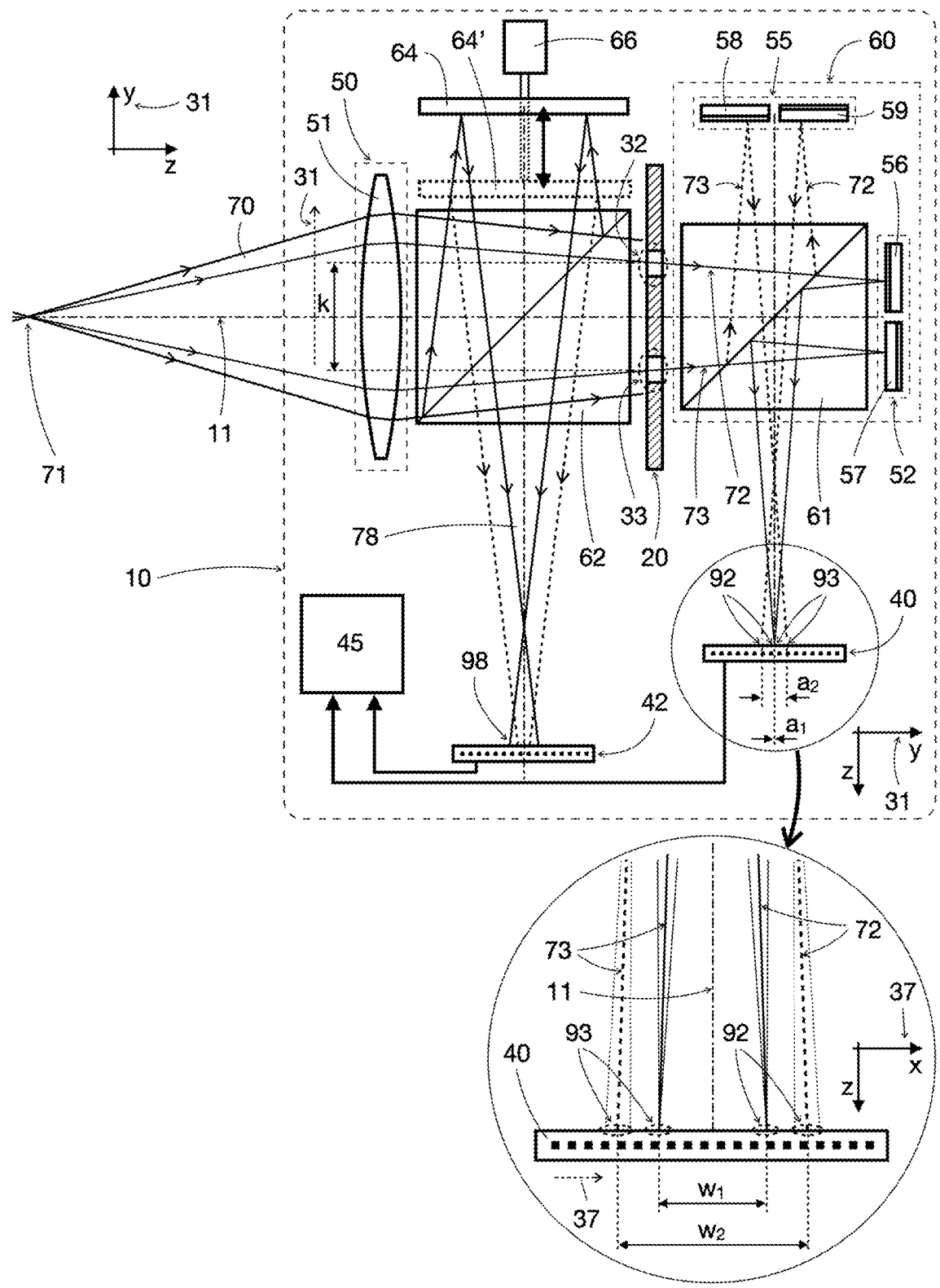
FIG. 21: shows a schematic representation of a further form of embodiment of the beam analysis device with an additional beam splitting and guiding of a sample beam component onto a second detector with adjustable length of the beam path onto the second detector.

FIG. 21 shows a further variant of embodiment of the beam analysis device 10, which is based on the embodiment of FIG. 14. The beam analysis device 10 comprises a beam folding device 60 for forming two folded beam paths and a modulation device 20 which is arranged in front of the beam folding device 60. In addition, the beam analysis device 10 comprises here a second beam splitter 62, a mirror 64, a positioning device 66, and a second detector 42. The second beam splitter is arranged between the lens 51 of the imaging device 50 and the modulation device 20. By means of the second beam splitter 62, a radiation component is decoupled from the sample beam 70 to form an unmodulated beam 78. The radiation component decoupled by the second beam splitter 62, that is to say, the unmodulated beam 78, is directed onto the mirror 64, reflected back by the mirror 64, and subsequently directed onto the second detector 42 and imaged to form a beam spot 98 on the second detector 42. The length of the propagation path of the unmodulated beam 78 is variably adjustable. For this purpose, the mirror 64 is arranged such that it can be axially displaced, for example by means of a linear guide, and is coupled to the positioning device 66. By means of the positioning device 66, the mirror 64 can be displaced to different axial positions (64, 64'). The positioning device 66 can, for example, comprise a plunger coil drive, whereby very fast adjustments, for example in the region of milliseconds, can be implemented. The evaluation device 45 can furthermore be set up to control the positioning device 66. The evaluation device 45 can also be set up to exchange data with the positioning device 66, for example to exchange information on mirror position or adjustment path alteration. In this way, several, preferably at least 3, particularly preferably at least 10, different mirror positions can be set in succession, and the respective intensity distribution of the beam spot 98 can be registered on the second detector 42. From these data, various beam parameters of the sample beam 70 can be determined, for example the focal diameter, the beam divergence, and/or the beam parameter product. The beam analysis device 10 shown here is thus able, on the one hand, to determine the axial beam focal position in quasi-real time and, on the other hand, to measure the beam caustic of the sample beam 70 or of the energy beam 77 almost in real time, at least in a very short time. Thus, a beam measurement conforming to the ISO 11146 standard is also possible in a very short time, for example in less than one second. The advantage of this variant of embodiment compared to the device shown in FIG. 19a is that the entire sensor surface of the second detector 42 is available for the intensity distribution of the unmodulated beam 78, whereas in the form of embodiment of FIG. 19a a part of the sensor surface is required for the beam spots 92, 93.

Figure 22:
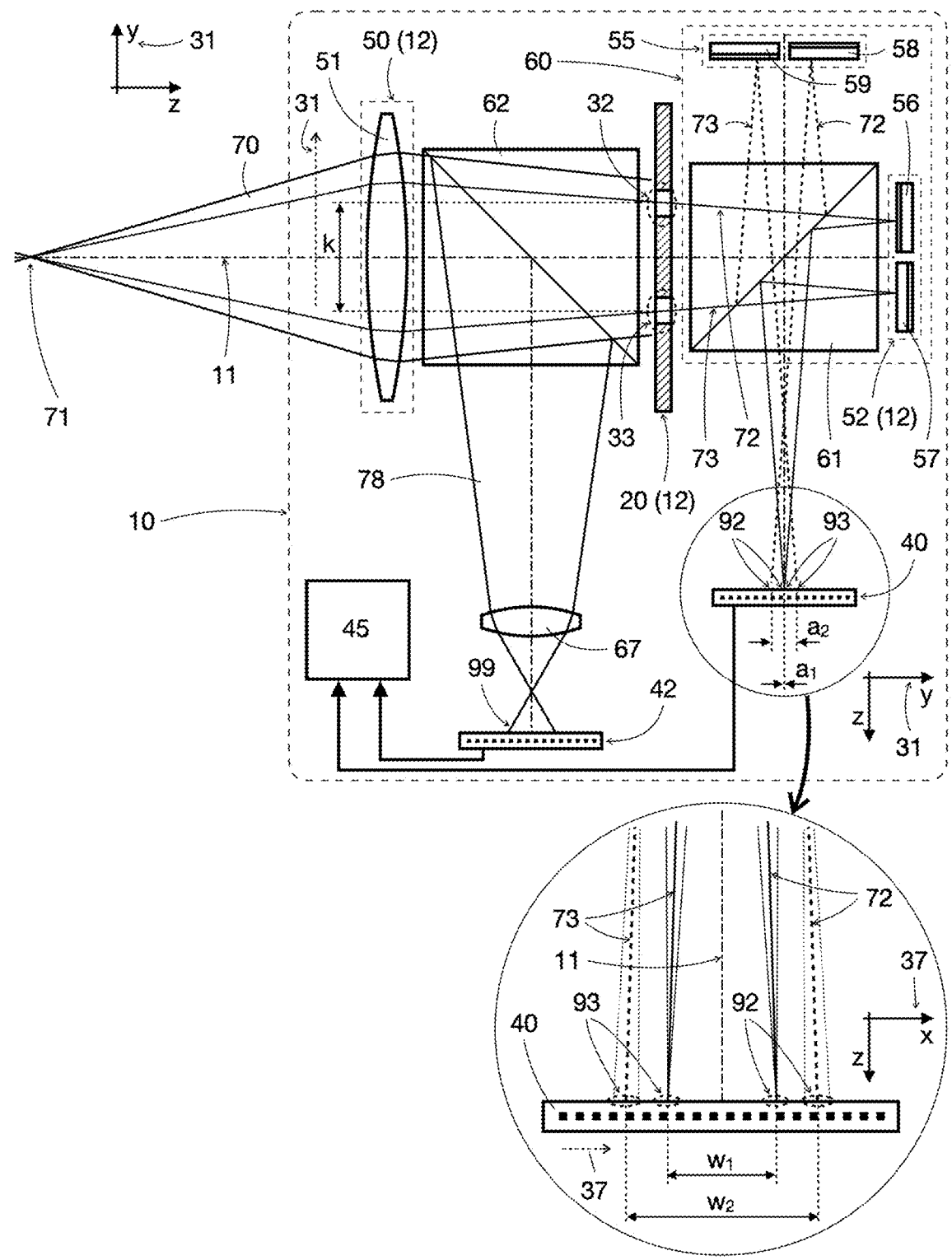
FIG. 22: shows a schematic representation of a further form of embodiment of the beam analysis device with two beam paths similar to FIG. 14 and with an additional beam splitting and imaging of a far-field beam distribution of the sample beam onto a second detector.
Figure 23:
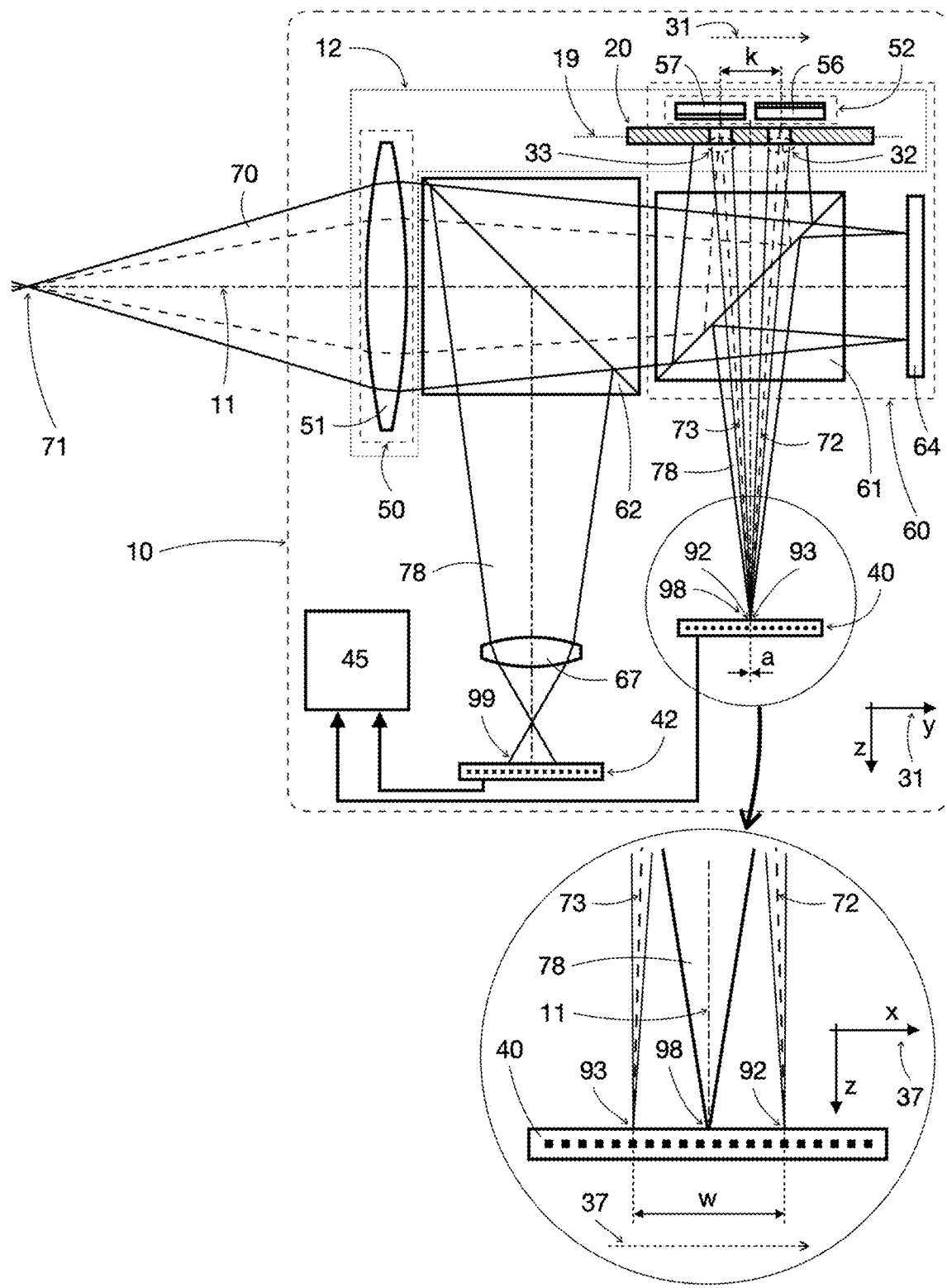
FIG. 23: shows a schematic representation of a further form of embodiment of the beam analysis device with two beam paths similar to FIG. 18 and with an additional beam splitting and imaging of a far-field beam distribution of the sample beam onto a second detector.
Figure 24:
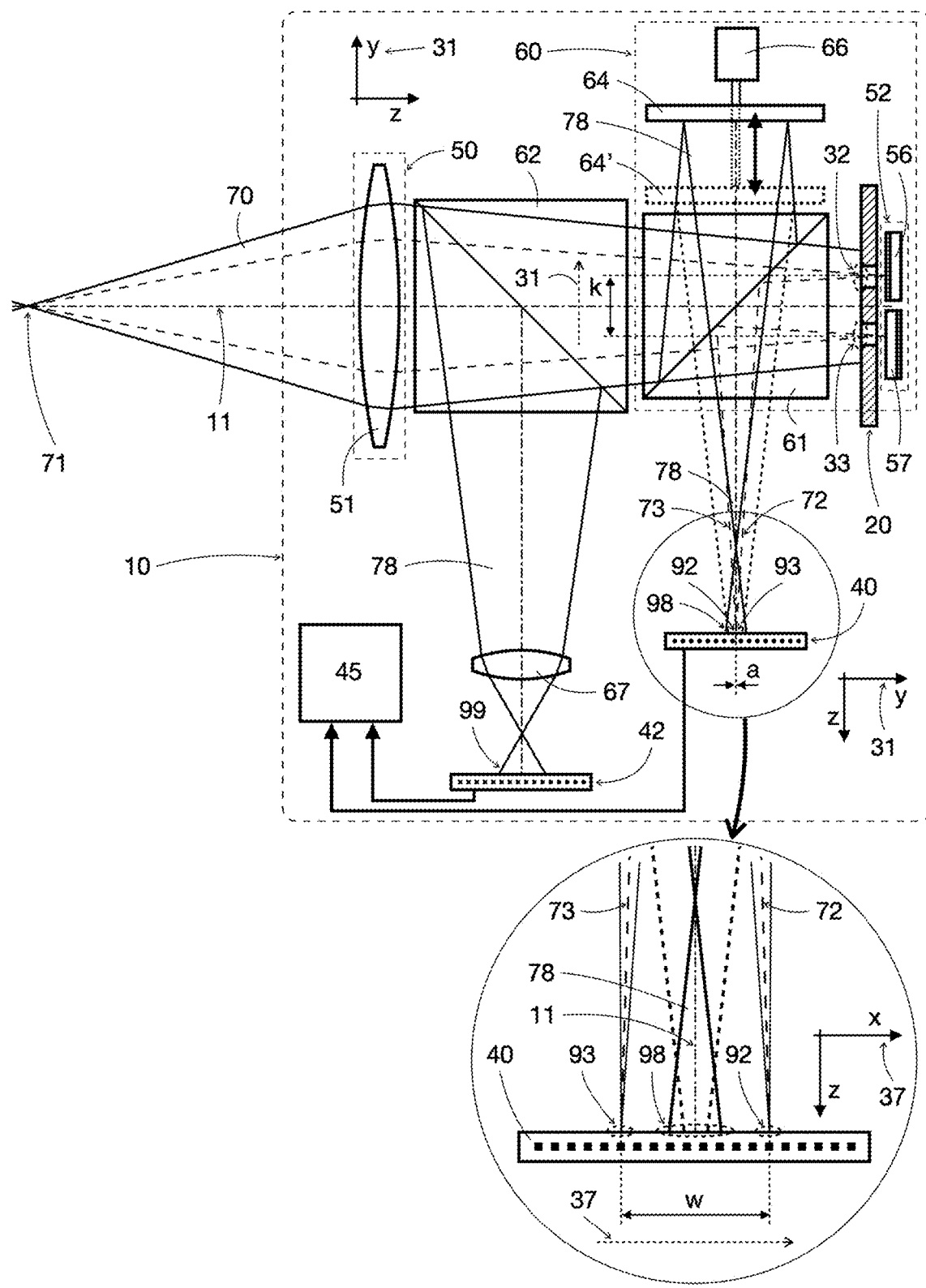
FIG. 24: shows a schematic representation of a further form of embodiment of the beam analysis device with two beam paths similar to FIG. 19a and with an additional beam splitting and imaging of a far-field beam distribution of the sample beam onto a second detector.

FIGS. 22 to 24 show forms of embodiment of a beam analysis device 10 that additionally comprise a far-field analysis device. This far-field analysis device can be combined with any of the previously described beam analysis devices 10. The far-field analysis device comprises a second beam splitter 62, a further imaging device 67, and a second detector 42. The second beam splitter 62 is arranged behind the at least one lens 51 of the imaging device 50 in the beam direction and in front of the modulation device 20. By means of the second beam splitter 62, a radiation component is decoupled from the sample beam 70 to form an unmodulated beam 78, which is guided onto the second detector 42 to form a beam intensity distribution 99 on the second detector 42. Between the second beam splitter 62 and the second detector 42, the further imaging device 67 is arranged, which includes at least one optical lens, or can be a multi-lens objective. The further imaging device 67 forms a combined lens system together with the imaging device 50 and the lens 51 contained therein. This combined lens system has a combined focal length and an image-side focal plane of the combined lens system. The second detector 42 is arranged exactly in the image-side focal plane of the combined lens system. The combined lens system thus forms a so-called Fourier objective for the second detector 42, because the intensity distribution 99 of the unmodulated beam 78 formed on the second detector 42 represents a Fourier transform of the intensity distribution of the sample beam 70. The intensity distribution 99 on the second detector 42 is therefore the so-called far-field intensity distribution, and this is independent of the axial position of the beam focus 71. In particular therefore, a divergence angle of the sample beam 70 can be determined from this intensity distribution 99.

FIG. 22 represents an embodiment of the beam analysis device 10, in which the far-field analyser that has just been described is integrated into a beam analysis device 10, which in other respects corresponds to the device shown in FIG. 14. For an explanation of the other elements of FIG. 22, reference is therefore made to the description of FIG. 14.

FIG. 23 represents a form of embodiment of the beam analysis device 10, in which the far-field analyser just described is integrated into a beam analysis device 10, which in other respects corresponds to the device shown in FIG. 17. For the explanation of the other elements of FIG. 23, reference is therefore made to the description of FIG. 17. The variant of embodiment of FIG. 23 makes it possible to determine much information about the sample beam 70, or about the energy beam 77: From the signals of the detector 40, the axial focal position can be determined as well as the intensity distribution in the beam focus, or in the near field of the beam focus, and the far-field properties can be determined from the signals of the second detector 42, Together, this provides extensive geometric beam information that in practice can be determined in real time, and can be used, for example, to control a laser processing operation.

FIG. 24 shows a form of embodiment of the beam analysis device 10, in which the far-field analyser just described is integrated into a beam analysis device 10, which in other respects corresponds to the device shown in FIG. 19a. For an explanation of the other elements of FIG. 24, reference is therefore made to the description of FIG. 19a. The variant of embodiment of FIG. 24 enables the determination of the axial focal position, a near-field intensity distribution as well as the far-field-intensity distribution in almost real time, as well as a complete, also ISO 11146 compliant, beam measurement in a very short time.

Figure 25:
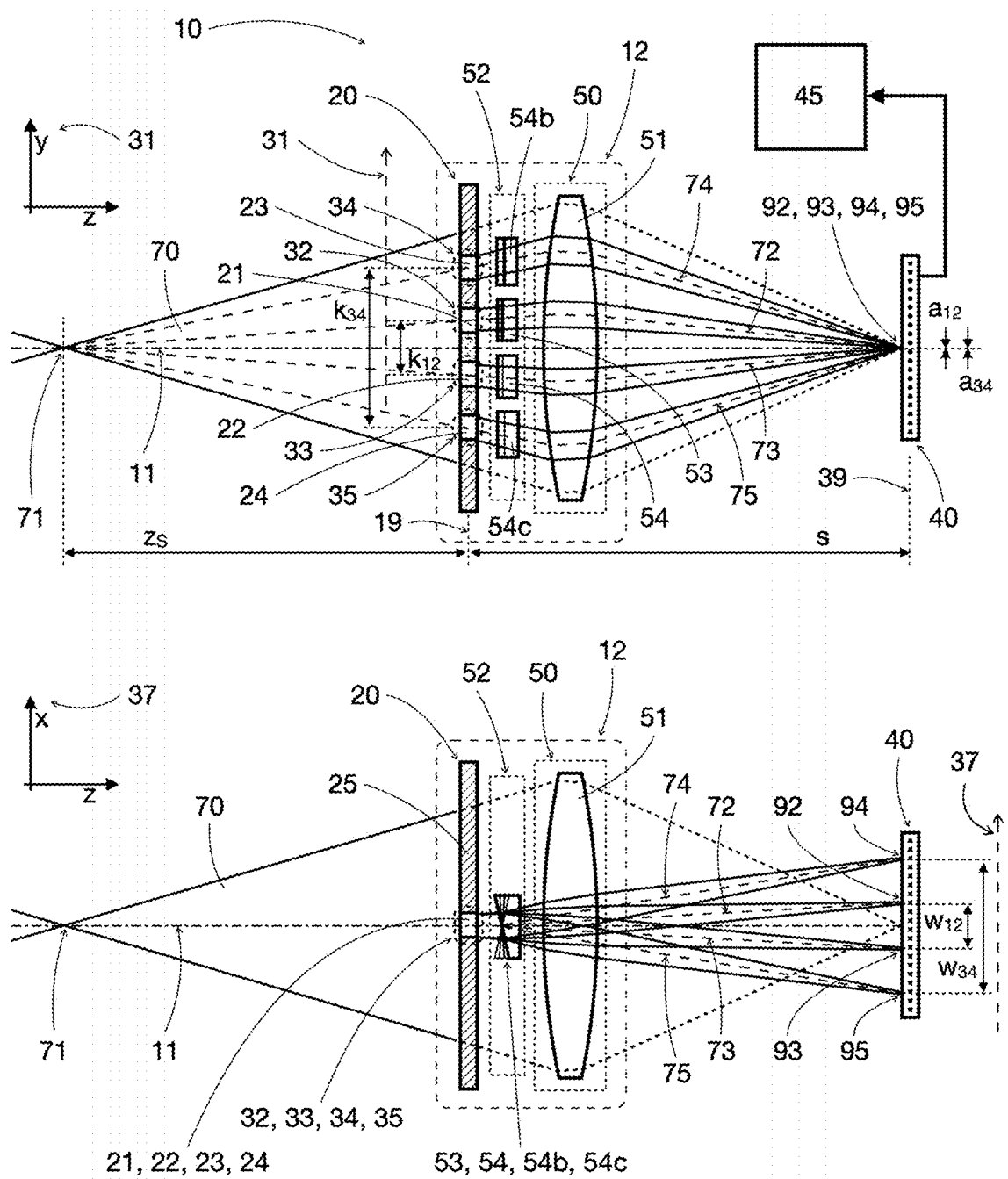
FIG. 25: shows a schematic representation of a form of embodiment of the beam analysis device with a beam shaping device with four sub-apertures for separating out (release of) four sub-beams.

FIG. 25 represents a form of embodiment of the beam analysis device 10, which has a beam shaping device 12 for the release of a total of four sub-beams 72, 73, 74, 75. For this purpose, the modulation device 20 has four mutually delimited transmission zones 21, 22, 23, 24, which define four sub-apertures 32, 33, 34, 35. In this example of embodiment, the sub-apertures 32, 33, 34, 35 are arranged along a lateral axis. Here the first lateral direction 31 is defined by the line connecting the centre points of two sub-apertures, for example the sub-apertures 32 and 33, with the distance $k_{12}$ between the centre points of the sub-apertures. In accordance with the invention, by means of the beam separator device 52, at least one of the sub-beams 72, 73 that are released by the sub-apertures 32, 33, is deflected or offset in the second lateral direction 37. In this example of embodiment, both sub-beams 72, 73 are deflected in the second lateral direction 37 in opposite directions to each other. For this purpose, each sub-aperture 32, 33 is assigned a respective sub-beam deflection element 53, 54. The other sub-apertures 34, 35, which are defined by the transmission zones 23 and 24, are in this example of embodiment also arranged at a distance $k_{34}$ from one another along the first lateral direction 31. Here the transmission zones 23, 24 are arranged further outwards than the transmission zones 21, 22, so that in the case of the sub-beams 74, 75 released by means of the sub-apertures 34, 35, a greater angular alteration occurs in the case of an alteration in the beam focal position 71 than in the case of the sub-beams 72, 73 from the sub-apertures 32, 33 lying closer to the optical axis 11. As a result, the alteration in position of the beam spots 94, 95 generated by the sub-beams 74, 75 on the detector 40 is greater than the alteration in position of the beam spots 92, 93 from the sub-beams 72 and 73. The advantage of using two pairs of sub-apertures with different distances $k_{12}$, $k_{34}$ is that, on the one hand, greater sensitivity and accuracy in determining the axial position of the beam focus 71 is achieved with the pair of sub-apertures lying further out, and on the other hand, even in the case of a sample beam 70 or energy beam 77 with a smaller beam aperture, in which the more outwardly located transmission zones 23, 24 would not be illuminated, or not sufficiently illuminated, the more inwardly located transmission zone pair 21; 22 is still illuminated by the sample beam, enabling a reliable measurement. This means that when using a modulation device 20 with more than two sub-apertures with different distances from each other, both the usable aperture range of the energy beam 77, and also the accuracy of the measurement, are increased. In the example of embodiment shown here, the sub-beams 74, 75, which are released from the additional sub-apertures 34, 35, are also deflected in the second lateral direction 37 in opposite directions to each other. For this purpose, a sub-beam deflection element 54b is assigned to the sub-aperture 34, and a sub-beam deflection element 54c is assigned to the sub-aperture 35. On the detector 40, the beam spots 92, 93 generated by the sub-beams 72, 73 have a distance $a_{12}$ from each other in the first lateral direction 31. This distance $a_{12}$ depends on the axial position of the beam focus 71 and can also be zero, for example, as shown in FIG. 25. The beam spots 94, 95 generated by the sub-beams 74, 75 have a distance $a_{34}$ from each other on the detector 40 in the first lateral direction 31. The distance $a_{34}$ also depends on the axial position of the beam focus 71 and can also be zero, for example. In the lower part of FIG. 25, which shows a projection of the device onto the second lateral direction 37, which is aligned transversely to the first lateral direction 31, and which can be, for example, the x-axis, the mode of operation of the beam separator device 52 can be seen. By means of the sub-beam deflection elements 53, 54, 54b, 54c, the sub-beams 72, 73, 74, 75 are deflected in the direction of the second lateral direction 37 by different amounts in each case. Thus, the beam spots 92, 93, 94, 95 are spatially separated from each other on the detector 40, so that their positions on the detector 40 can be unambiguously determined. The beam spots 92, 93 generated by the sub-apertures 32, 33 have a distance w 12 from each other on the detector 40 along the second lateral direction 37, and the beam spots 94, 95 generated by the sub-apertures 34, 35 have a distance $w_{34}$ from each other on the detector 40 along the second lateral direction 37. The distances in the second lateral direction depend on the individual deflections by the sub-beam deflection elements 53, 54, 54b, 54c, as well as on the axial position of the detector 40, for example the distance s between the modulation device 20 and the detector 40. This means that the distances $w_{12}$ and $w_{34}$ essentially do not depend on the axial position of the beam focus 71, and thus the beam spots 92, 93, 94, 95 on the detector 40 always remain separated for any axial position of the beam focus 71. However, the distances $a_{12}$ and $a_{34}$ in the first lateral direction 31 between the beam spots 92, 93 and 94, 95 are a function of the axial position of the beam focus 71, so that the axial position of the beam focus 71 can be determined from the two distances $a_{12}$ and $a_{34}$. In accordance with the invention, there are two sub-beams, namely the first and the second sub-beam, at least one of which is offset in the second lateral direction 37. In the example of embodiment of FIG. 25, the sub-beams 72, 73 form the first and the second sub-beam. However, the sub-beams 74, 75 could also be regarded as the first and second sub-beams in accordance with the invention, because in this example of embodiment at least one sub-beam of the sub-beams 74, 75 is also offset in the second lateral direction 37. The other elements of the beam analysis device 10 shown in FIG. 25 correspond to the form of embodiment shown in FIG. 1a. For an explanation of the other elements of FIG. 25, reference is therefore made to the description of FIG. 1a.

Figure 26A:
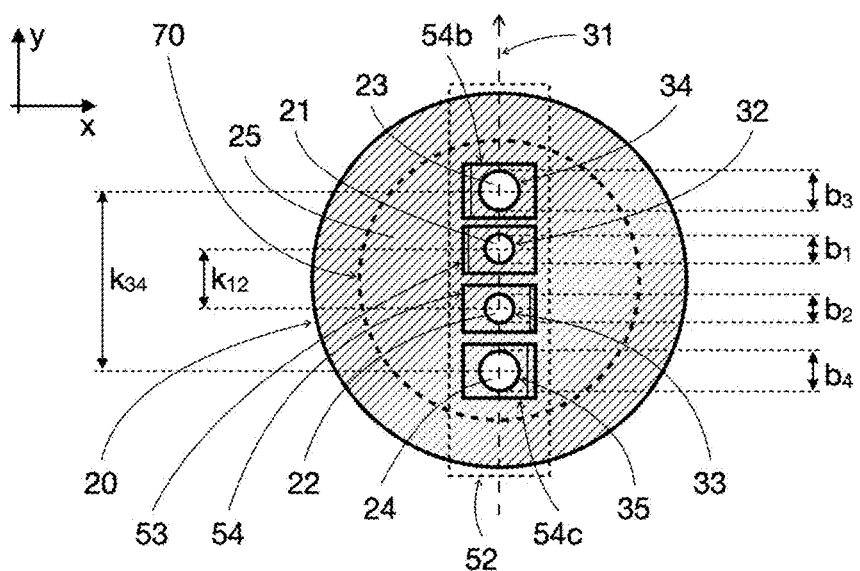
FIG. 26a: shows a schematic representation of a modulation device and a beam separator device for a beam analysis device in accordance with FIG. 25.

FIG. 26a shows, in a view onto the lateral axes 31 and 37, a modulation device 20 for the release of four sub-beams 72, 73, 74, 75 for a beam analysis device 10 as represented in FIG. 25. The lateral axes 31 and 37 can be, for example, the local x and y axes. For clarification of the mode of operation, the beam separator device 52 with the sub-beam deflection elements 53, 54, 54b, 54c, by means of which the deflection of the sub-beams 72, 73, 74, 75 is effected, is also shown in this figure, superimposed on the modulation device 20. In this example, the modulation device 20 has four sub-apertures 32, 33, 34, 35, which are defined by the four mutually delimited transmission zones 21, 22, 23, 24, and are arranged along the first lateral axis 31. The centre points of the inner sub-apertures 32, 33 have a distance $k_{12}$ from each other, and the centre points of the outer sub-apertures 34, 35 have a distance $k_{34}$ from each other. The transmission zones 21, 22, 23, 24, and thus the sub-apertures 32, 33, 34, 35, have defined dimensions $b_1$, $b_2$, $b_3$, $b_4$, wherein the dimensions are the width or, in the case of round transmission zones, the diameter of the respective transmission zone. The dimensions $b_1$, $b_2$, $b_3$, $b_4$ of the transmission zones can be the same size or different sizes. Since the intensity in the beam profile of laser beams often decreases radially outwards, it can be expedient to select the dimensions of the outer transmission zones, here 23 and 24, to be larger than the dimensions of the inner transmission zones, here 21 and 22. It can be expedient to select the dimensions of transmission zones which are at the same radial distance from the optical axis to be the same in pairs.

Figure 26B:
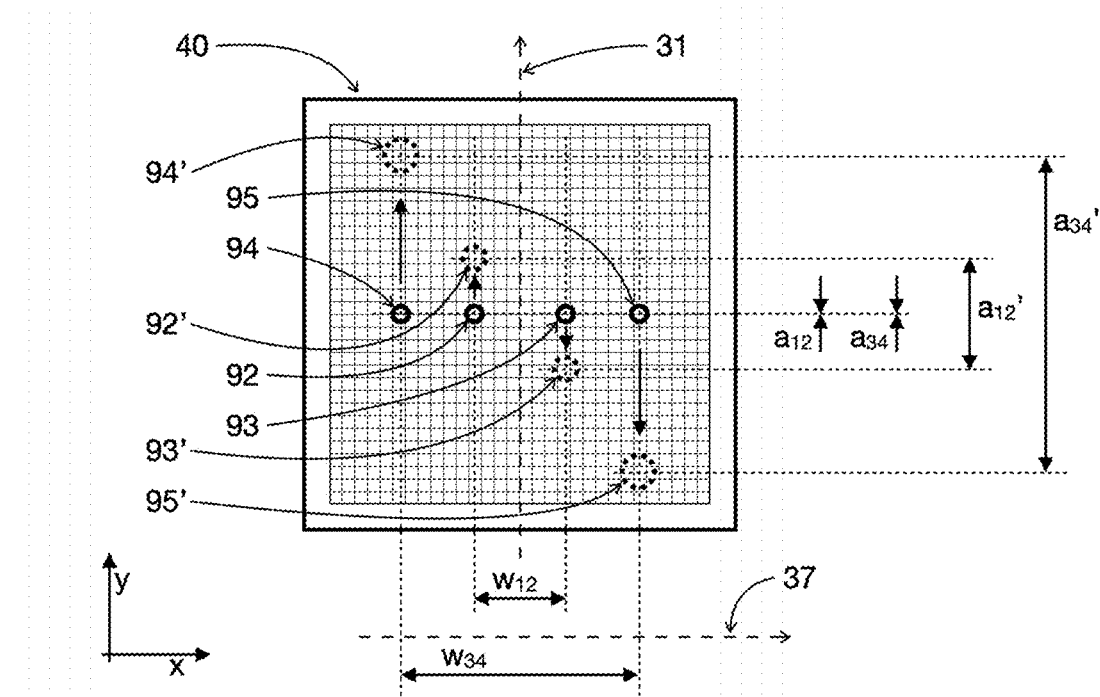

FIG. 26b shows schematically the intensity distribution with the beam spots 92, 93, 94, 95 on the detector 40 for a beam analysis device 10 in accordance with FIG. 25, which is fitted with a modulation device 20, as shown in FIG. 26a. The figure also illustrates the alteration in the distance $a_{12}$ between the beam spots 92, 93 and the alteration in the distance $a_{34}$ between the beam spots 94, 95, when the axial position of the beam focus 71 is altered. The apostrophised reference symbols in the figure indicate the details altered by the axial displacement of the beam focus. The beam spots 92, 93 have a distance $a_{12}$ from each other in the first lateral direction 31. The distance a 12 alters to the distance $a_{12}'$, for example, when the axial position of the beam focus 71 is altered.

In the second lateral direction 37, the beam spots 92, 93 have the distance $w_{12}$ from each other, due to the deflection of the sub-beams 72, 73 by means of the beam separator device 52, which distance does not alter when the axial position of the beam focus 71 alters. Correspondingly, the beam spots 94, 95 have the distance a 34 from each other in the first lateral direction 31. The distance $a_{34}$ alters to the distance $a_{34}'$ when the axial position of the beam focus 71 alters. In the second lateral direction 37, the beam spots 94, 95 have the distance $w_{34}$ from each other, due to the deflection of the sub-beams 74, 75 by means of the beam separator device 52, which distance does not alter when the axial position of the beam focus 71 alters. The distances $w_{12}$ and $w_{34}$ are therefore independent of the axial position of the beam focus 71. When the axial beam focal position is varied, the positions of the beam spots 92, 93, 94, 95 on the detector 40 consequently run on four separate paths. Thus, the assignment of the beam spots is always unambiguous and both the magnitude of an alteration and the direction of the alteration can be unambiguously determined.

FIGS. 27a to 30a schematically illustrate further examples of embodiment of modulation devices 20 and beam separator devices 52 for beam analysis devices 10 in accordance with the invention. FIGS. 27b to 30b show the intensity distributions on the detector 40 for the combination of modulation device 20 and beam separator device 52 shown in the respectively preceding figure. Common to all forms of embodiment is that two sub-beams, namely the first sub-beam 72 and the second sub-beam 73, are released by means of two transmission zones 21, 22, and at least one sub-beam of these two sub-beams 72, 73 is deflected in the second lateral direction 37, which is aligned transversely to the first lateral direction 31, wherein the first lateral direction 31 is defined by the connecting line, that is to say, by the distance $k_{12}$ between the centre points of the two sub-apertures 32, 33. Here the sub-apertures 32, 33 are formed by the transmission zones 21, 22. Unaffected by this, the modulation device 20 can have further transmission zones 23, 24, whereby further sub-beams 74, 75 are released. The further sub-apertures 34, 35 formed by the further transmission zones 23, 24 can be arranged in the same direction, that is to say, in the first lateral direction 31, as the sub-apertures 32, 33 for the two sub-beams 72, 73. However, the further sub-apertures 34, 35 can also be arranged in a different direction. It is possible to separate all sub-beams 72, 73, 74, 75 from each other by means of the beam separator device 52. It is also possible to separate only the first and second sub-beams 72, 73 from each other.

Figure 27A:
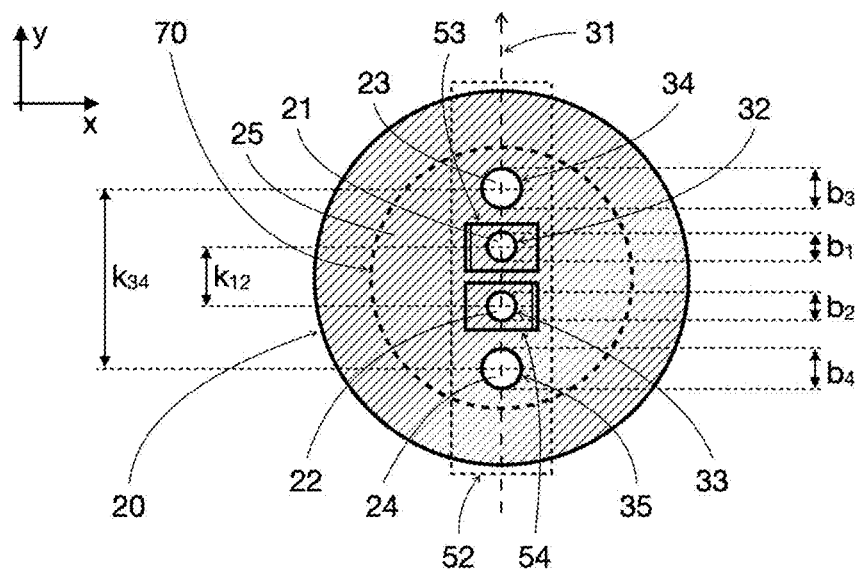
FIG. 27a: shows a schematic representation of a further modulation device and a beam separator device for a beam analysis device similar to FIG. 25.

FIG. 27a, for example, shows the same modulation device 20 as FIG. 26a, but the beam separator device 52 in FIG. 27a only deflects the first sub-beam 72 released by the sub-aperture 32 and the second sub-beam 73 released by the sub-aperture 33 in the second lateral direction 37, while the further sub-beams 74, 75 released by the further sub-apertures 34, 35 are not deflected. The advantage is a somewhat simpler construction of the beam separator device 52.

Figure 27B:
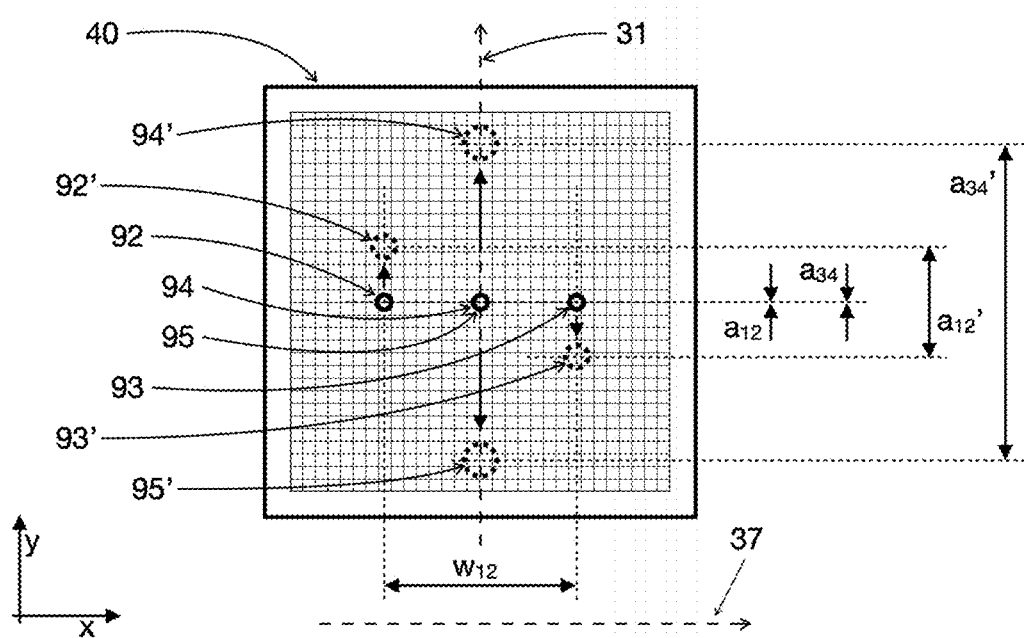

FIG. 27b shows the intensity distribution with beam spots 92, 93, 94, 95 on the detector 40 for a beam analysis device 10, which is fitted with a beam separator device 52 as in FIG. 27a. The beam spots 92, 93 of the first and the second sub-beams 72, 73 have a distance $w_{12}$ from each other in the second lateral direction 37 and consequently run on two paths separated from each other by the distance $w_{12}$ when the axial focal position of the beam focus 71 is altered. The other beam spots 94, 95 of the other sub-beams 74, 75 are not separated from each other in the second lateral direction 37 and consequently run on the same path when the axial focal position of the beam focus 71 alters.

Figure 28A:
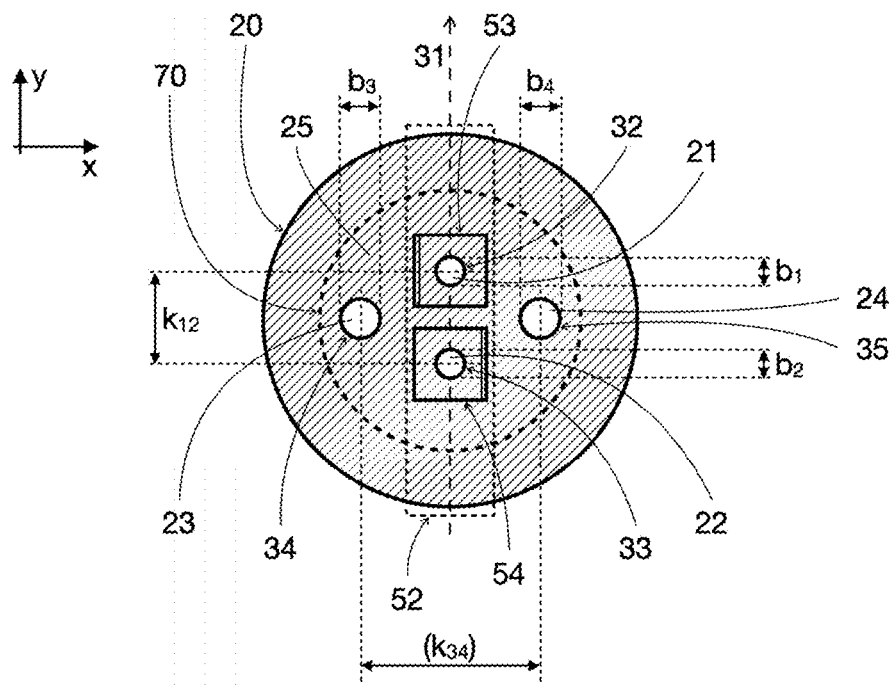
FIG. 28a: shows a schematic representation of a further modulation device with four sub-apertures.
Figure 28B:
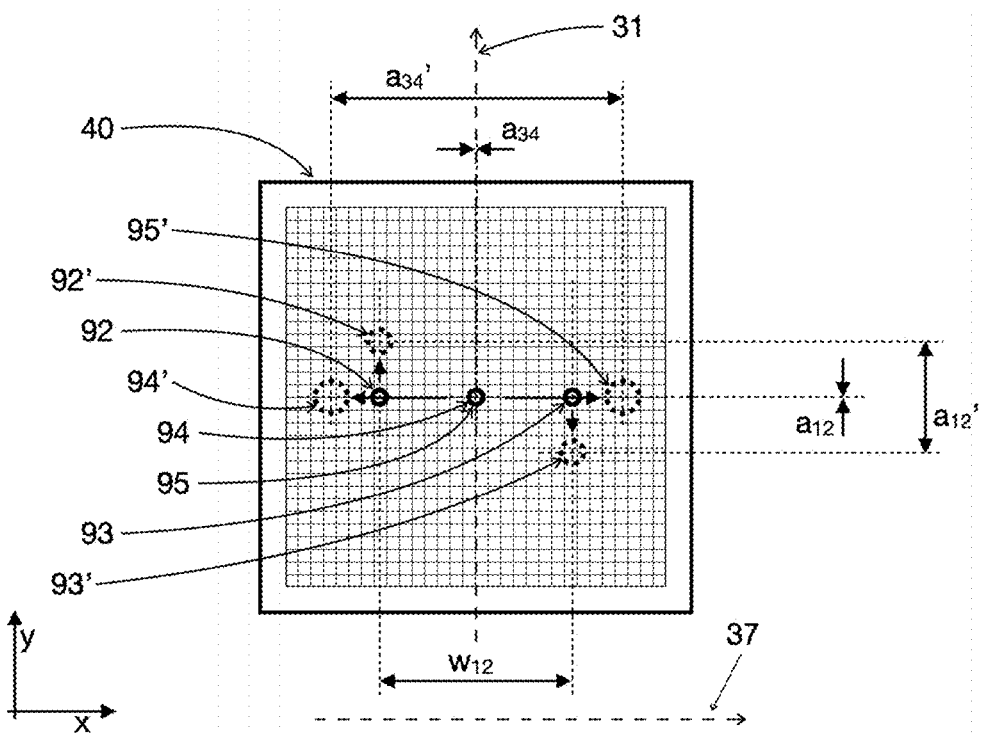

The modulation device 20 shown in FIG. 28a is similar to the modulation device of FIG. 27a, but here the further sub-apertures 34, 35 formed by the further transmission zones 23, 24 are arranged in a lateral direction that differs from the first lateral direction 31 defined by the sub-apertures 32, 33. Consequently, the path or track along which the beam spots 94, 95 travel on the detector 40 is also oriented in a different direction from the paths of the beam spots 92, 93, as is illustrated in FIG. 28b.

Figure 29A:
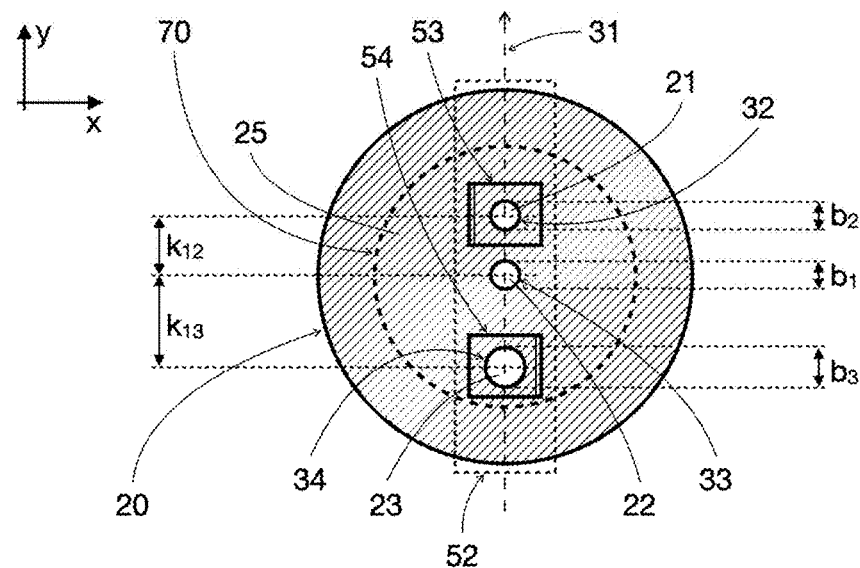
FIG. 29a: shows a schematic representation of a further modulation device and a beam separator device for a beam analysis device similar to FIG. 25, but with three sub-apertures.
Figure 29B:
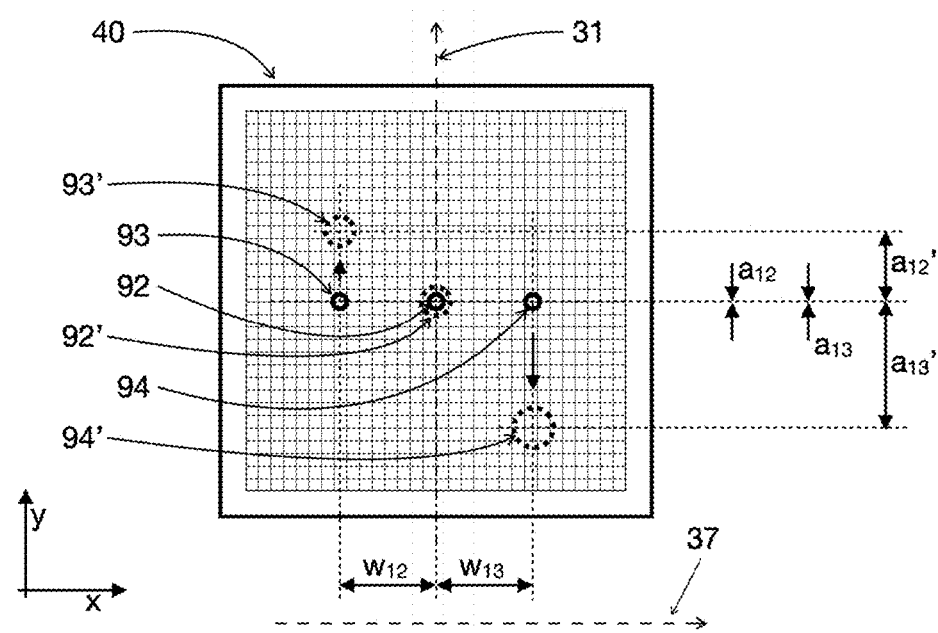

FIGS. 29a and 29b show a possible example of a modulation device 20 for the release of three sub-beams by means of three sub-apertures 32, 33, 34, each of which has different distances from one another. In a similar manner as explained in the description of FIG. 25, this also enables increased accuracy in determining the beam focal position and an increased functional range for beams with different beam divergences.

Figure 30A:
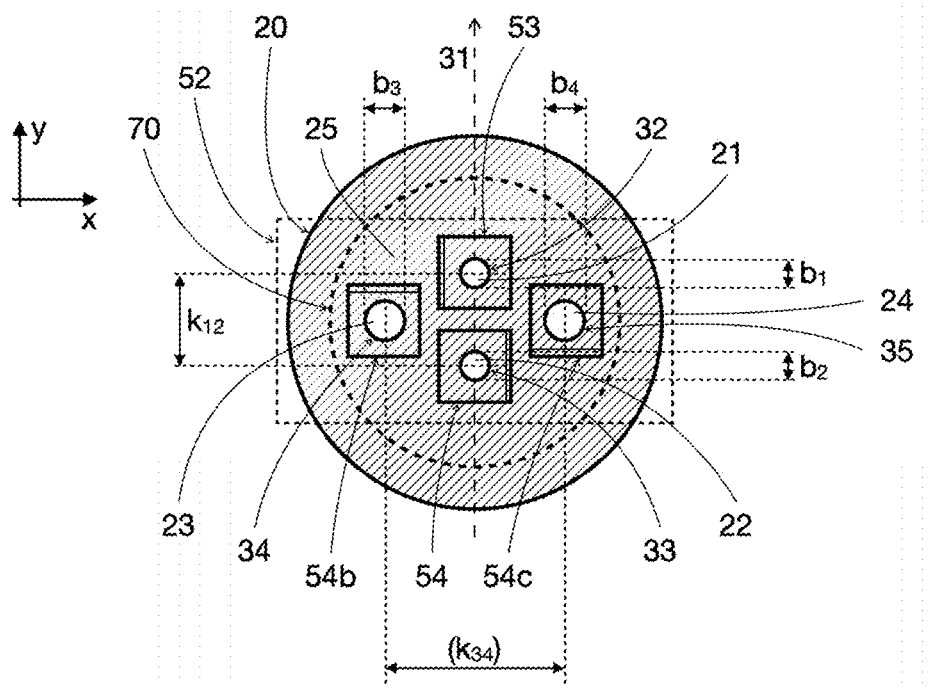
FIG. 30a: shows a schematic representation of a further modulation device with four sub-apertures and a beam separator device for deflecting four sub-beams.
Figure 30B:
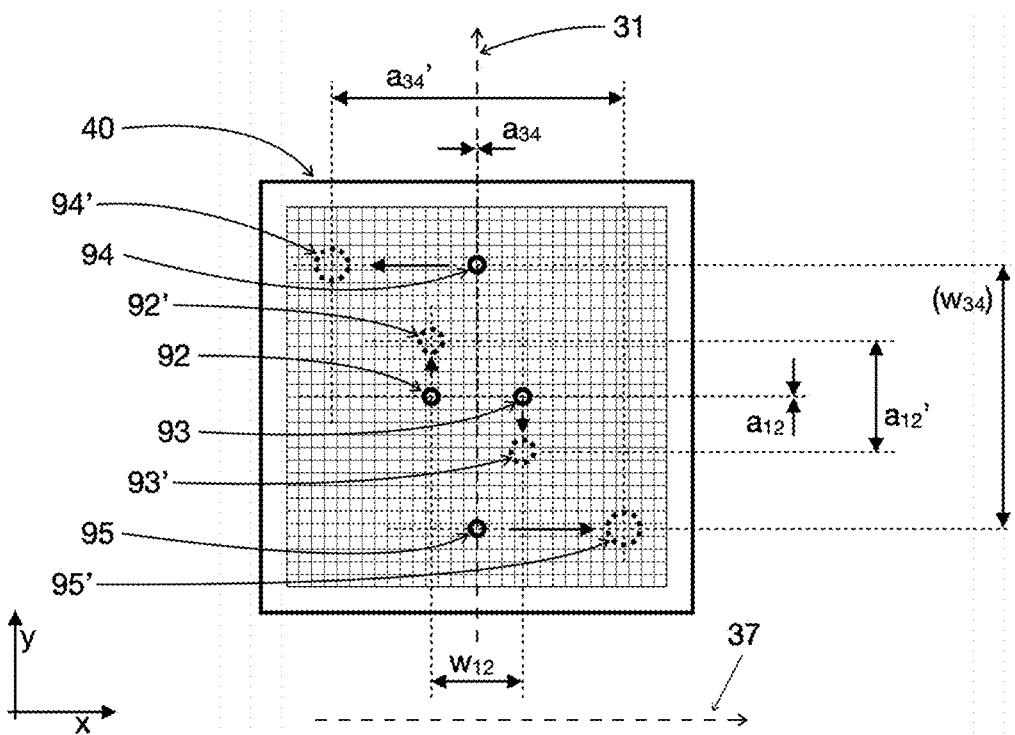

Finally, FIGS. 30a and 30b show a modulation device 20 for the release of four sub-beams by means of four sub-apertures 32, 33, 34, 35 that is similar to the modulation device shown in FIG. 28a. In contrast to FIG. 28a, the beam separator device 52 in FIG. 30a is set up to deflect all four sub-beams, wherein the two sub-beam pairs, deflected on the one hand by the sub-apertures 32 and 33 and on the other hand by the sub-apertures 34 and 35, are in each case deflected in different lateral directions. Consequently, both beam spot pairs 92, 93 and 94, 95 travel on separate paths on the detector 40, but the further beam spot pair 94, 95 travels in a different lateral orientation than the beam spot pair 92, 93 from the first and second sub-beams 72, 73. This is illustrated in FIG. 30b.

The modulation devices 20 and beam separator devices 52 shown are to be understood to be just examples. The beam analysis device 10 in accordance with the invention is not limited to the forms of embodiment shown, and is not limited to the modulation devices and beam separator devices shown.

DETAILED DESCRIPTION OF THE INVENTION

The invention envisages a beam analysis device 10 for determining an axial position of a beam focus 71. Here the beam focus 71 is a focus 76 of an energy beam 77 of electromagnetic radiation, or a focus of a sample beam 70 decoupled from the energy beam 77. The beam analysis device 10 comprises a beam shaping device 12, a detector 40, and an evaluation device 45.

The beam shaping device 12 is set up so as to release at least two sub-beams 72, 73 from the energy beam 77, or from the sample beam 70 decoupled from the energy beam 77, in a plane of the sub-beam release 19. Here the cross-section of each sub-beam 72, 73 in the plane of the sub-beam extraction 19 is defined by a respective sub-aperture 32, 33. In other words, the beam shaping device 12 is set up so as to form the at least two sub-apertures 32, 33 in the plane of the sub-beam release 19 for purposes of releasing a respective sub-beam 72, 73. The sub-apertures 32, 33 are delimited from each other, that is to say, the edges of the sub-apertures 72, 73 do not touch. The lateral positions of the sub-apertures 32, 33 are defined by their respective centre points, wherein the term "lateral" refers to directions in planes at right angles to the respective local optical axis 11. The centre points of the sub-apertures 32, 33 have a distance k from each other. Furthermore, a first lateral direction 31 is defined by the distance k between the sub-apertures 32, 33. In other words, an imaginary connecting line between the centre points of the two sub-apertures 32, 33 defines the first lateral direction 31. The first lateral direction 31 lies in a plane at right angles to the local optical axis 11. Since the local optical axis 11 in a beam path is always identified with a z-axis of a local coordinate system, the first lateral direction 31 thus lies in an x-y plane.

The sub-beam release of the beam shaping device is implemented, for example, as a modulation device 20, which is set up to form at least two transmission zones 21, 22, and at least one blocking zone 25. Here one of the transmission zones 21, 22 forms one of the two sub-apertures 32, 33. The transmission zones 21, 22 are characterised in that the transmission of radiation within the transmission zones 21, 22 is substantially greater than in the region of the blocking zone 25. The term "transmission" is to be understood with regard to the intended direction of propagation of the sub-beams 72, 73 thus released. In particular, a radiation transmittance (or reflectance) in the transmission zones 21, 22 is at least twice as high as a radiation transmittance (or reflectance) in the blocking zone 25. The radiation transmittance (or reflectance) in the blocking zone is preferably at least 10 times less than the radiation transmittance (or reflectance) in the transmission zones 21, 22. Particularly preferably, the radiation transmittance (or reflectance) in the blocking zone is at least 100 times less than the radiation transmittance (or reflectance) in the transmission zones 21, 22.

The sub-apertures 32, 33 have a width b in the plane of the sub-beam release 19 along the first lateral direction 31. The width b of the sub-apertures 32, 33 is at most equal to half the distance k between the centre points of the sub-apertures 32, 33. It follows that between the sub-apertures 32, 33 there is a region, for example a blocking zone 25, which is at least as wide as the width b of the sub-apertures 32, 33. In other words, the distance k between the centre points of the sub-apertures 32, 33 is at least twice the width b of the sub-apertures 32, 33.

The beam forming device 12 is furthermore set up to form an intensity distribution 83 on the detector 40 with at least two beam spots 92, 93, and to form at least one beam spot 92, 93 from each of the two sub-beams 72, 73, to image the at least two sub-beams 72, 73 onto the detector 40, and to deflect and/or offset at least one of the at least two sub-beams 72, 73 in a second lateral direction 37. Each of the two sub-beams 72, 73 forms at least one associated beam spot 92, 93 on the detector 40. By the deflection and/or displacement of at least one of the sub-beams 72, 73 in the second lateral direction 37, a distance w is formed between the positions of the two beam spots 92, 93 on the detector 40 along the second lateral direction 37. The positions of the two beam spots 92, 93 are preferably defined by the centre points, and/or by the centroids of the intensity distributions of the beam spots 92, 93 on the detector 40. Here the second lateral direction 37 is oriented transversely to the first lateral direction 31. The second lateral direction 37 lies in a plane at right angles to the local optical axis 11. Thus, like the first lateral direction 31, the second lateral direction 37 lies in a plane at right angles to the local optical axis 11, that is to say, in an x-y plane. The second lateral direction 37 is oriented, for example, at an angle in the range from 30° to 150° relative to the first lateral direction 31. In particular, the second lateral direction can be oriented (at least substantially) at right angles to the first lateral direction.

By the beam shaping device 12 deflecting and/or displacing the first of the at least two sub-beams 72, 73 in the second lateral direction 37 and/or deflecting and/or displacing both sub-beams 72, 73 in different directions with a directional difference in an alignment along the second lateral direction 37, the beam spot 92 of the first of the at least two sub-beams and the beam spot 93 of the second of the at least two sub-beams are offset from each other (at the detector 40 and thus) in the intensity distribution along the second lateral direction 37 by the distance w, which is transverse to the distance a between these beam spots 92, 93 (at the detector 40 and thus) in the intensity distribution along the first lateral direction 31, and wherein the distance a is caused solely by the distance k in the first lateral direction 31.

In other words, the beam spot 92 caused by the first of the at least two sub-beams at the detector 40 and in the intensity distribution, and the beam spot 93 caused by the second of the at least two sub-beams at the detector and in the intensity distribution, are additionally offset in the intensity distribution by the offset w along the second lateral direction 37 in addition to the distance a along the first lateral direction 31.

The detector 40 comprises a light radiation-sensitive sensor, resolving spatially in two dimensions, which is set up to convert the intensity distribution 83 impinging on the detector 40 into electrical signals. The detector 40 can be a CCD camera, or a CMOS camera, or a comparable device. The light radiation-sensitive sensor, resolving spatially in two dimensions, is typically a pixel-based semiconductor sensor. The detector 40 is arranged along a propagation path for the sub-beams 72, 73 at a distance s behind the plane of the sub-beam release 19.

The evaluation device 45 is set up to process the electrical signals of the detector 40, which represent the intensity distribution 83 on the detector 40. The evaluation device 45 is set up to determine a distance a along the first lateral direction 31 between positions of the two beam spots 92, 93 on the detector 40, more precisely to determine a position difference between the two beam spots 92, 93 in the first lateral direction 31, wherein the position difference between the two beam spots 92, 93 in the first lateral direction 31 is the distance a. The position of the respective beam spot 92, 93 is preferably defined by the centre point and/or the centroid of the intensity distribution of the respective beam spot 92, 93 on the detector 40.

The evaluation device 45 is furthermore set up to determine an axial position of the beam focus 71 based on the distance a, and/or to determine an alteration in the axial position of the beam focus 71 based on an alteration in the distance a.

The evaluation device 45 can, for example, be implemented in the form of a software program running on a computer.

In order to achieve the highest possible accuracy in determining the positions of the beam spots 92, 93 on the detector 40, it is favourable if the width b of the sub-apertures 32, 33 is small compared to their separation distance k. The beam spots 92, 93 on the detector 40 are then relatively small over a wide range of the axial position of the beam focus 71, and any possible influence of an intensity distribution within the beam spots 92, 93 on the determination of the position of the beam spots 92, 93 is small or completely negligible. On the other hand, the sub-apertures should not be too small, as otherwise the beam spots 92, 93 can be widened by diffraction and diffraction structures can arise outside the beam spots 92, 93. The distance k is therefore preferably at least 2.5 times, and at most 25 times, the width b of the sub-apertures 32, 33. Particularly preferably, the distance k is at least 3 times, and at most 12 times, the width b of the sub-apertures 32, 33. Extremely preferably, the distance k is at least 4 times, and at most 7 times, the width b of the sub-apertures 32, 33. The sub-apertures 32, 33 preferably have a simple geometric shape, for example they are circular or elliptical. However, the sub-apertures 32, 33 can also have a square, rectangular, diamond-shaped, hexagonal, octagonal, trapezoidal, or similar, shape. In the case of sub-apertures 32, 33 with a circular shape, the width b corresponds to the diameter of the sub-apertures 32, 33.

In a further development of the invention, the beam shaping device 12 can also be set up to release more than two sub-beams. For this purpose, more than two, for example 3 or 4, mutually delimited sub-apertures can be arranged in the plane of the sub-beam release 19. The plurality of sub-apertures can all be distributed along the first lateral direction 31. It is also possible for the sub-apertures additional to the two sub-apertures 32, 33 to be arranged in a different lateral direction than that of the two sub-apertures 32, 33 in the plane of the sub-beam release 19.

The beam shaping device 12 preferably comprises a beam separator device 52 for purposes of deflecting and/or displacing the first of the at least two sub-beams 72, 73 in the second lateral direction 37.

In a further development, the beam separator device 52 is furthermore set up to deflect and/or offset both sub-beams 72, 73 in different directions, wherein the difference between the deflection directions is aligned along the second lateral direction 37.

The beam shaping device 12 of the beam analysis device 10 comprises a modulation device 20, an imaging device 50 with at least one optical lens 51, and a beam separator device 52. These three devices 20, 50, 52 can be implemented in the form of separate devices. However, two of the three devices or all three devices 20, 50, 52 can also be implemented in the form of a single device. For example, the modulation device 20 can be designed as a double aperture screen. The imaging device 50 can, for example, be designed as a single converging lens 51. However, it is equally possible, for example, to provide the modulation device 20 in the form of a masking device, for example by means of a partial blackening, directly on or in the optical lens 51. In this latter example, the modulation device 20 and the imaging device 50 are implemented in the form of a single device. To continue this example, the optical lens 51 could also be implemented as an aspherical free-form lens, in which the lens surfaces within the sub-apertures 32, 33 have an additional tilt for purposes of deflecting the sub-beams 72, 73 in the second lateral direction 37. In such an example of embodiment for the beam shaping device 12, all devices 20, 50, 52 are then implemented in the form of a single device.

When the axial position of the beam focus 71 is altered, the distance a between the beam spots 92, 93 on the detector 40 alters in the first lateral direction 31. That is to say, the distance a has a functional relationship to the z-position of the beam focus 71. This functional relationship is influenced and/or defined by the following geometric quantities:

a is the distance along the first lateral direction 31 between the beam spots 92 and 93 on the detector 40;

a' is the distance along the first lateral direction between the beam spots 92' and 93' on the detector 40 when the beam focal position is altered;

$\Delta a$ is the alteration of the position differences of the beam spots 32, 33 in the first lateral direction 31, $\Delta a = a' - a$;

k is the distance between the centre points of the sub-apertures 32, 33 in the plane of the sub-beam release 19, wherein the imaginary connecting line between the centre points of the sub-apertures 32, 33 defines the first lateral direction 31;

$z_s$ is the distance between the axial position of the beam focus 71 and the plane of the sub-beam release 19;

$z_s'$ is the distance between the axial position of a shifted beam focus 71' and the plane of the sub-beam release 19;

s is the distance between the plane of sub-beam release 19 and the sensor plane 39 of detector 40;

$\Delta z$ is the alteration in the axial beam focal position, $\Delta z = z_s - z_s'$;

e is the distance from the plane of sub-beam release 19 to the position of the imaging device 50, or more precisely, to the principal plane of the imaging device 50, when the modulation device 20 is positioned with the plane of sub-beam release 19 in front of the imaging device 50.

d is the distance from the position of the imaging device 50, more precisely from the principal plane of the imaging device 50, to the plane of the sub-beam release 19 when the modulation device 20 is positioned with the plane of the sub-beam release 19 behind the imaging device 50.

In practice, the plane of the sub-beam release 19 is usually not of significant interest as a reference point for the distance of the beam focal position 71. It is more practical if the reference point can be arbitrarily selected or calibrated. For this purpose, it is advantageous to specify a functional relationship that directly describes the alteration in focal position. From the application of the beam theorems and the known imaging equations, the following functional relationship is obtained for the beam analysis device 10:

$$\Delta z = \Delta a c_1/(c_2 + \Delta a\ c_3)$$

The formula symbols $c_1, c_2, c_3$ are coefficients, which are introduced for a simplified representation of the formula.

For the case in which the modulation device 20 is positioned in front of the imaging device 50 (cf. FIG. 6), the coefficients $c_1, c_2, c_3$ are given by:

$$c_1 = z_s^2$$

$$c_2 = k\{s[1-(e/f)] + (e^2/f)\}$$

$$c_3 = z_s$$

For the case in which the modulation device 20 is located behind the imaging device 50 (cf. FIG. 7), the coefficients $c_1, c_2, c_3$ are given by:

$$c_1 = [z_s(f-d) + d^2]^2$$

$$c_2 = f^2 ks$$

$$c_3 = (f-d)[z_s(f-d) + d]^2$$

The coefficients $c_1, c_2, c_3$ can be determined by setting at least 3 different known axial positions of the beam focus 71 and determining the corresponding alteration $\Delta a$ of the distance a. The coefficients determined in this way can be stored as calibration data in the evaluation device 45, with which the focal position alteration $\Delta z$ can then be calculated for any distance alterations $\Delta a$ by the evaluation device 45.

Alternatively or additionally, the coefficients can be calculated directly from the geometric distances of the arrangement using the formulas given above and stored in the evaluation device 45.

It should be noted that all axial distances, that is to say, $z_s$/d, e, s, are distances along the optical axis 11. In the case of a beam redirection (beam folding), the distances $z_s$, d, e, s are therefore composed, if necessary in a piecewise manner, from the respective distances along the local optical axes 11. It should also be noted that if the beams are partially guided inside optical material, such as when guided by a beam splitter cube, the corresponding partial distances must be corrected by a factor dependent on the refractive index of the optical material.

In the variant of embodiment of the beam analysis device 10 with the modulation device 20 behind the imaging device 50, that is to say, behind the at least one optical lens 51 in the beam direction, there is a particularly interesting special case in which the distance d from the principal plane of the imaging device 50 to the plane of the sub-beam release 19 is equal to the focal length f of the imaging device 50. In other words, the plane of the sub-beam release 19 is located at the image-side focal point of the imaging device 50. For such an embodiment of the beam analysis device 10, the coefficients of the functional relationship result in:

$$c_1 = f^4$$

$$c_2 = f^2 ks$$

$$c_3 = 0$$

This results in a particularly simple functional relationship with the particular feature that the alteration $\Delta a$ in the distance a between the beam spots 92, 93 is exactly proportional to the alteration $\Delta z$ in the axial beam focal position:

$$\Delta z = \Delta a f^2/(ks)$$

With this linear relationship, the calibration of the device is simplified and a high accuracy is achieved in the determination of the focal position.

It is particularly advantageous in such an arrangement that the absolute z-position of the beam focus ($z_s$) is not required for the calculation of a focal position alteration $\Delta z$.

This feature or arrangement can be advantageously implemented in forms of embodiment in which a distance between the imaging device 50 and the modulation device 20 is provided in any event, for example when the modulation device 20 is arranged in the folded beam path (cf. for example FIGS. 12 and 13). This aspect of the invention can therefore be further advantageously combined in forms of embodiment in which two folded beam paths are implemented and no modulation device is present in one of the folded beam paths, so that the original beam profile of the sample beam 70 can be simultaneously registered and determined (cf. FIGS. 17 and 18). In the further combination with an axially adjustable mirror 64 in the beam path of the unmodulated beam 78, the recording of an entire beam caustic, and thus the determination of all geometric beam parameters, is also possible (cf. FIGS. 19a to 19f).

The first lateral direction 31 can be defined locally. In each case it is (at least substantially) at right angles to the local optical axis 11. In particular, it can be defined as that direction in a plane at right angles to the local optical axis 11 along which the at least two sub-beams 72, 73 have a distance relative to each other in this plane by virtue only of the distance k of the sub-apertures 32, 33.

The second lateral direction 37 can be defined locally. In each case it is (at least substantially) at right angles to the optical axis 11, and transverse to the (local) first lateral direction 31. The second lateral direction 37 can, viewed globally, be altered once or a number of times, for example by beam folding and/or beam redirection.

The sample beam 70 can be identical to the energy beam 77, in particular if the sample beam 70 is not formed by decoupling from an energy beam.

In a further development of the invention, at least one of the at least two sub-apertures 32, 33 can be switched.

Particularly preferably, the at least two sub-apertures 32, 33 can be switched. For example, the beam shaping device 12 can form an LCD screen device to form one or a plurality of switchable sub-apertures 32, 33. In this case, a plane of the LCD screen device can define the plane of the sub-beam release 19.

One or a plurality of the at least two sub-apertures 32, 33 of the beam shaping device 12 are preferably invariable. Such a sub-aperture 32, 33 can, for example, be formed by a fixed screen opening and/or a (spatially limited) reflection surface of a mirror, and in this way can form a transmission zone 21, 22 of the modulation device 20. This enables a simple, robust, reliable, and cost-effective implementation.

In a preferred form of embodiment, one or a plurality of the at least two sub-apertures 32, 33 of the beam shaping device 12 are variable. A variable sub-aperture 32, 33 can be implemented, for example, by a plurality of pixels of an LCD screen device, and/or by a screen opening with a mechanically adjustable size. A variable sub-aperture 32, 33 can allow an adaptation to current measurement conditions (for example, light intensity, light distribution in the light beam to be measured, wavelength(s), etc.).

A beam direction can be defined locally. The beam direction can, viewed globally, be altered, for example by beam folding and/or beam redirection. The local beam direction can be defined, for example, by a direction of a local Poynting vector of the sample beam 70.

In the propagation direction of the radiation downstream of the plane of the sub-beam release 19, a local beam direction of a sub-beam 72, 73 can be defined by a direction of a local Poynting vector of the respective sub-beam 72, 73.

In the propagation direction of the radiation, downstream of the plane of the sub-beam release 19, a local (total) beam direction can be defined by an averaging of the local Poynting vectors of the at least two sub-beams 72, 73. The magnitudes of the Poynting vectors of these sub-beams can be normalised before averaging. Alternatively, the local (total) beam direction can be defined by the Poynting vector of a fictitious course of the sample beam without a release of the sub-beams.

The local optical axis 11 can, for example, be defined by the intended local overall beam direction in operation.

One advantage of the invention lies in the fact that the measuring principle of the beam analysis device is based on the determination of positions of mutually delimited beam spots on the detector. The position of a beam spot can be determined, for example, by calculating the centroid of the related intensity distribution, that is to say, the first moment of an intensity distribution. The determination of positions and their distance relative to each other is largely independent of, for example, the level of a constant signal background, which can be caused by scattered light and/or sensor noise. As a result the measurement principle is less error-prone than other methods that are based, for example, on the determination of a beam diameter, that is to say, the second moment of an intensity distribution, and its alteration, because the determination of a second moment is relatively sensitive to alterations in the level of the background.

A further significant advantage of the invention is that the determination of the axial position of the beam focus is not influenced by variations in the beam quality of the laser radiation or the sample beam.

The determination of alterations in the axial position of the beam focus is possible in quasi-real time, that is to say, the determination requires only a fraction of the typical time constant of focal position alterations that are caused by the thermal focal shift. The invention is therefore also capable of providing signals for controlling laser material processing during a laser processing operation.

Possible embodiments are shown in the figures, and explained in the figure descriptions, wherein the invention is not limited to the forms of embodiment shown. Various features or forms of embodiment shown in the figures can also be combined with each other to obtain further forms of embodiment of the invention.

For the purposes of this disclosure, an energy beam is preferably a beam of electromagnetic radiation having a wavelength in the range from 0.1 µm to 10 µm, more preferably in the range from 0.3 µm to 3 µm, and more particularly in the range from 0.3 µm to 1.5 µm.

For the purposes of this disclosure, laser radiation is preferably electromagnetic radiation in the range from 0.3 µm to 1.5 µm and with a power of at least 1 mW, particularly preferably with a power of at least 100 W.

LIST OF THE REFERENCE SYMBOLS

10 Beam analysis device
11 Optical axis, local optical axis
12 Beam shaping device
14 Decoupling device
15 Beam decoupler
16 Second beam decoupler
19 Plane of the release of the sub-beams
20 Modulation device
21, 22 Transmission zones
23, 24 Further transmission zones
25 Blocking zone
31 First lateral direction
32, 33 Sub-apertures
34, 35 Further sub-apertures
37 Second lateral direction
39 Sensor plane
40 Detector
42 Second detector
43 Absorber device
44 Absorber and/or power measuring device
45 Evaluation device
49 Position of the imaging device, principal plane of the imaging device
50 Imaging device
51 Optical lens
52 Beam separator device
53, 54 Sub-beam deflection elements, e.g. wedge plates, prisms, or plane plates
54b, 54c Further sub-beam deflection elements, e.g. wedge plates, prisms or plane plates
55 Second beam separator device
56, 57 Sub-beam deflection elements, e.g. mirrors
58, 59 Sub-beam deflection elements, e.g. mirrors
60 Beam folding device
61 Beam splitter
62 Second beam splitter
63 Further imaging device
64 Mirrors
66 Positioning device
67 Further imaging device
68 Deflection mirror
69 Shutter device
70 Sample beam
71 Beam focus
72, 73 Sub-beams
74, 75 Further sub-beams
76 Energy beam focus
77 Energy beam
78 Unmodulated beam
79 Shaped sample beam
80 Intensity distribution
81 Intensity distribution in front of the modulation device
82 Intensity distribution behind the modulation device
83 Intensity distribution on the detector
92, 93 Beam spots
94, 95 Further beam spots
98 Beam spot of the unmodulated beam
99 Far-field intensity distribution
100 Processing optics
110 Optical fibre end 113 Collimator
116 Focusing optics
120 Protective glass

The invention claimed is:

1. A beam analysis device (10) for determining an axial position of a beam focus (71), wherein
the beam focus (71) is a focus (76) of an energy beam (77) of electromagnetic radiation, or a focus of a sample beam (70) decoupled from the energy beam (77), comprising a beam shaping device (12), a detector (40), and an evaluation device (45); wherein
the beam shaping device (12)
is set up to release two sub-beams (72, 73) from the energy beam (77), or from the sample beam (70) decoupled from the energy beam (77), in a plane of the sub-beam release (19), wherein
the two sub-beams (72, 73) are a first sub-beam (72) and a second sub-beam (73), wherein
cross-sections of the two sub-beams (72, 73) in the plane of the sub-beam release (19) are defined by a respective sub-aperture (32, 33), wherein
the sub-apertures (32, 33) are delimited from one another, and centre points of the sub-apertures (32, 33) are located at a distance k from one another, wherein
a first lateral direction (31) is defined by the distance k of the sub-apertures (32, 33), wherein
the term "lateral" refers to directions in planes at right angles to the respective local optical axis (11),
is set up to form an intensity distribution (83) on the detector (40) with beam spots (92, 93), and to form at least one beam spot (92) from the first sub-beam (72) and at least one beam spot (93) from the second sub-beam (73), to image the two sub-beams (72, 73) onto the detector (40) and to deflect and/or offset at least one of the two sub-beams (72, 73) in a second lateral direction (37) so as to form a distance w along the second lateral direction (37) between two beam spots (92, 93) on the detector (40), wherein
the second lateral direction (37) is aligned transversely to the first lateral direction (31), wherein
the two beam spots (92, 93) are the at least one beam spot (92) of the first sub-beam (72) and the at least one beam spot (93) of the second sub-beam (73); wherein
the detector (40)
comprises a light radiation-sensitive sensor, resolving spatially in two dimensions, which is set up to convert the intensity distribution (83) impinging on the detector (40) into electrical signals, and
is arranged along a propagation path for the two sub-beams (72, 73) at a distance s behind the plane of the sub-beam release (19); and wherein
the evaluation device (45)
is set up to process the electrical signals of the detector (40), which represent the intensity distribution (83) on the detector (40),
is set up to determine a distance along the first lateral direction (31) between positions of the two beam spots (92, 93) on the detector (40), and
is set up to determine an axial position of the beam focus (71) based on the distance a, and/or to determine an alteration in the axial position of the beam focus (71) based on an alteration in the distance a.

2. The beam analysis device (10) according to claim 1, wherein
the first lateral direction (31) and the local optical axis (11) between the plane of the sub-beam release (19) and the detector (40) are altered by beam folding and/or beam redirection.

3. The beam analysis device (10) according to claim 1, wherein
the beam shaping device (12) is set up to deflect and/or offset the two sub-beams (72, 73) relative to each other, wherein
a difference between the deflections and/or displacements of the two sub-beams (72, 73) is aligned along the second lateral direction (37) so as to form the distance w along the second lateral direction (37) between the two beam spots (92, 93) on the detector (40).

4. The beam analysis device (10) according to claim 1, comprising a decoupling device (14), wherein
the decoupling device (14) comprises a beam decoupler (15) for purposes of decoupling the sample beam (70) from the energy beam (77).

5. The beam analysis device (10) according to claim 4, wherein
the beam decoupler (15) is a beam splitter device set up to decouple a radiation component in the range from 0.01% to 5% of the energy beam (77) as a sample beam (70) by reflection and/or transmission.

6. The beam analysis device (10) according to claim 1, wherein
the beam shaping device (12) comprises an imaging device (50) with at least one optical lens (51) for purposes of imaging the two sub-beams (72, 73) onto the detector (40).

7. The beam analysis device (10) according to claim 6, wherein
the plane of the sub-beam release (19) is arranged at the image-side focal point of the imaging device (50).

8. The beam analysis device (10) according to claim 7, wherein
the evaluation device (45) is set up to determine the axial position of the beam focus (71) based on the distance a between the two beam spots (92, 93), and/or the alteration in the axial position of the beam focus (71) based on the alteration in the distance a between the two beam spots (92, 93), by means of a linear calculation rule.

9. The beam analysis device (10) according to claim 1, wherein
the evaluation device (45) is set up to determine the axial position of the beam focus (71) based on the distance a between the two beam spots (92, 93), and/or the alteration in the axial position of the beam focus (71) based on the alteration in the distance a between the two beam spots (92, 93), by means of an at least partially linear calculation rule.

10. The beam analysis device (10) according to claim 1, comprising a beam folding device (60), which includes a beam splitter (61) and at least one mirror (64, 56, 57, 58, 59), and is arranged in the beam path in front of the detector (40), wherein
the at least one mirror (64, 56, 57, 58, 59) is arranged to reflect a radiation component leaving the beam splitter (61) back into the beam splitter (61), thereby forming a first folded beam path, and wherein the plane of the sub-beam release (19) of the beam shaping device (12) is located in the beam path in front of the beam folding device (60), or in the first folded beam path.

11. The beam analysis device (10) according to claim 10, wherein
the beam folding device (60) additionally includes at least one second mirror (64, 56, 57, 58, 59), wherein
the second mirror (64, 56, 57, 58, 59) is arranged to reflect a further radiation component leaving the beam splitter (61) back into the beam splitter (61), thus forming a second folded beam path.

12. The beam analysis device (10) according to claim 11, wherein
the plane of the sub-beam release (19) of the beam shaping device (12) is located in the first folded beam path, wherein
no sub-beam release is arranged in the second folded beam path, for purposes of guiding a radiation component of the sample beam (70) or the energy beam (77) as an unmodulated beam (78) onto the detector (40), and wherein
the evaluation device (45) is set up to determine a beam diameter and/or a beam profile from an intensity distribution of a beam spot (98) of the unmodulated beam (78) on the detector (40).

13. The beam analysis device (10) according to claim 12, wherein
the mirror (64) is arranged such that it can be axially displaced in the second folded beam path, and the position of the mirror (64) can be adjusted by means of a positioning device (66).

14. The beam analysis device (10) according to claim 1, wherein
the beam shaping device (12) comprises a beam separator device (52) with at least one sub-beam deflection element (53, 54, 56, 57, 58, 59) for purposes of deflecting and/or displacing the at least one of the two sub-beams (72, 73) in the second lateral direction (37) so as to form the distance w along the second lateral direction (37) between the two beam spots (92, 93) on the detector (40).

15. Beam analysis device (10) according to claim 14, wherein
the beam separator device (52) comprises at least two sub-beam deflection elements (53, 54, 56, 57, 58, 59) for purposes of deflecting and/or displacing the two sub-beams (72, 73) relative to one another, wherein
a difference between the deflections and/or displacements of the two sub-beams (72, 73) is aligned along the second lateral direction (37) so as to form the distance w along the second lateral direction (37) between the two beam spots (92, 93) on the detector (40).

16. The beam analysis device (10) according to claim 14, wherein
the beam separator device (52) includes at least one wedge plate (53, 54) as a sub-beam deflection element, which is arranged in alignment in front of or behind one of the sub-apertures (32, 33) in the beam direction, and which is set up to deflect that one of the two sub-beams (72, 73) that is released from this sub-aperture (32, 33) by an angular amount in the range from 0.02° to 6°.

17. The beam analysis device (10) according to claim 14 or 15, wherein
the beam separator device (52) includes at least one tilted plane plate (53, 54) or a prism as a sub-beam deflection element, which is arranged in alignment in front of or behind one of the sub-apertures (32, 33) in the beam direction, and which is set up to displace that one of the two sub-beams (72, 73) that is released from this sub-aperture (32, 33) by an amount in the range from 0.05 mm to 3 mm.

18. The beam analysis device (10) according to claim 10, wherein
the beam separator device (52) is arranged within the first folded beam path and includes at least two mirrors (56, 57, 58, 59) as sub-beam deflection elements,
which are arranged in alignment in front of or behind a respective one of the sub-apertures (32, 33) in the direction of the beam, or whose periphery itself forms the sub-apertures (32, 33), and
which are set up for the back reflection of a respective one of the two sub-beams (72, 73), wherein
an angular difference between the normal directions on the mirror surfaces of the mirrors (56, 57, 58, 59) lies in a range from 0.01° to 3°, and wherein
the difference between the normal directions on the mirror surfaces of the mirrors (56, 57, 58, 59) is aligned along the second lateral direction (37).

19. The beam analysis device (10) according to claim 1, wherein
the evaluation device (45) is furthermore set up to determine a lateral position of the entire intensity distribution (83) with the two beam spots (92, 93) on the detector (40), and is set up to calculate a lateral position of the beam focus (71) of the sample beam (70) from the lateral position of the entire intensity distribution (83), and/or to calculate an alteration in the lateral position of the beam focus (71) of the sample beam (70) from an alteration in the lateral position of the entire intensity distribution (83).

20. The beam analysis device (10) according to claim 6, additionally including a beam splitter (62) for purposes of splitting the sample beam (70), a further imaging device (63) comprising at least one optical lens, and a second detector (42),
wherein the beam splitter (62) is arranged in the beam path in front of the plane of the sub-beam release (19) of the beam shaping device (12),
wherein the beam splitter (62) is arranged between the optical lens (51) of the imaging device (50) and the plane of the sub-beam release (19), and
wherein the further imaging device (63) is arranged between the beam splitter (62) and the second detector (42) for purposes of imaging an enlarged beam spot (98), or an enlarged image of the beam focus (71), onto the second detector (42).

21. The beam analysis device (10) according to claim 20, wherein
the evaluation device (45) is set up to process the electrical signals generated by the second detector (42), and wherein
the evaluation device (45) is set up to determine a beam diameter, and/or a focal diameter, from an intensity distribution on the second detector (42).

22. The beam analysis device (10) according to claim 6, additionally including a beam splitter (62) for purposes of splitting the sample beam (70), a further imaging device (67) with at least one optical lens, and a second detector (42),
wherein the beam splitter (62) is arranged in the beam path in front of the plane of the sub-beam release (19) of the beam shaping device (12), wherein the beam splitter (62) is arranged between the optical lens (51) of the imaging device (50) and the plane of the sub-beam release (19), wherein the further imaging device (67) is arranged between the beam splitter (62) and the second detector (42), wherein the imaging device (50) and the further imaging device (67) together form a combined lens system, which has an image-side focal plane, and wherein the second detector (42) is arranged in the image-side focal plane of the combined lens system.

23. The beam analysis device (10) according to claim 22, wherein the evaluation device (45) is set up to process the electrical signals generated by the second detector (42), and wherein the evaluation device (45) is set up to determine a divergence angle from an intensity distribution on the second detector (42).

24. The beam analysis device (10) according to claim 1, wherein the beam shaping device (12) is set up so that the positions of the two beam spots (92, 93) on the detector (40) run on two paths separated from each other by the distance w when the axial position of the beam focus (71) is varied.

25. A system comprising a beam analysis device (10) according to claim 1, and processing optics (100) for purposes of guiding and focusing the energy beam (77), wherein the processing optics (100) comprise a decoupling device (14) for purposes of decoupling the sample beam (70) from the energy beam (77), and wherein the beam analysis device (10) can be connected to the processing optics (100) for purposes of receiving the decoupled sample beam (70).

26. A method for determining an axial position of a beam focus (71), wherein the beam focus (71) is a focus (76) of an energy beam (77) of electromagnetic radiation, or a focus of a sample beam (70) decoupled from the energy beam (77), comprising the following steps:

release of two sub-beams (72, 73) from the energy beam (77), or from the sample beam (70) decoupled from the energy beam (77), in a plane of the sub-beam release (19), wherein the two sub-beams (72, 73) are a first sub-beam (72) and a second sub-beam (73), wherein cross-sections of the two sub-beams (72, 73) in the plane of the sub-beam release (19) are defined by a respective sub-aperture (32, 33), wherein the sub-apertures (32, 33) are delimited from one another, and centre points of the sub-apertures (32, 33) are located at a distance k from one another, wherein a first lateral direction (31) is defined by the distance k of the sub-apertures (32, 33), wherein the term "lateral" refers to directions in planes at right angles to the respective local optical axis (11), guidance of the two sub-beams (72, 73) onto a detector (40), which is arranged along a propagation path for the two sub-beams (72, 73) at a distance s behind the plane of the sub-beam release (19), comprising:

imaging of the two sub-beams (72, 73) onto the detector (40) to form at least one beam spot (92) from the first sub-beam (72) and at least one beam spot (93) from the second sub-beam (73), so as to form an intensity distribution (83) on the detector (40), which comprises two beam spots (92, 93), wherein the two beam spots (92, 93) are the at least one beam spot (92) of the first sub-beam (72) and the at least one beam spot (93) of the second sub-beam (73), deflection and/or displacement of at least one of the two sub-beams (72, 73) in a second lateral direction (37), thereby forming a distance w along the second lateral direction (37) between the two beam spots (92, 93) on the detector (40), wherein the second lateral direction (37) is oriented transversely to the first lateral direction (31), conversion of the intensity distribution (83) impinging on the detector (40) into electrical signals by means of a light radiation-sensitive sensor, resolving spatially in two dimensions, of the detector (40), processing of the electrical signals of the detector (40), which represent the intensity distribution (83) on the detector (40), determination of a distance a along the first lateral direction (31) between positions of the two beam spots (92, 93), determination of the axial position of the beam focus (71) based on the distance a, or determination of an alteration in the axial position of the beam focus (71) based on an alteration in the distance a.

27. The method according to claim 26, comprising:

deflection and/or displacement of the two sub-beams (72, 73) relative to one another, wherein a difference between the deflections and/or displacements of the two sub-beams (72, 73) is aligned along the second lateral direction (37), thereby forming the distance w along the second lateral direction (37) between the two beam spots (92, 93) on the detector (40).

28. The method according to claim 26, comprising a decoupling of the sample beam (70) from the energy beam (77).

29. The method according to claim 28, wherein a radiation component in the range from 0.01% to 5% of the energy beam (77) is decoupled as a sample beam (70) by reflection and/or transmission.

30. The method according to claim 26, wherein the imaging of the two sub-beams (72, 73) onto the detector (40) is carried out by means of an imaging device (50) with at least one optical lens (51).

31. The method according to claim 30, wherein the release of the two sub-beams (72, 73) takes place at the image-side focal point of the imaging device (50).

32. The method according to claim 31, wherein the determination of the axial position of the beam focus (71) based on the distance a between the two beam spots (92, 93), or the alteration of the axial position of the beam focus (71) based on the alteration of the distance a between the two beam spots (92, 93), is performed by means of a linear calculation rule.

33. The method according to claim 26, wherein the determination of the axial position of the beam focus (71) based on the distance a between the two beam spots (92, 93), or the alteration of the axial position of the beam focus (71) based on the alteration of the distance a between the two beam spots (92, 93), is performed by means of an at least partially linear calculation rule.

34. The method according to claim 26, wherein a first folded beam path is formed by means of a beam folding device (60), which includes a beam splitter (61) and at least one mirror (64, 56, 57, 58, 59), and which is arranged in the beam path in front of the detector (40), by reflection of a radiation component leaving the beam splitter (61) at the at least one mirror (64, 56, 57, 58, 59) back into the beam splitter (61), and wherein
the release of the two sub-beams (72, 73) takes place in the beam path in front of the beam folding device (60), or in the first folded beam path.

35. The method according to claim 34, wherein
a second folded beam path is formed by means of the beam folding device (60), which additionally includes at least one second mirror (64, 56, 57, 58, 59), by reflection of a further beam component leaving the beam splitter (61) at the second mirror (64, 56, 57, 58, 59) back into the beam splitter (61).

36. The method according to claim 35, wherein
the release of the two sub-beams (72, 73) takes place in the first folded beam path, wherein
in the second folded beam path no release of sub-beams takes place, and a radiation component is guided as an unmodulated beam (78) onto the detector (40), and wherein
a beam diameter and/or a beam profile is determined from an intensity distribution of a beam spot (98) of the unmodulated beam (78) on the detector (40).

37. The method according to claim 36, wherein
the axial position of the mirror (64) in the second beam path is varied by means of a positioning device (66), and an intensity distribution of the beam spot (98) of the unmodulated beam (78) is registered on the detector (40) at at least three different positions of the mirror (64), and wherein
at least one beam parameter of the sample beam (70) is determined from the registered intensity distributions.

38. The method according to claim 26, comprising the determination of a lateral position of the entire intensity distribution (83) with the two beam spots (92, 93) on the detector (40), and the calculation of a lateral position of the beam focus (71) of the sample beam (70) from the lateral position of the entire intensity distribution (83) or the calculation of an alteration in the lateral position of the beam focus (71) of the sample beam (70) from an alteration in the lateral position of the entire intensity distribution (83).

39. The method according to claim 30, comprising the steps of:
splitting of the sample beam by means of a beam splitter (62) arranged in the beam path behind the optical lens (51) of the imaging device (50) and in front of the plane of the sub-beam release (19),
imaging of a split sample beam onto a second detector (42) by means of a further imaging device (63) with at least one optical lens, which is arranged between the beam splitter (62) and the second detector (42) so as to form an enlarged beam spot (98), or an enlarged image of the beam focus (71), on the second detector (42), and
determination of a beam diameter or a focal diameter from an intensity distribution on the second detector (42).

40. The method according to claim 30, comprising the following steps:
splitting of the sample beam by means of a beam splitter (62), which is arranged in the beam path behind the optical lens (51) of the imaging device (50) and in front of the plane of the sub-beam release (19),
guidance of a split sample beam onto a second detector (42) by means of a further imaging device (67) with at least one optical lens, which is arranged between the beam splitter (62) and the second detector (42) for purposes of forming a far-field beam distribution (99) on the second detector (42), wherein
the imaging device (50) and the further imaging device (67) together form a combined lens system, which has an image-side focal plane, and wherein
the second detector (42) is arranged in the image-side focal plane of the combined lens system, and
determination of a far-field beam diameter or a divergence angle from an intensity distribution on the second detector (42).

41. The method according to claim 26, wherein
the energy beam (77) is focused by processing optics (100).

42. The method according to claim 41, wherein
the determined axial position of the beam focus (71), or the determined alteration of the axial position of the beam focus (71), is used to control a laser processing process.

43. The method according to claim 26, wherein
the positions of the two beam spots (92, 93) on the detector (40) run on two paths separated by the distance w, when the axial position of the beam focus (71) is varied.

* * * * *